United States Patent
Zhao et al.

(10) Patent No.: US 10,409,650 B2
(45) Date of Patent: Sep. 10, 2019

(54) EFFICIENT ACCESS SCHEDULING FOR SUPER SCALED STREAM PROCESSING SYSTEMS

(71) Applicant: salesforce.com, inc., San Francisco, CA (US)

(72) Inventors: Yingwu Zhao, Lafayette, CA (US); Hal Scott Hildebrand, Moss Beach, CA (US)

(73) Assignee: salesforce.com, inc., San Francisco, CA (US)

( * ) Notice: Subject to any disclaimer, the term of this patent is extended or adjusted under 35 U.S.C. 154(b) by 639 days.

(21) Appl. No.: 15/052,822

(22) Filed: Feb. 24, 2016

(65) Prior Publication Data

US 2017/0242887 A1    Aug. 24, 2017

(51) Int. Cl.
G06F 17/30    (2006.01)
G06F 9/50     (2006.01)

(52) U.S. Cl.
CPC ................... G06F 9/5083 (2013.01)

(58) Field of Classification Search
CPC ............................... G06F 17/30457
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

FOREIGN PATENT DOCUMENTS

CN    102231827 A  * 11/2011

*Primary Examiner* — Syed H Hasan
(74) *Attorney, Agent, or Firm* — Morris & Kamlay LLP

(57) ABSTRACT

The technology disclosed relates to discovering a previously unknown attribute of stream processing systems according to which client offsets or client subscription queries for a streaming data store rapidly converge to a dynamic tip of a data stream that includes the most recent messages or events. In particular, it relates to grouping clients into bins to reduce a number of queries to the streaming data store by several orders of magnitude when servicing tens, hundreds, thousands or millions of clients. The bin count is further reduced by coalescing bins that have overlapping offsets. It also relates to establishing separate caches only for the current tips of data streams and serving the bins from the caches instead of the backend data store using group queries. Further, the caches are periodically updated to include the most recent messages or events appended to the dynamic tips of the data streams.

20 Claims, 36 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0145038 A1* | 7/2003 | Bin Tariq ............ H04L 65/4084 709/202 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0222975 A1* | 10/2005 | Nayak ............... G06F 17/30613 |
| 2006/0021019 A1 | 1/2006 | Hinton et al. |
| 2006/0069803 A1* | 3/2006 | Clark ............... G06F 17/30557 709/237 |
| 2006/0149671 A1* | 7/2006 | Nix ..................... G06Q 20/04 705/40 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0112853 A1* | 4/2009 | Nishizawa ........ G06F 17/30516 |
| 2009/0172014 A1* | 7/2009 | Huetter ............. G06F 17/30551 |
| 2009/0177744 A1 | 7/2009 | Marlow et al. |
| 2010/0050181 A1* | 2/2010 | Zhang .................... H04L 29/06 718/104 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

(56) References Cited

U.S. PATENT DOCUMENTS

| | | | |
|---|---|---|---|
| 2015/0227630 A1* | 8/2015 | Solheim | G06F 17/30867 |
| | | | 707/722 |
| 2016/0149848 A1* | 5/2016 | Vembu | H04L 51/16 |
| | | | 709/206 |
| 2016/0188749 A1* | 6/2016 | Ning | G06F 17/30893 |
| | | | 707/800 |

* cited by examiner

EFFICIENT ACCESS SCHEDULING FOR SUPER SCALED STREAM PROCESSING SYSTEMS

RELATED APPLICATION

This application is related to U.S. Patent Application 15/052,806, filed Aug. 24, 2017, (now U.S. Pat. No. 10/262,032) entitled "CACHE BASED EFFICIENT ACCESS SCHEDULING FOR SUPER SCALED STREAM PROCESSING SYSTEMS, " filed contemporaneously. The related application is incorporated by reference for all purposes.

FIELD OF THE TECHNOLOGY DISCLOSED

The technology disclosed relates generally to super scaled stream processing systems, and in particular to improving read scheduling in such systems to provide real-time data to hundreds, thousands and millions of clients and servers.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Our world today is composed of the 1s and 0s that make up the binary code created by the streams of data flowing through every sector of the global economy. How much data is that? According to IBM™, 2.5 exabytes of data were created every day in 2012. That is 2.5 billion gigabytes of data in a single day. Facebook™ alone was responsible for 500,000 gigabytes a day in the same year. The importance of data is becoming so big, even the U.S. Government has launched an initiative, Data.gov, to help access and analyze it. The good news is that data processing and storage costs have decreased by a factor of more than 1,000 over the past decade. But once that data is stored, it is difficult to retrieve and use.

According to The Boston Consulting Group, one third of all bank data is never used. A big part of this is the fact that 75% of the data we generate is unstructured. It is randomly organized, difficult to index, and therefore difficult to retrieve. Where is all of this data coming from? An obvious source is the data that is being generated from legacy systems of record. It is data from cloud software as witnessed by the rapid adoption of Software as a Service (SaaS) as the new business application model. It is data being created every second from mobile phones, devices, and sensors that are being placed on just about everything that can be monitored in the physical world. And social media represents the largest data streams, which are being created in astronomical volumes.

Forget about texts, and think of all the photos and videos being uploaded via smartphones to popular services like YouTube™, Facebook™, Instagram™ and Twitter™. The smartphone is currently the major enabler of this data tsunami. PCs and feature phones (mobile phones that are not smartphones) are both in decline while smartphones are growing in the opposite direction, even in regions such as sub-Saharan Africa. And where there is a smartphone, there is an application for practically every human endeavor. Applications are the smartphone control point for all of the real-time data streams being created by our fingers, the camera, the motion sensor, GPS antenna, Bluetooth antenna, and gyroscope. Smartphone manufacturers continue to jam more sensors and capabilities into these devices while developers continue to build applications that delight us all.

According to The Economist, 50% of the adult population in 2015 owns a smartphone. That will grow to 80% in 2020. But as impressive as smartphones are, the biggest ripple is just forming. To use a term coined by Andreessen Horowitz, it is the "sensorification" of the physical world. The combination of cheap, connected, miniaturized computers and sensors will create a world of smart, connected products and industrial equipment. This new technology category is often called the "Internet of Things" (IoT). General Electric goes one step further, with the term "industrial internet", to include things like jet engines, locomotives and MRI machines. The Internet of Things represents a major and transformational wave of IT innovation. The Harvard Business Review calls this the third wave of IT-driven competition, with the first two waves brought by mainframes and minicomputers, and the rise of the Internet. Needless to say, harnessing and analyzing these data streams will represent the biggest challenge IT and businesses will face over the next decade.

The apt term used to describe this massive volume of data is "Big Data." For Big Data, traditional data storage technology is inadequate to deal with these large, high-speed volumes. And the challenges do not end there. Enterprises will also need to figure out how to not only capture this data, but how to search, analyze and visualize it as well as connect it with their business and customer data. The ultimate goal is the ability to perform predictive analytics and real-time intelligent decision-making. This is going to require an IT transformation from systems of record to systems of intelligence.

Before the advent of big data, the concept of business intelligence (BI) had already become a commonly used phrase back in the 1990s. A number of newly formed BI software vendors also entered the market at that time. BI provided the methods and tools required for the transformation of data into meaningful and useful information for the business. The functions of BI during this period were fairly basic, namely, to collect and organize the data and visualize it in a presentable way. Innovations continued and the introduction of data warehouses drastically reduced the time it took to access enterprise data from systems of record. Despite these innovations, a core challenge remains. Setting up these data warehouses requires deep expertise and using BI tools requires significant training. The mere mortals in the line of business still cannot use these tools in an accessible way. Most BI tools are pretty good at getting answers when you know ahead of time the questions you are asking. Sometimes you simply do not know what questions to ask. In short, these tools do not enable business users to obtain the insights when, how, and where they need them.

Fortunately, this is all changing. For the first time, data analytics tools are being built that are entirely designed and run in the cloud. There is no need for IT to provision hardware or install and configure the data platform. Performing all the associated integration and schema development has gone from months to days. This newfound agility has allowed innovation in technology to eliminate the traditional two-step service bureau model where every request from the line of business required IT's involvement. These innovations are paving the way for a democratization of data so that business users can not only get access to data but also participate in its analysis. This means a self-service model with direct access to answers without the need for analysts, data scientists or IT. Business users can find and share answers almost instantly. There is no hard requirement of needing to know ahead of time what questions to ask of the data. Business users can quickly bang out questions that allow them to explore and gain insights into the data sets. Furthermore, this democratization is powered by mobile. Using their smartphone, tablets, or wearables, workers can now gain access to data and answers to pressing business questions whenever and wherever they are. The democratization of data has become a necessary phase in the journey toward building systems of intelligence.

While the fruits of data democratization are plenty, the process itself mostly deals with empowering business users with access to and analysis of data from legacy systems of record and cloud-based business applications. At best, some of these new BI tools can provide near real-time access and analysis of data. But they are not engineered for capturing and analyzing actual real-time streams of data emanating from smartphones, wearables and the coming explosion of sensors in the physical world.

Real-time data streams deliver information that is quite different from the backward-looking, historical data most BI tools and platforms harness. Real-time data is perishable. That means it not only needs to be detected, it needs to be acted upon. The concept of "time to insight" emerges as one of the key performance indicators for systems of intelligence. These insights are going to require a whole new of level packaging and consumption. The information needs to be delivered in context, at the right time, and in a way that cuts through the cacophony of data we are exposed to in our daily work lives.

Systems of intelligence require knowing what to do with the data insights and how they should be delivered to the appropriate worker based on their job function and role inside the organization. These systems are every bit as democratic as modern BI tools in that they are easy to configure and get up and running. They are also designed to deal with the daily deluge of data we are confronted with every day at work. Consumer applications such as social media, traffic, and news aggregating applications help us more intelligently deal with the things that matter to us most.

The bar for applications connected to our systems of intelligence is as high as for consumer applications. This means one click installation, a lovely and simple user interface and accessibility via the mobile device of your choosing. The harnessing and analysis of real-time data streams begins to open up not only action in real time, but the ability to anticipate what is going to happen. This has traditionally been the realm of data scientists who handle everything from statistics and computational modeling to visualization and reporting. Models created by data scientists mostly look at past historical trends and use the data to predict patterns and future trends. Trying to build computational models that look at large volumes of real-time data streams presents a significant human resource challenge for enterprises.

The next step beyond this are the systems of intelligence that start to tell customers what questions they need to be asking. Getting there will require a blueprint for systems of intelligence. The source of data streams are the signals emanating in real-time from mobile devices such as smartphones and consumer wearables like the Fitbit™ and Apple Watch™. The control point for these signals is the application. The application is what puts context behind the raw data that gets created by human inputs and the sensors embedded in these devices. According to Wikipedia™, a sensor is a transducer whose purpose is to sense or detect some characteristic of its environs. It detects events or changes in quantities and provides a corresponding output, generally as an electrical or optical signal. Tying all of this together is the digital plumbing, or application programming interfaces (APIs). Along every critical element of the data stream flow represented in this schematic, APIs will enable this end to end transport of high speed and high volume data in the system. Although the term, API, may not be in the common vernacular outside of IT, it will be, much in the same way that terms of art to describe the web and internet are common language in business communication today.

The major gushers of data streams will be the connected consumer products and industrial equipment and machines. These real-time signals will emanate from product sensors inside our automobiles, inside our homes, on our valuables, our security systems, and anywhere in our physical environment that matters. Signals from the industrial Internet will emanate from sensors on any piece of equipment or machine that requires monitoring, maintenance and repair. Anything than can be digitally monitored with sensors in the physical environment will be.

Systems of intelligence must be able to identify these signals and harness them.

In order to capture the high-volume and high-speed data signals, a "digital watchdog" is needed to monitor these signal inputs. If anything significant happens with these digital signals, an event is registered. A very simple example of an event is when a temperature sensor goes off in your automobile to warn you of freezing conditions outside. Systems of intelligence will require the technology to ingest and monitor these data streams. The events created by the digital signals get broadcasted via messages and moved through the system so that the digestion process can proceed as planned. This is where filters can begin their job of further analyzing these data streams. For the system to function properly, it must be able to handle growing volumes and increased speeds of data flow and must not be lost if there is a breakdown or crash in that system.

Once data is captured and processed, it moves along into the digestion phase. This is where some of the magic starts to happen. This includes the monitoring and analytical processing of real-time data streams. Once the data is analyzed and processed, it needs to be put somewhere. The data streams flowing in are not suitable for traditional database storage such as relational databases using structured query language. This requires specialized technology that can handle and store very large data sets, an essential element of systems of intelligence.

Currently, stream processing systems that desire to service billions of users are limited by the amount of scalability they can achieve. This limitation is caused primarily by the exhaustion of components that make up the stream processing systems. As a result, it is desired to identify techniques that inject efficiency in the operation of stream processing systems so that their components are not over-used and can deliver the level of super scalability expected from such systems.

Therefore, an opportunity arises to provide systems and methods that process big data for a super scaled stream processing systems in an efficient manner. Increased revenue, higher user retention, improved user engagement and experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The technology disclosed relates to discovering a previously unknown attribute of stream processing systems according to which client offsets or client subscription queries for a streaming data store rapidly converge to a dynamic tip of a data stream that includes the most recent messages or events. In particular, it relates to grouping clients into bins to reduce a number of queries to the streaming data store by several orders of magnitude when servicing tens, hundreds, thousands or millions of clients. The bin count is further reduced by coalescing bins that have overlapping offsets. It also relates to establishing separate caches only for the current tips of data streams and serving the bins from the caches instead of the backend data store using group queries. Further, the caches are periodically updated to include the most recent messages or events appended to the dynamic tips of the data streams.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
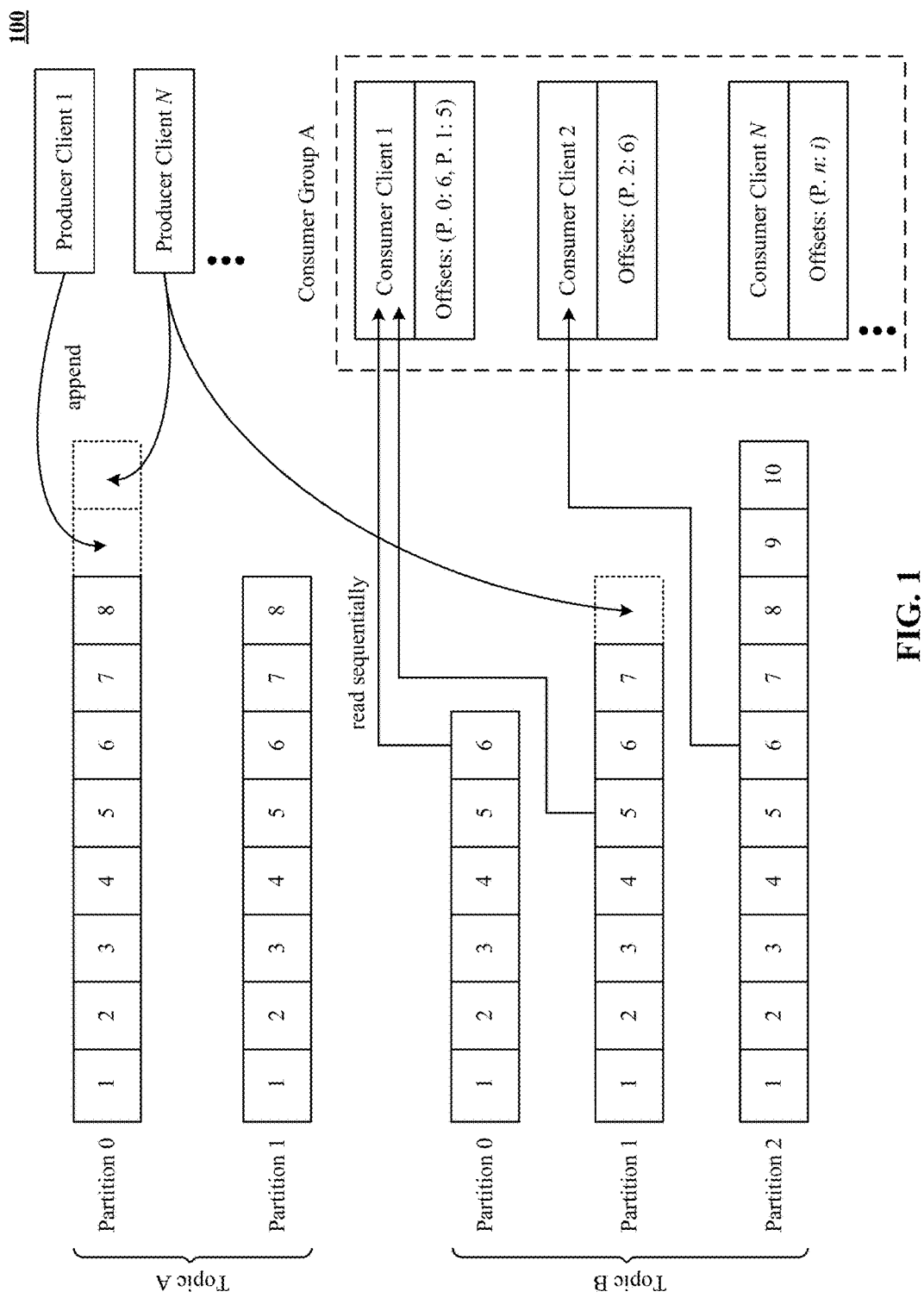
FIG. 1 shows one implementation of a stream processing system that uses an unbounded data stream or a message store for servicing a plurality of clients.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

In today's world, we are dealing with huge data volumes, popularly referred to as "Big Data". Web applications that serve and manage millions of users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience. Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism.

Applications that require real-time or near-real-time processing functionalities are changing the way that traditional data processing systems infrastructures operate. They are pushing the limits of current processing systems forcing them to provide higher throughputs with the lowest possible latencies. The digitization of virtually everything has created new types of large and real-time data across a broad range of industries. Much of this is non-standard data, for example, streaming, geospatial or sensor-generated data that does not fit well with traditional, structured, relational warehouses and data processing techniques. As a result, new technologies and techniques are desired to process data with previously unachievable levels of scalability, sophistication, speed and accuracy.

For processing this huge amount of data, new tools and approaches are required. Currently, the most used tool is Hadoop™. Even if Hadoop™ does its job very well, it is limited to process data by batch and is certainly not a good fit for processing the latest version of data. As more and more cases require processing data almost in real-time, which means as data arrive, in order to react and take decisions quickly after an event happened. This kind of computation is generally called "stream processing, " in other words processing a constant flux of data, in real-time. A stream is an unbounded source of events. The goal of a stream processing system is to do transformation on these streams of data in real-time and to make processed data directly available for the end-user or the application. Some examples of popular stream processing systems include SQLstream™, StreamBase CEP™, Esper™, AMPLab Spark™, HStreaming™, Apache Chukma™, Apache Flume™, Apache YARN™, StreamDrill™, Walmart Muppet™, Google Photon™, MapReduce Online™, Apache Drill™, Cloudera Impala™, StreamBase™, IBM InfoSphere™, Truviso™, Yahoo S4™, Apache Spark™, Apache Flink™ and Apache Samza™.

Building applications for millions of users requires high scalability and good system performance. However, most current architectures and environments are not capable of handling big data in real-time because of scalability problems, i.e. the difficulty in simultaneously serving hundreds, thousands and millions of clients and servers. The result is that the so-called "high scalability" of most current stream processing systems is restricted to only a fraction of the magnitude they claim.

The technology disclosed relates to extending the state-of-the-art stream processing frameworks to deal with super scaled stream processing systems. "Super scaled stream processing systems" serve millions of users in real-time via millions of clients and servers. Stream processing systems usually receive events, archive them, perform offline and real-time computations, merge the results of those computations into coherent information and deliver the results to the clients. With super scaled stream processing systems, these operations happen at the scale of millions events per second for millions of clients and servers. Further, stream processing domain has ever increasing tools for information flow processing in the last years, driven mainly by the needs of the growing big data oriented applications. The technology disclosed exposes some bottlenecks in the stream processing domain and identifies potentials to be applied to super scaled information flow.

The technology disclosed has discovered that in stream processing systems, at any given time, the majority of clients rapidly converge towards the tip. This is, if there a k clients serviced by a data stream at time $t_0$ and the offset variance across the data stream is x, then at time $t_1$ the offset variance becomes y with k-$\lambda$ clients within a tip offset t and y<<<x, $\lambda$<<<k and $t_0$ and $t_1$ being in close temporal proximity. Using a numeric example, if one million clients requested service from the data stream at time $t_0$ across thousand different offsets in the data stream, then at time $t_1$, nine hundred and ninety thousand clients would have been streamed messages up to an offset that constitutes a tip of the data stream of most recent messages.

The prime observation that is deduced from this discovery is that the next time when clients are streamed messages, majority of the clients (e.g., nine hundred and ninety thousand out of a million) can be served just from the tip, with only a fraction of the clients requesting data from an offset that is not included in the tip. As discussed infra, this observation yields many technical solutions for stream processing systems, such as reducing the access frequency by several orders of magnitude for unbounded data streams that service hundreds, thousands and millions of clients. Accordingly, the technology disclosed puts forth a cache based technical solution in which caches are maintained just for the tips of unbounded data streams so that majority of the bins are served from the cache using group queries instead of the backend unbounded data stream or data store.

The technology disclosed relates to of reducing a number of queries to a message data store by several orders of magnitude when servicing a plurality of clients. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a non-transitory computer readable storage medium that stores computer readable instructions or computer program code, or as a computer program product comprising a computer usable medium having a computer readable program code embodied therein.

In addition, the technology disclosed can be implemented using different programming models like MapReduce™, bulk synchronous programming, MPI primitives, etc. or different stream management systems like Apache Storm™, Apache Spark™, Apace Kafka™, Truviso™, IBM InfoSphere™, Borealis™ and Yahoo! S4™.

Streaming or Message Data Store

FIG. 1 shows one implementation of a stream processing system 100 that uses an unbounded data stream or a message store for servicing a plurality of clients. FIG. 1 only shows an architectural level schematic of a stream processing system in accordance with an implementation. Because FIG. 1 is an architectural diagram, certain details are intentionally omitted to improve the clarity of the description. In other implementations, system 100 may not have the same elements as those listed above and/or may have other/different elements instead of, or in addition to, those listed above.

In one implementation, stream processing system 100 includes three components; producer clients, consumer clients, and brokers (not shown). System 100 is a super scaled stream processing system that serves millions of users in real-time via millions of clients and servers. As a result, in one implementation, system 100 includes millions of producer clients and consumer clients. In another implementation, system 100 includes thousands of producer clients and consumer clients. In yet another implementation, system 100 includes hundreds of producer clients and consumer clients.

Producer clients and consumer clients use message queues for asynchronous inter-process communication. System 100 supports both point-to-point as well as publish/subscribe communication. In point-to-point paradigm, the producer of the messages sends the messages to a queue. There can be multiple consumer clients associated with the queue, but only one consumer client can consume a given message from a queue. In publish/subscribe paradigm, there can be multiple producer clients producing messages for a given entity called "topic, " and there can be multiple consumer clients subscribed for that topic. Each subscription receives the copy of each message sent for that topic. This differs from point-to-point communication, where one message is consumed by only one consumer client. The broker bridges the gap between the producer clients and the consumer clients. The broker also maintains the state of a message, i.e. whether the message is consumed or not, according to one implementation. This application interchangeably refers to a "message(s)" as an "event(s)", and vice-versa.

In the implementation depicted in FIG. 1, stream processing system 100 uses Apache Kafka™ as a message bus, (hereinafter "Kafka"). Kafka provides a reliable, scalable, fast, distributed, high-throughput and low latency messaging system. For this reason, Kafka is attractive as part of a larger data workflow as a way to connect different systems together. In some implementations, Kafka provides a service-oriented architecture, acting as a centralized queue that serves as a message bus for an entire organization. In other implementations, Kafka is the single point of delivery of events entering the stream processing system 100. For example, a variety of applications can be made to publish their data to topics to Kafka, and a different set of other systems can be configured to read data from the topics on the Kafka queue. In one implementation, the applications publishing and the applications reading do not have to be configured to talk to one another, just to talk to Kafka.

In one implementation, events are delivered to Kafka over Hypertext Transfer Protocol (HTTP). Events are transmitted via POST requests to a receiver that acts as a front for a Kafka producer, according to some implementations. Kafka maintains events in categories or streams referred to as topics like topic A and topic B. Messages in topics are partitioned. As shown in FIG. 1, topic A includes two partitions, partition 0 and partition 1, and topic B includes three partitions, partition 0, partition 1 and partition 2. Each Kafka partition corresponds to a logical log and is an ordered, immutable sequence of messages that is continually appended to by the producer clients like producer client 1 and producer client N, as shown in FIG. 1. Physically, a log is implemented as a set of segment files of approximately the same size (e.g., 1 GB). Every time a producer client publishes a message to a partition, the broker simply appends the message to the last segment file. Every time a message is appended, it is assigned a sequential ID number that uniquely identifies each message within the partition. Such number is called offset. Kafka persistently stores and replicates these partitions. To get the messages out, consumer clients subscribe to the partitions. Kafka leaves the consumer clients to keep record of the offsets they consume, which allows the consumer clients to reset the offset to an older value in order to reprocess the messages when needed. For better performance, Kafka flushes the segment files to disk only after a configurable number of messages have been published or a certain amount of time has elapsed.

Kafka's design makes it highly scalable, allowing it to process millions of messages per second and stream them to millions of clients such as consumer client 1, consumer client 2 and consumer client N of FIG. 1. The producer clients write messages to partitions in real-time, and the consumer clients read the messages from the partitions in real-time for parallel processing. Once a consumer client is configured to read messages from a specific Kafka topic, Kafka starts fetching data to the consumer client. Consumer clients can read from Kafka topics and write the data read to external stores. Kafka allows multiple consumer clients to be grouped within a common group ID in order for the partitions to be consumed in parallel. Each message is delivered to a consumer group only once. Within the consumer group, individual clients tell the broker that they have consumed a message from a particular partition of a topic by updating an offset.

A message stored in stream processing system 100 is addressed by its logical offset in the log. In one implementation, it is the consumer clients that keep track of the messages they have consumed to the point by maintaining a watermark that tells which offset in the log segment was consumed. In another implementation, for each partition, each consumer client tracks the offset up to which it has seen messages, and it polls the brokers to await the arrival of messages with a greater offset. A consumer client always reads messages from a particular partition sequentially, as depicted in FIG. 1. If the consumer client acknowledges a particular message offset, it implies that the consumer client has received all messages prior to that offset in the partition. This allows the consumer client to consume an older message by lowering the watermark. Thus, if the consumer client crashes and restarts, it resumes reading from its most recently checkpointed offset. In the example shown in FIG. 1, consumer client 1 has consumed messages up till offset 6 from partition 0 of topic B and offset 5 from partition 1 of topic B. Consumer client 2 has consumed messages up till offset 6 from partition 2 of topic B.

In some implementations, the offset is periodically checkpointed to stable storage. Typically, the consumer clients store the offset in Zookeeper™, which is used as a distributed consensus service. In other implementations, the consumer clients maintain the watermark level in any data structure. For instance, if Hadoop™ is consuming messages from Kafka, it can store the watermark value into Hadoop Distributed File System (HDFS).

In other implementations, the technology disclosed uses other messaging systems like Kestrel, RabbitMQ and ActiveMQ.

Tip

Figure 2:
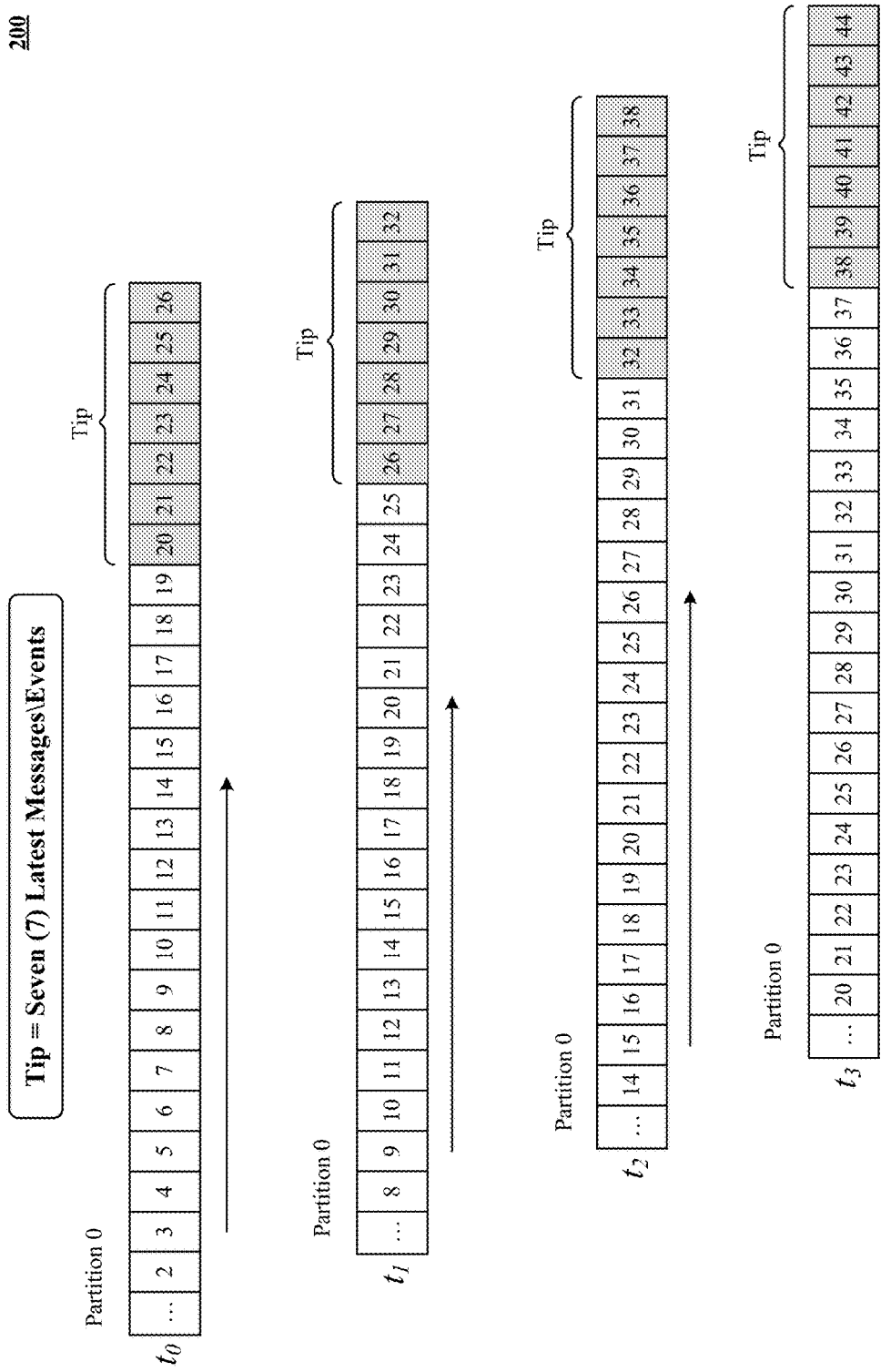
FIG. 2 illustrates an unbounded data stream with a dynamic tip in accordance with one implementation of the technology disclosed.

FIG. 2 illustrates an unbounded data stream 200 with a dynamic tip in accordance with one implementation of the technology disclosed. In particular, FIG. 2 shows a Kafka partition 0 that includes an unbounded sequence of messages or events, with new messages or events being appended as time progresses. FIG. 2 also shows that partition 0 has a dynamic tip which includes the most recent or latest messages or events appended to partition 0. In FIG. 2, the dynamic tip at a current time is depicted with a grey color code. In one implementation, a number of most recent messages or events that constitute a current tip are configurable. For instance, in one implementation, the dynamic tip includes the seven latest messages received by partition 0. As depicted in FIG. 2, the dynamic tip of partition 0 includes messages from offsets 20 to 26 at $t_0$. At $t_1$, the dynamic tip is updated to include messages from offsets 26 to 32. At $t_2$, the dynamic tip is updated to include messages from offsets 32 to 38. At $t_3$, the dynamic tip is updated to include messages from offsets 38 to 44. Thus, the tip of unbounded data stream 200 always includes the most recently received messages or events.

Tip Convergence

Figure 3:
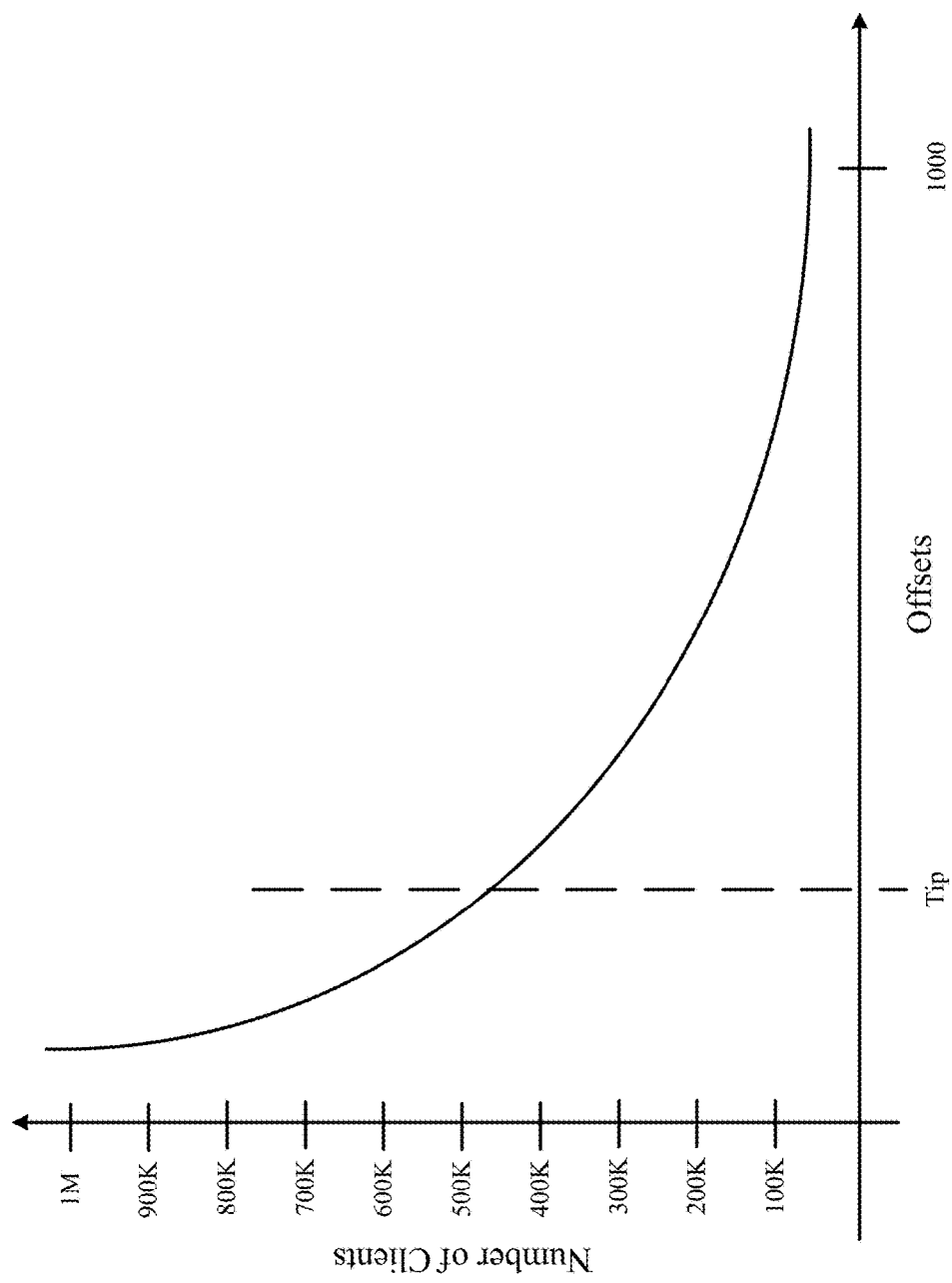
FIG. 3 depicts a previously unknown attribute of stream processing systems discovered by the technology disclosed according to which client offsets or client subscription queries for a data stream rapidly converge to a dynamic tip of the data stream that includes the most recent messages or events.

FIG. 3 depicts a previously unknown attribute of stream processing systems discovered by the technology disclosed according to which client offsets or client subscription queries for a data stream rapidly converge to a tip of the data stream that includes the most recent messages or events. FIG. 3 illustrates a graph 300 with an X-axis and a Y-axis. In one implementation, the X-axis represents a number of clients that have consumed messages from the unbounded data stream or have been streamed messages from the unbounded data stream. In another implementation, the X-axis represents a number of clients that have issued subscription queries as a starting offset for streaming service to the clients. The Y-axis represents the offsets in the data stream up to which point messages have been streamed to the clients, according to one implementation. In another implementation, the Y-axis represents the offsets identified in or requested by the client subscription queries.

The technology disclosed has discovered that in stream processing systems, at any given time, the majority of clients rapidly converge towards the tip. This is, if there a k clients serviced by a data stream at time $t_0$ and the offset variance across the data stream is x, then at time $t_1$ the offset variance becomes y with k-λ clients within a tip offset t and y<<<x, λ<<<k and $t_0$ and $t_1$ being in close temporal proximity. Using a numeric example, if one million clients requested service from the data stream at time $t_0$ across thousand different offsets in the data stream, then at time $t_1$, nine hundred and ninety thousand clients would have been streamed messages up to an offset that constitutes a tip of the data stream of most recent messages.

The prime observation that is deduced from this discovery is that the next time when clients are streamed messages, majority of the clients (e.g., nine hundred and ninety thousand out of a million) can be served just from the tip, with only a fraction of the clients requesting data from an offset that is not included in the tip. As discussed infra, this observation yields many technical solutions for stream processing systems, such as reducing the access frequency by several orders of magnitude for unbounded data streams that service hundreds, thousands and millions of clients.

Super Scaled Stream Processing Systems

Figure 4:
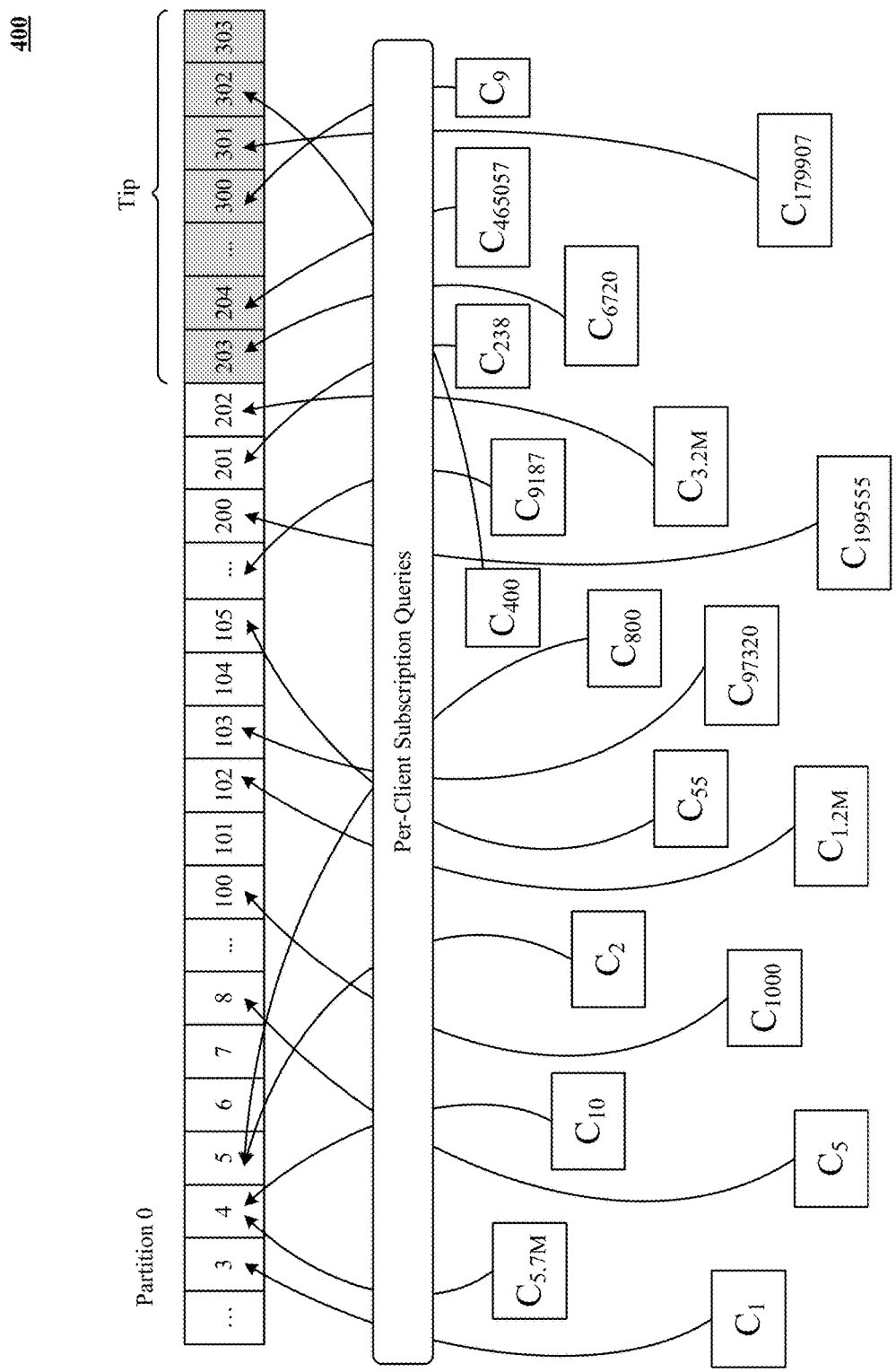
FIG. 4 is one implementation of a super scaled streaming processing system that services millions of clients and illustrates the previously unknown problem of excessive access scheduling in stream processing systems discovered by the technology disclosed.

FIG. 4 is one implementation of a super scaled streaming processing system 400 that services millions of clients and illustrates the previously unknown problem of excessive access scheduling in stream processing systems discovered by the technology disclosed. System 400 includes millions of clients, but for illustration purposes, FIG. 4 shows only nineteen clients of the millions of clients. In current stream processing systems, each client that is requesting service from the message bus or message queue or a message store of the stream processing system queries the bus or the queue or the store, as discussed supra in description of FIG. 1. Consequently, this creates a "per-client subscription query" model under which the streaming processing system receives a unique subscription request from each client and individually responds to each of the subscription requests. For super scaled stream processing systems, which service millions of events per second to millions of clients, the number of subscription requests and corresponding responses overwhelms the system and makes the per-client subscription query model unmanageable and unfeasible. As a result, existing stream processing systems are not able to scale to millions of clients as they claim and thus are restricted to only a fraction of it.

This previously unknown problem of excessive access scheduling in stream processing systems is illustrated in FIG. 4 in which each of the nineteen clients make nineteen unique subscription requests to the unbounded data stream. The problem is further exacerbated and becomes harder to solve when the subscription requests have a high degree of offset variance across the data stream. It is also exacerbated when the subscription requests are made to offsets that are not currently maintained by the unbounded data stream but instead drained to a stable storage like HBase™, Hadoop™, etc. for archival purposes.

Binning

Figure 5A:
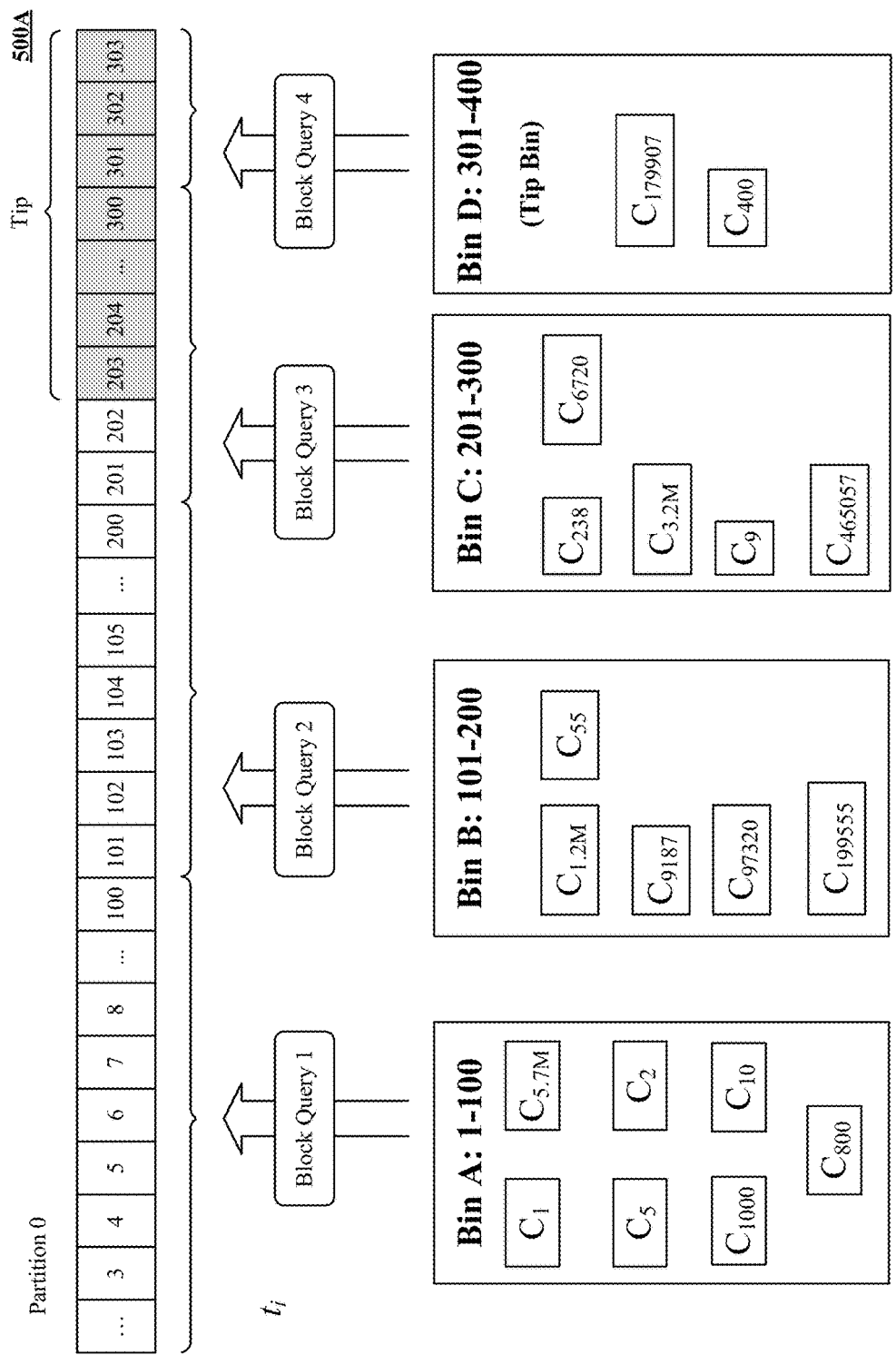
FIG. 5A depicts the binning technique offered by the technology disclosed that remedies the previously unknown problem of excessive access scheduling in stream processing systems.

FIG. 5A depicts the binning technique 500A offered by the technology disclosed that remedies the previously unknown problem of excessive access scheduling in stream processing systems. In particular, FIG. 5A shows one implementation of reducing a number of queries to an unbounded data stream or a message data store by several orders of magnitude when servicing a plurality of clients. In FIG. 5A, the nineteen clients shown in FIG. 4 in are binned in bins A, B, C and D based on the clients' respective selected starting offsets in the data stream and current offsets of the bins. In another implementation, FIG. 5A shows that client subscription requests are grouped into one or more bins based on the clients' respective subscription offsets identified in the requests and the bins' respective current bin offset ranges. Further, at time $t_1$, when messages are streamed to the nineteen clients starting from their respective subscription offsets, queries to the message data store are reduced from nineteen to four by issuing against the data store a single block query for each of the four bins A, B, C and D instead of issuing individual queries for each of the nineteen client subscription requests. In some implementations, millions of clients are clustered into five, tens or hundreds of bins, thereby reducing the number of query calls from millions to five, tens or hundreds using block queries like block queries 1-4 shown in FIG. 5A.

In some implementations, the bins' respective current bin offset ranges represent lower and upper logical boundaries of a segment of a particular message sequence currently maintained by the data store. In the example shown in FIG. 5A, Bin A represents messages from the unbounded data stream with offsets between 1 and 100 i.e. the first 100 messages. Similarly, Bin B represents messages from the unbounded data stream with offsets between 101 and 200 i.e. the next 100 messages. Likewise, Bin C represents messages from the unbounded data stream with offsets between 201 and 300 i.e. the next 100 messages. Also, Bin D represents messages from the unbounded data stream with offsets between 301 and 400 i.e. the next 100 messages. Bin D is also the tip bin for the unbounded data stream because it includes the most recent messages received by partition 0.

Figure 5B:
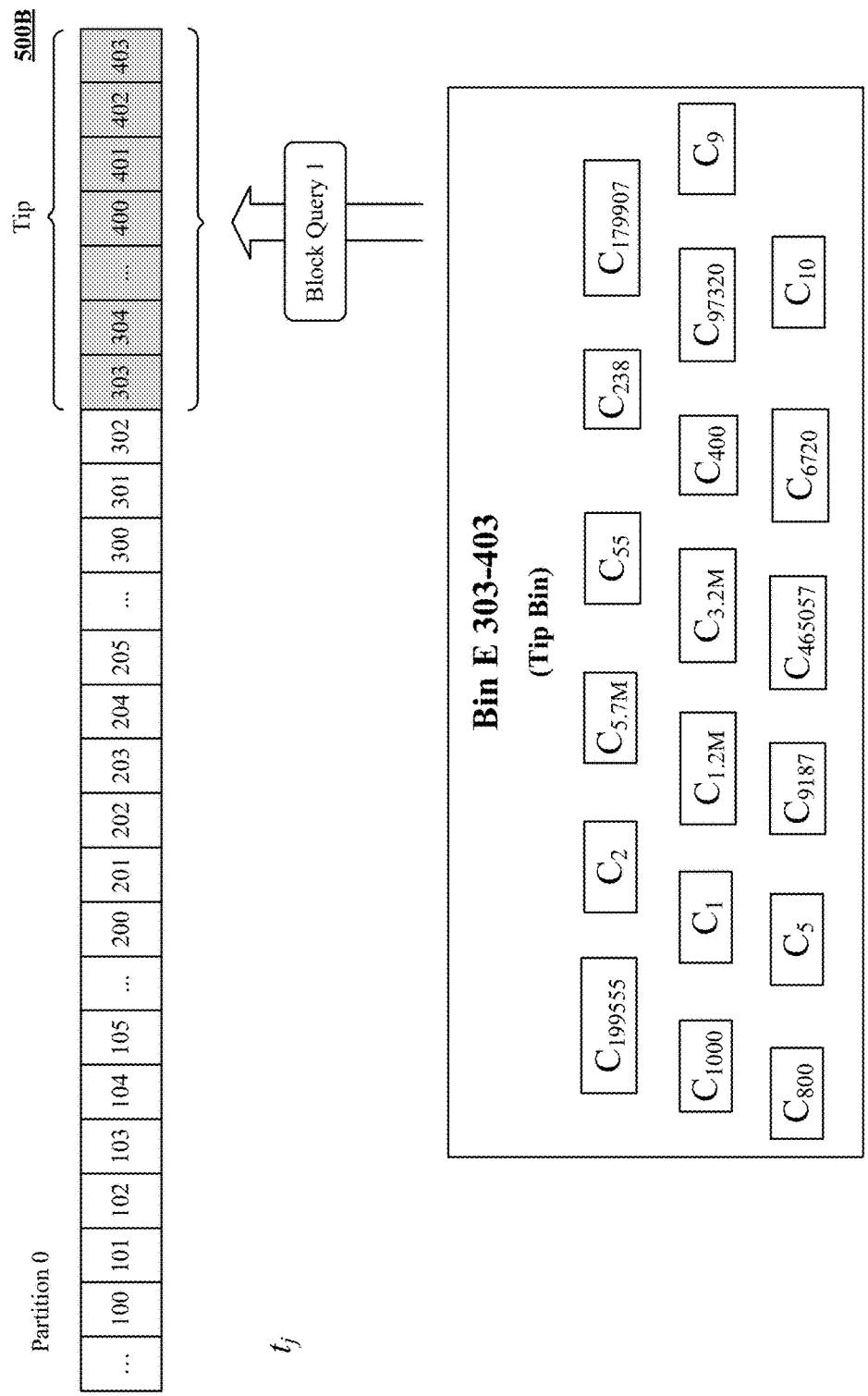
FIG. 5B illustrates one implementation of clients converging to a tip bin after message delivery, thereby further reducing a number of block queries to an unbounded data stream.

FIG. 5B illustrates one implementation of clients converging to a tip bin after message delivery 500B, thereby further reducing a number of block queries to an unbounded data stream. FIG. 5B shows that message offsets of messages streamed to the clients have respectively evolved from a varied distribution across the data store at time $t_i$ in FIG. 5A to a cumulative convergence towards a tip of the data store. The tip includes a tip message offset that identifies a latest message in the data store. In FIG. 5B, the tip message offset is 403. Further, FIG. 5B shows that the clients, previously grouped into four different bins, are now grouped into a single tip bin at time $t_j$ with a bin offset range that includes the tip message offset. In the example shown in FIG. 5B, the tip bin is Bin E 303-403 and includes the nineteen clients that were previously distributed across Bins A, B, C and D. As a result, the number of block queries is reduced from four to one at time $t_j$.

Bin Creation and Message Delivery

Figure 6A:
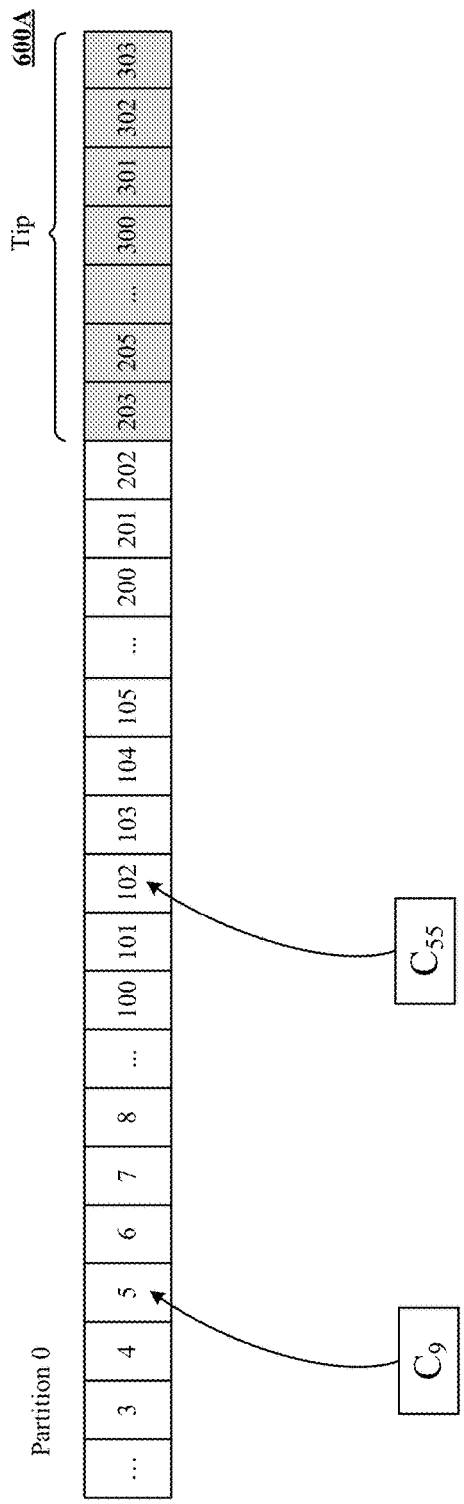
FIGS. 6A-6D illustrate one implementation of bin creation.

FIGS. 6A-6D illustrates one implementation of bin creation 600A, 600B, 600C and 600D. Because FIGS. 6A-6D are architectural diagrams, certain details like the numerosity of the clients is scaled intentionally to improve the clarity of the description. In other implementations, the unbounded data stream depicted in FIGS. 6A-6D is accessed by tens, hundreds, thousands or millions of clients. In FIG. 6A, client subscription requests are received from the plurality of clients such as clients $C_9$ and $C_{55}$. The subscription requests identify as subscription offsets the clients' respective starting offsets for streaming messages from the unbounded data stream. In the example shown in FIG. 6A, client $C_9$'s subscription request identifies message offset 5 and client $C_{55}$'s subscription request identifies message offset 102. Thus, the subscription offsets are distributed across various message offsets currently or historically maintained by the data stream. In other implementations, clients request message offsets archived in stable storage like HBase™, Hadoop™, etc. Further, one or more new bins are created to cluster the client subscription requests based on the distribution of the subscription offsets and a preconfigured bin size.

Figure 6B:
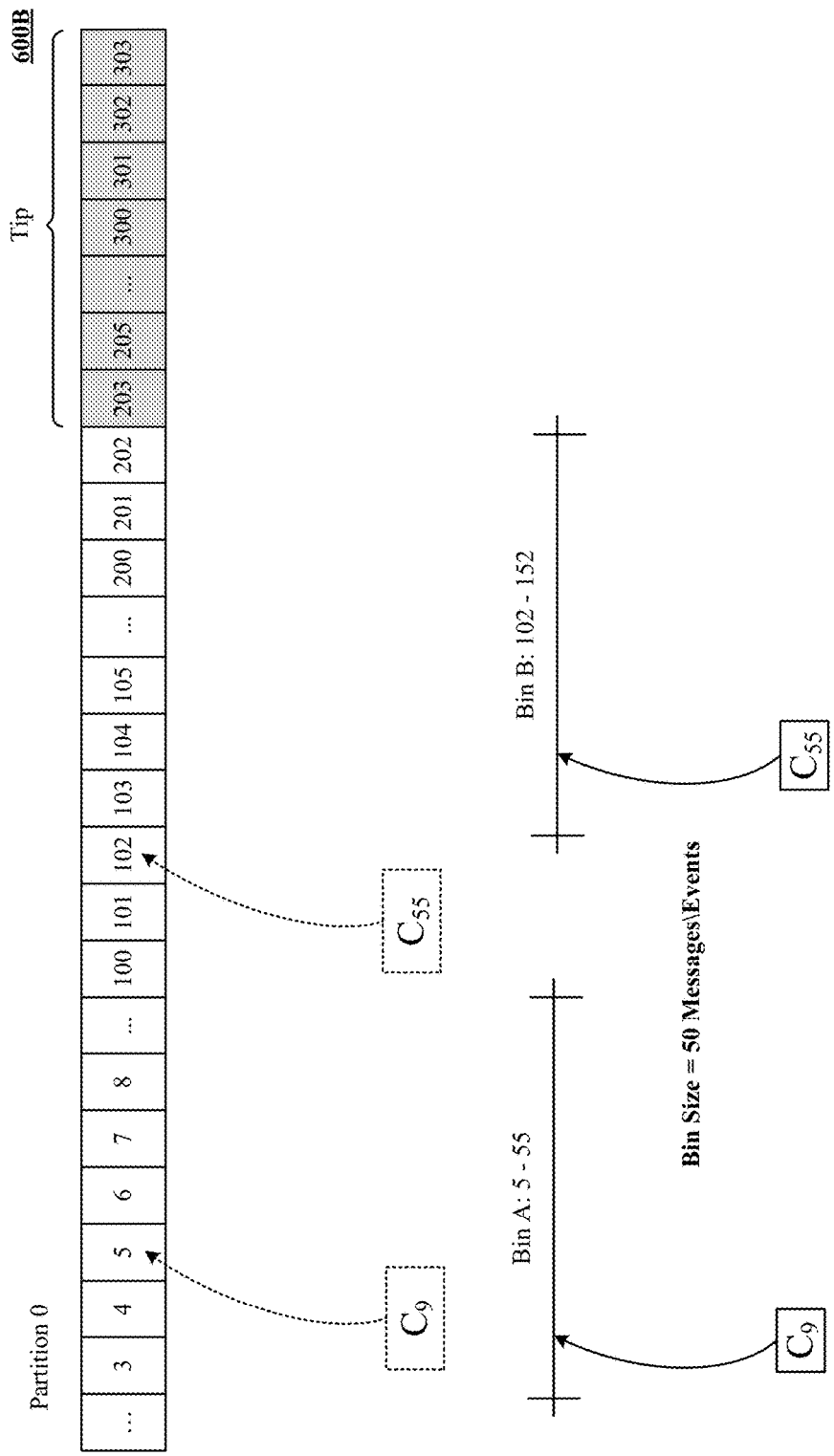

In the example shown in FIG. 6B, Bin A 5-55 is created to cluster client $C_9$'s subscription request. Similarly, Bin B: 102-152 is created to cluster $C_{55}$'s subscription request.

Each new bin has a bin offset range with a start offset selected based on one or more subscription offsets and an end offset selected based on the bin size. As shown in FIG. 6A, Bin A's start offset is 5 because client $C_9$ requested message offset 5 for streaming purposes. Likewise, Bin B's start offset is 102 because client $C_{55}$ requested message offset 102 for streaming purposes. Thus, in one implementation, a start offset of a new bin's bin offset range is selected based on a subscription offset of at least one client subscription request in the new bin. In one implementation, an end offset of each bin's bin offset range is determined based on a preconfigured bin size measured in number of messages. In the example shown in FIG. 6C, the preconfigured bin size is 50 message or events and that is why the difference between the start and end offsets of Bins A and B is 50. Once the clients are binned, the client subscription requests are responded to by issuing against the data stream a single block query for each of the new bins, Bins A and B, instead of issuing individual queries for each of the client subscription requests.

Figure 6C:
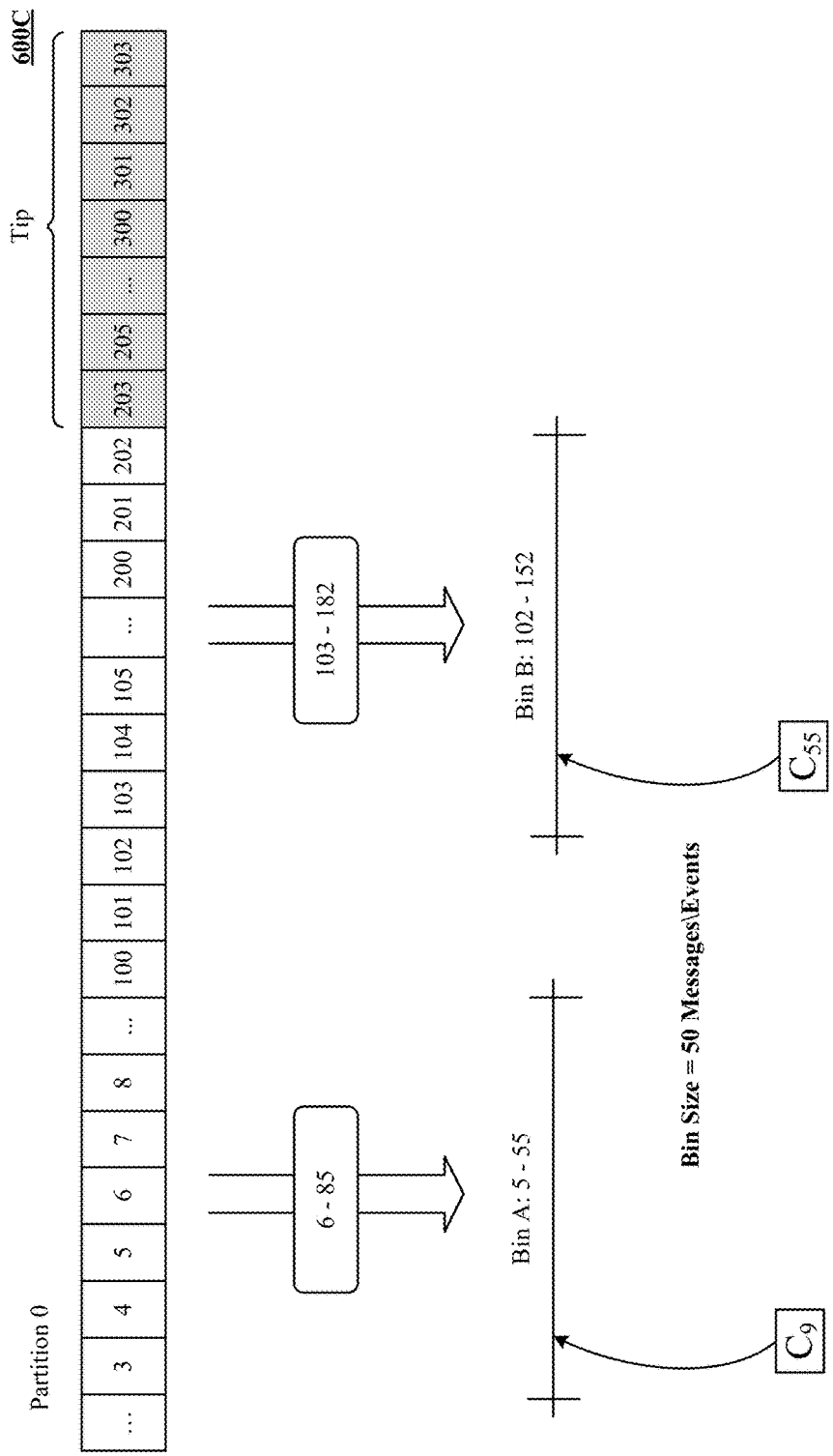
Figure 6D:
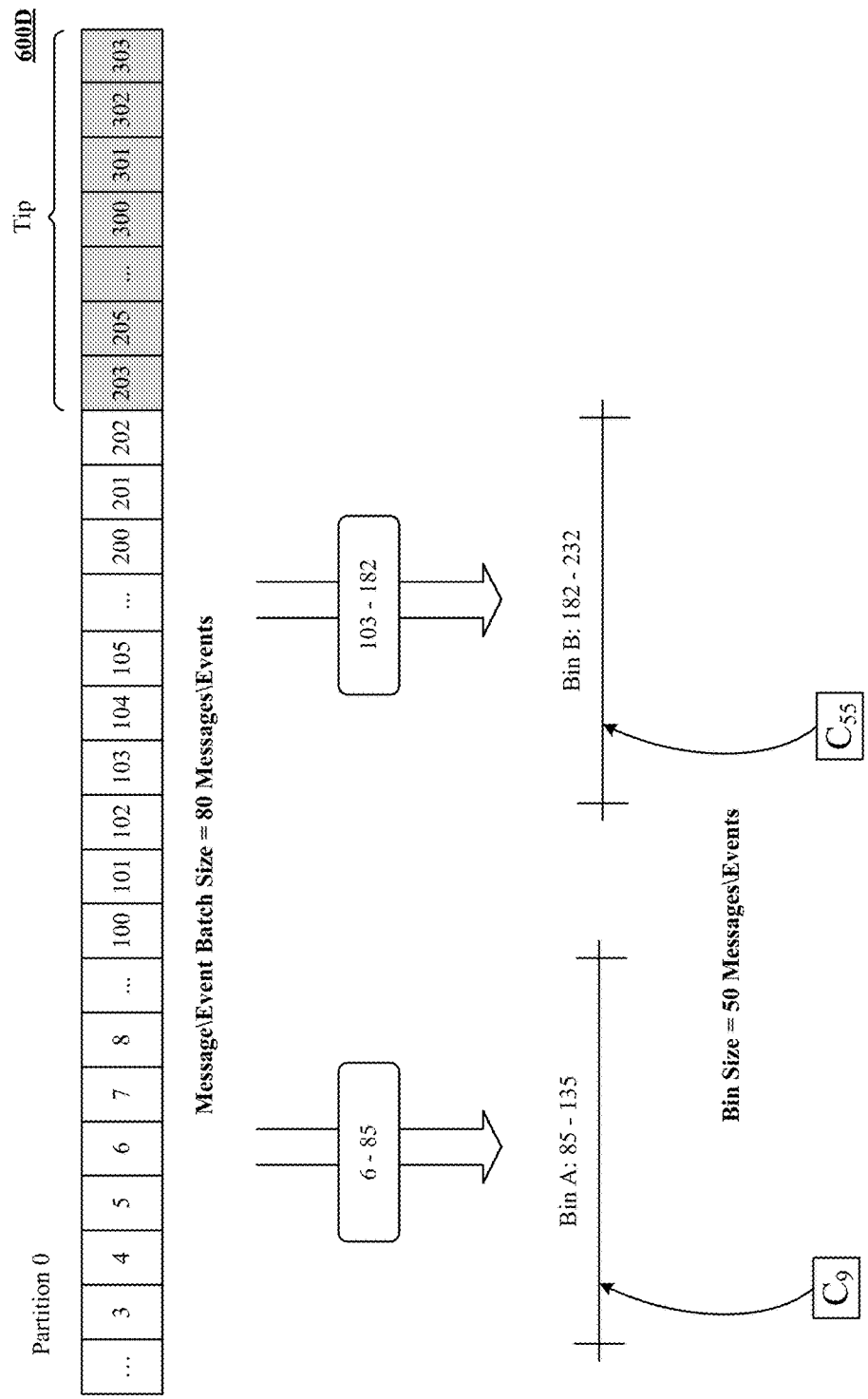

In another implementation, a particular bin's bin offset range is determined based on a latest message offset streamed to at least one client in the particular bin. As depicted in FIG. 6C, Bin A had an initial offset range of 5-55 before messages were delivered to client $C_9$ clustered in Bin A. Upon message delivery in FIG. 6D, a message or event batch is delivered to client $C_9$. The message or event batch size of the delivered message or event batch is preconfigured. In the example shown in FIG. 6D, the message or event batch size is 80, i.e. 80 messages or event are delivered to each client in a bin in response to the respective subscription queries. As a result, Bin A advances and its bin offset range is updated to have a new start offset that matches the end offset of the latest delivered message or event batch, i.e. 85-135. Finally, client $C_9$ is regrouped in the advanced Bin A. In one implementation, the bins are locked during message delivery and regrouping of clients.

In one numeric example, the message sequence currently maintained by the data stream has message offsets between 800 and 1200 and the preconfigured bin size is one hundred messages. Further, five hundred client subscription requests are received with subscription offsets 802, one thousand client subscription requests are received with subscription offsets 906, one thousand client subscription requests are received with subscription offsets 908, one thousand client subscription requests are received with subscription offsets 910, one thousand client subscription requests are received with subscription offsets 912, one thousand client subscription requests are received with subscription offsets 1025 and one thousand client subscription requests are received with subscription offsets 1150.

As a result, four new bins with respective bin offset ranges 802-902, 906-1006, 1020- 1120 and 1150-1200 are created. The five hundred client subscription requests with subscription offsets 802 are clustered in a first bin with offset range 802-902, the one thousand client subscription requests with subscription offsets 906 are clustered in a second bin with offset range 906-1006, the one thousand client subscription requests with subscription offsets 908 are clustered in the second bin with offset range 906-1006, the one thousand client subscription requests with subscription offsets 910 are clustered in the second bin with offset range 906-1006, the one thousand client subscription requests with subscription offsets 912 are clustered in the second bin with offset range 906-1006, the one thousand client subscription requests with subscription offsets 1025 are clustered in a third bin with offset range 1020-1120 and the one thousand client subscription requests with subscription offsets 1150 are clustered in a fourth bin with offset range 1150-1200. Finally, the subscription queries to the data stream are reduced when responding to six thousand five hundred client subscription requests by issuing against the data stream a single block query for each of the first, second, third and fourth new bins instead of issuing individual queries for each of the six thousand five hundred client subscription requests.

In another numeric example, when a previous bin offset range of a particular bin is 800-900, a message offset range of the streamed message batch is 801-950 and the preconfigured bin size is one hundred messages, the particular bin is advanced by updating the particular bin's bin offset range to be 950-1050 and regrouping the clients in the advanced particular bin.

In some implementations, when the subscription requests identify as subscription offsets the clients' respective last checkpointed message offsets, one or more block queries are used to restream messages to the plurality of clients starting from their respective subscription offsets under a fault tolerance scheme. In other implementations, when the subscription requests identify as subscription offsets the clients' respective starting offsets for streaming messages that are different from the clients' respective last checkpointed message offsets, one or more block queries are used to restream messages to the plurality of clients starting from their respective subscription offsets under a security scan scheme.

In yet other implementations, for each of the clients grouped in the particular bin, messages that have message offsets equal to or less than the clients' respective subscription offsets are filtered from the retrieved message batch. Further, messages from the retrieved message batch that have message offsets greater than the clients' respective subscription offsets are streamed to each of the clients. In the example shown in FIGS. 6B and 6D, client $C_{1.2M}$ requested a message offset 52. This means that client $C_{1.2M}$ has received all messages up to and including message offset 52. Further, client $C_{1.2M}$ is grouped in Bin A with bin offset range 5-55, which receives the message batch 6-85 in FIG. 6D. As a result, Bin A advances to have new bin offset range 85-155. Since client $C_{1.2M}$ had already received messages up to and including offset 52, when the message batch 6-85 is streamed to client $C_{1.2M}$ messages from offset 6 to 52 are filtered out and messages 53-85 are streamed to client $_{1.2M}$.

In one implementation, for each block query issued for each of the bins, a message batch is retrieved from the data stream. In one implementation, the message batch has a message offset range with a start offset immediately succeeding a start offset of the corresponding bin's bin offset range. In the example shown in FIG. 6C, Bin A had an initial start offset of 5 and the start offset of its corresponding message batch is 6. In another numeric example, a bin's bin offset range is 800-900 and the message offset range of the retrieved message batch is 801-950. In another numeric example, a bin's bin offset range is 1100-1200 and the message offset range of the retrieved message batch is 1101-1150.

Anti-Latency Simultaneous Processing

Figure 7A:
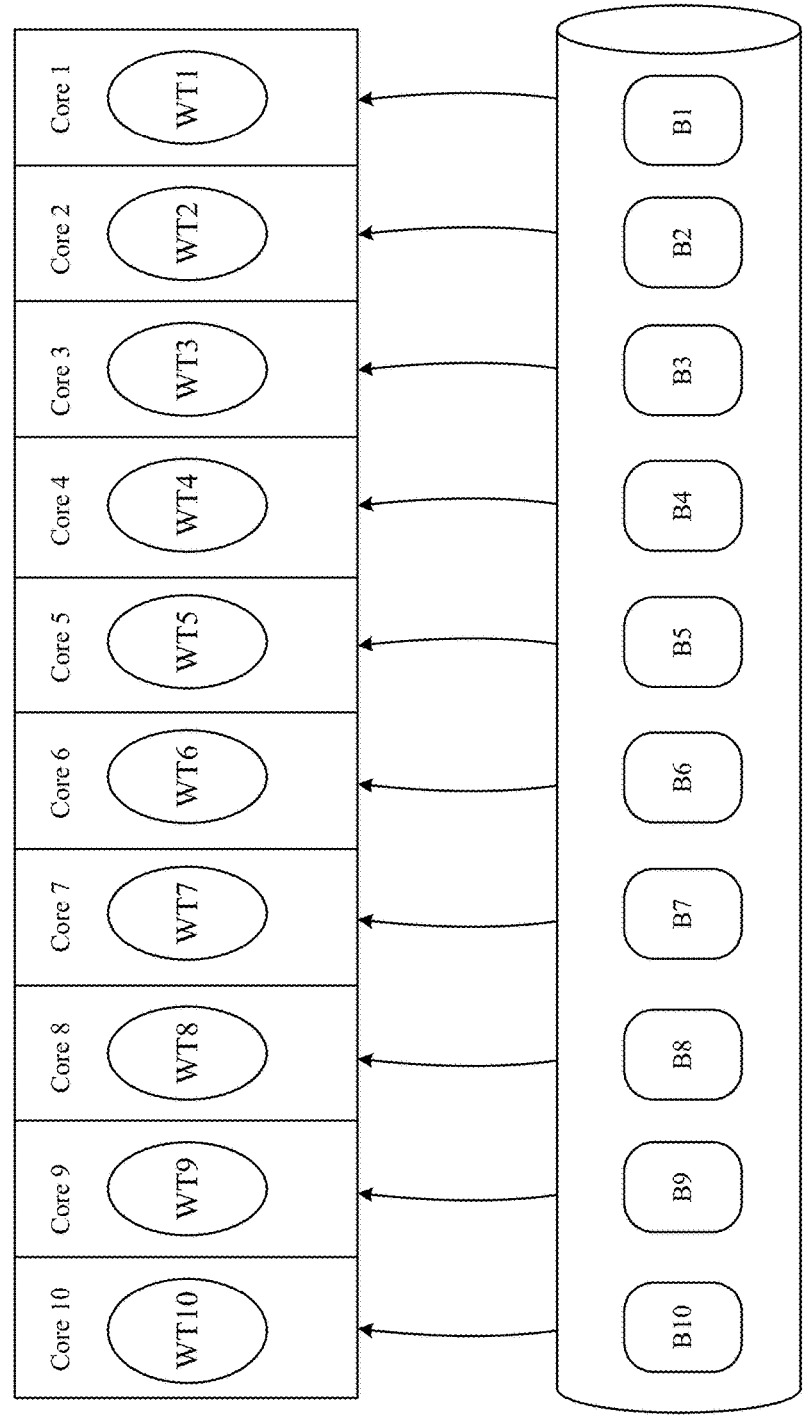
FIGS. 7A and 7B depict one implementation of using multiple worker threads to simultaneously process each of the bins.
Figure 7B:
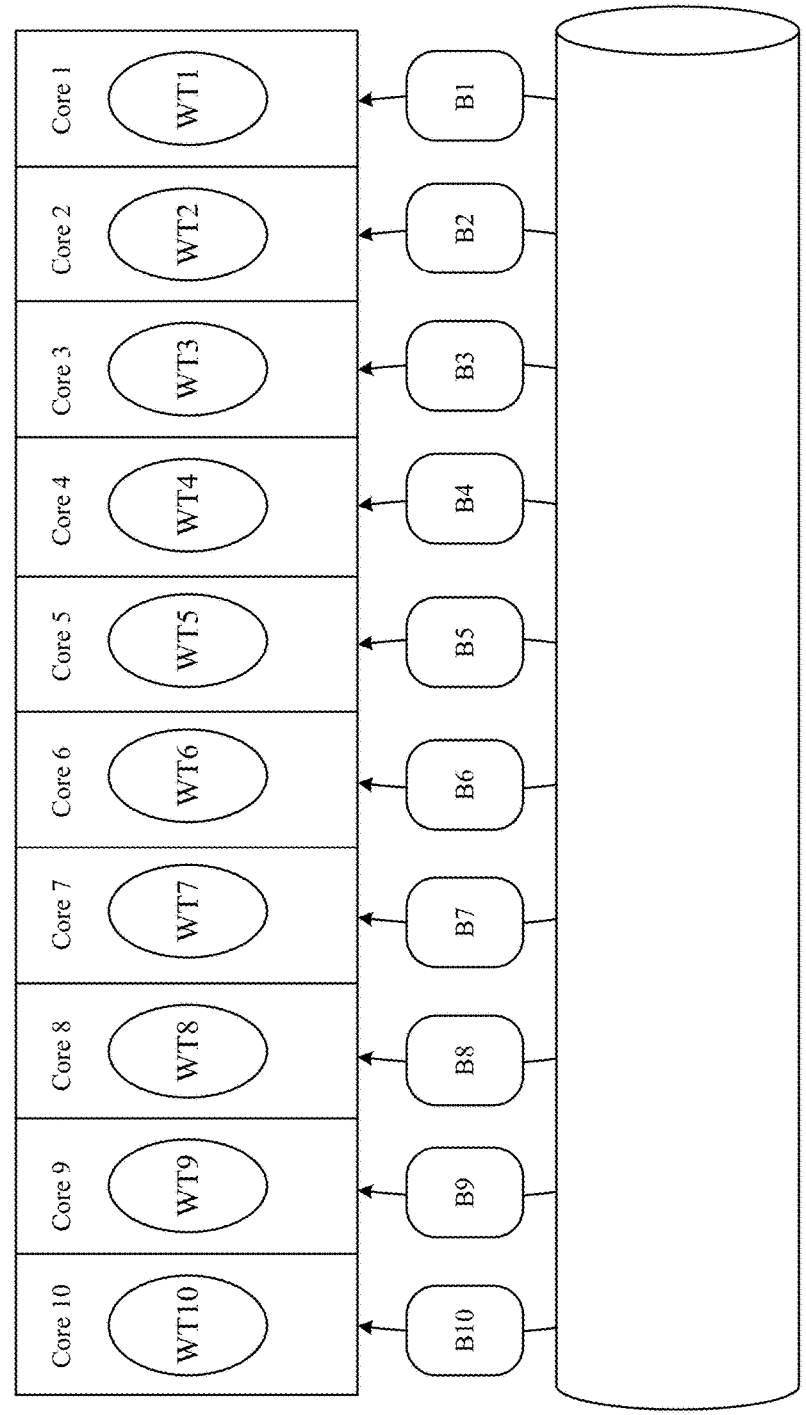

FIGS. 7A and 7B depict one implementation of using multiple worker threads (WTs) for simultaneously processing 700A-B each of the bins B1 to B10. FIG. 7A shows multiple worker threads WT1 to WT10 running on different processor cores 1-10. During processing 700A-B, a count of available worker threads WT1 to WT10 is compared against a number of the bins B1 to B10. In one implementation, when a count of available worker threads equals or exceeds the number of bins, the bins are concurrently processed at the available worker threads. In the example shown in FIG. 7B, the count of available worker threads is ten (worker threads WT1 to WT10) and the number of bins is also ten (bins B1 to B10). As a result, each of the bins B1 to B10 are concurrently dispatched and processed at each of the ten worker threads WT1 to WT10.

Figure 8A:
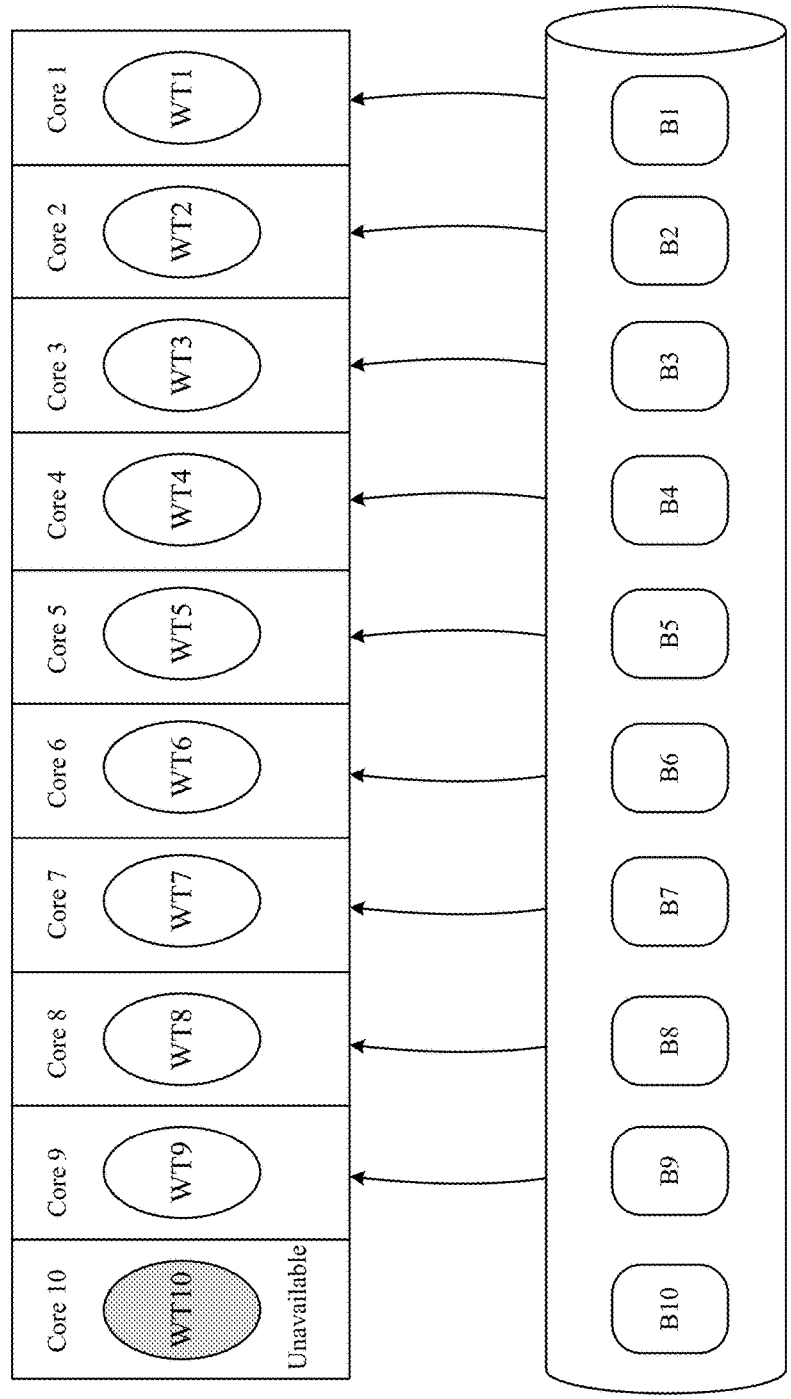
FIGS. 8A, 8B and 8C illustrate one implementation of multiplexing bins over worker threads.
Figure 8B:
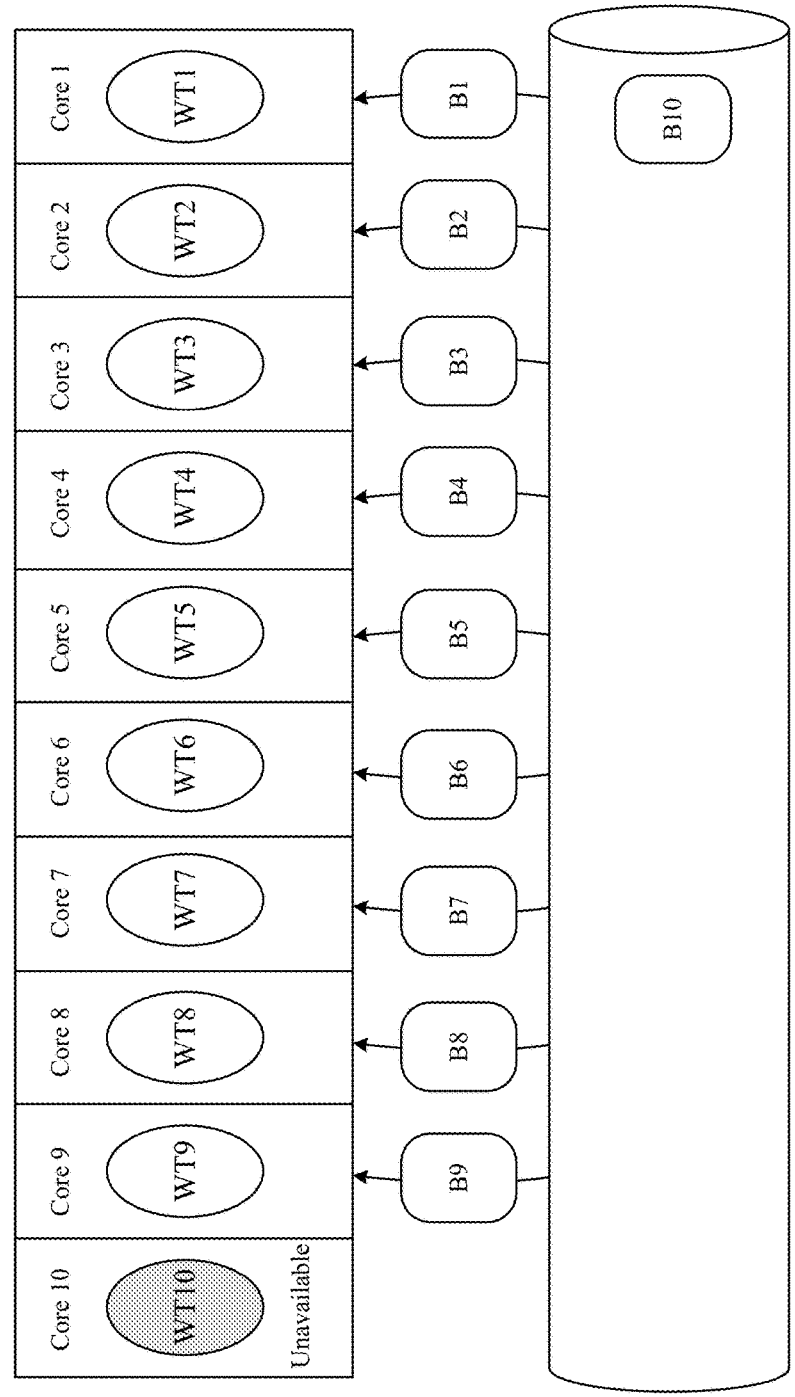
Figure 8C:
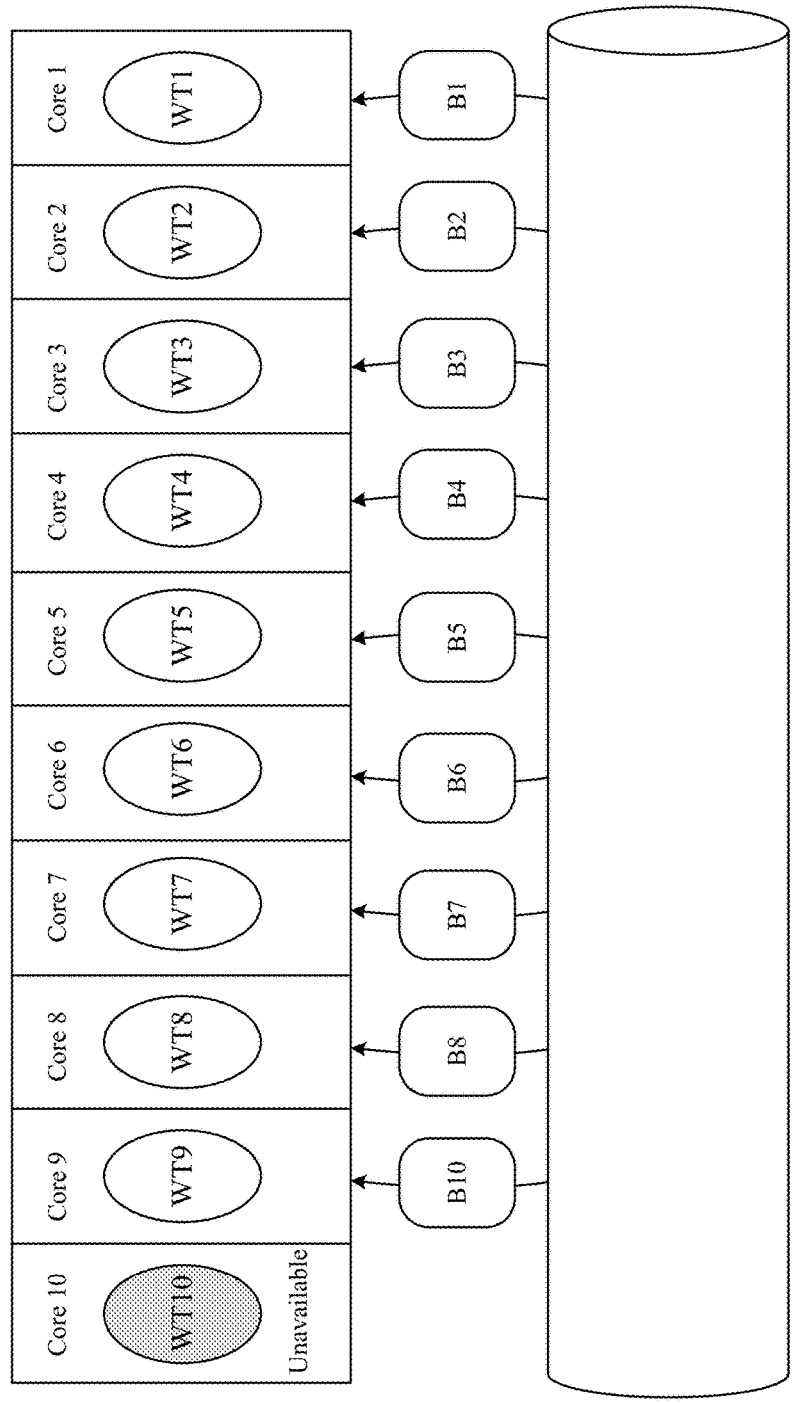

FIGS. 8A, 8B and 8C illustrate one implementation of multiplexing 800A-C bins over worker threads. In one implementation, when there are fewer available worker threads than the number of bins, the bins are multiplexed sequentially over the available worker threads. As shown in FIG. 8A, worker thread WT10 is unavailable. As a result, bins B1 to B9 are concurrently processed at respective worker threads WT1 to WT9 and when bin B9 completes processing at WT9 in FIG. 8B, bin B10 is processed at WT9 in FIG. 8C. In one numeric example, when 12 message batches are retrieved in response to 12 block queries issued for 12 bins and the count of available worker threads is 10, 10 bins are concurrently processed at the 10 available worker threads and some of the bins are multiplexed sequentially over at least 1 available worker thread.

Multi-Bin Multi-Threading

Figure 9:
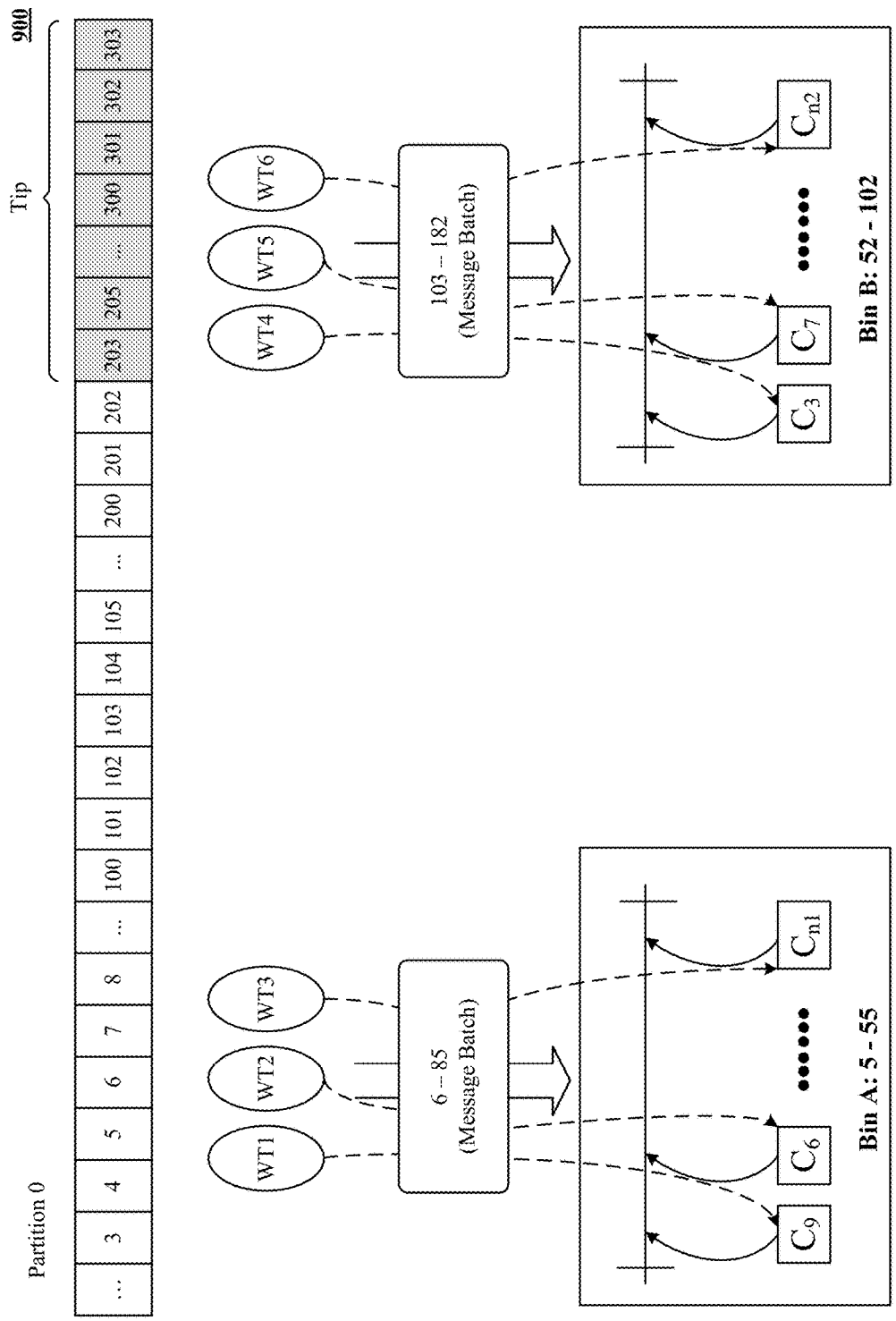
FIG. 9 is one implementation of using multiple worker threads to simultaneously stream message batches to clients in a particular bin.

FIG. 9 is one implementation of using multiple worker threads to simultaneously stream 900 message batches to clients in a particular bin. FIG. 9 depicts that message batch 6-85 is streamed to Bin A 5-55 and message batch 103-182 is streamed to Bin B 52-102. As shown in FIG. 9, three worker threads WT1, WT2 and WT3 are used to stream messages from the message batch 6-85 to clients $C_9$, $C_6$ and $C_{n1}$ of Bin A 5-55. Also, three other worker threads WT4, WT5 and WT6 are used to stream messages from the message batch 103-182 to clients $C_3$, $C_7$ and $C_{n2}$ of Bin B 52-102. In one numeric example, when the first and second message batches are retrieved in response to first and second block queries issued for first and second bins and a count of available worker threads is 8, 4 worker threads are used to simultaneously stream the first message batch to clients in the first bin and 4 worker threads are used to simultaneously stream the second message batch to clients in the second bin. This concurrent processing among the batches reduces the latency in a super scaled stream processing system by many folds.

Figure 10A:
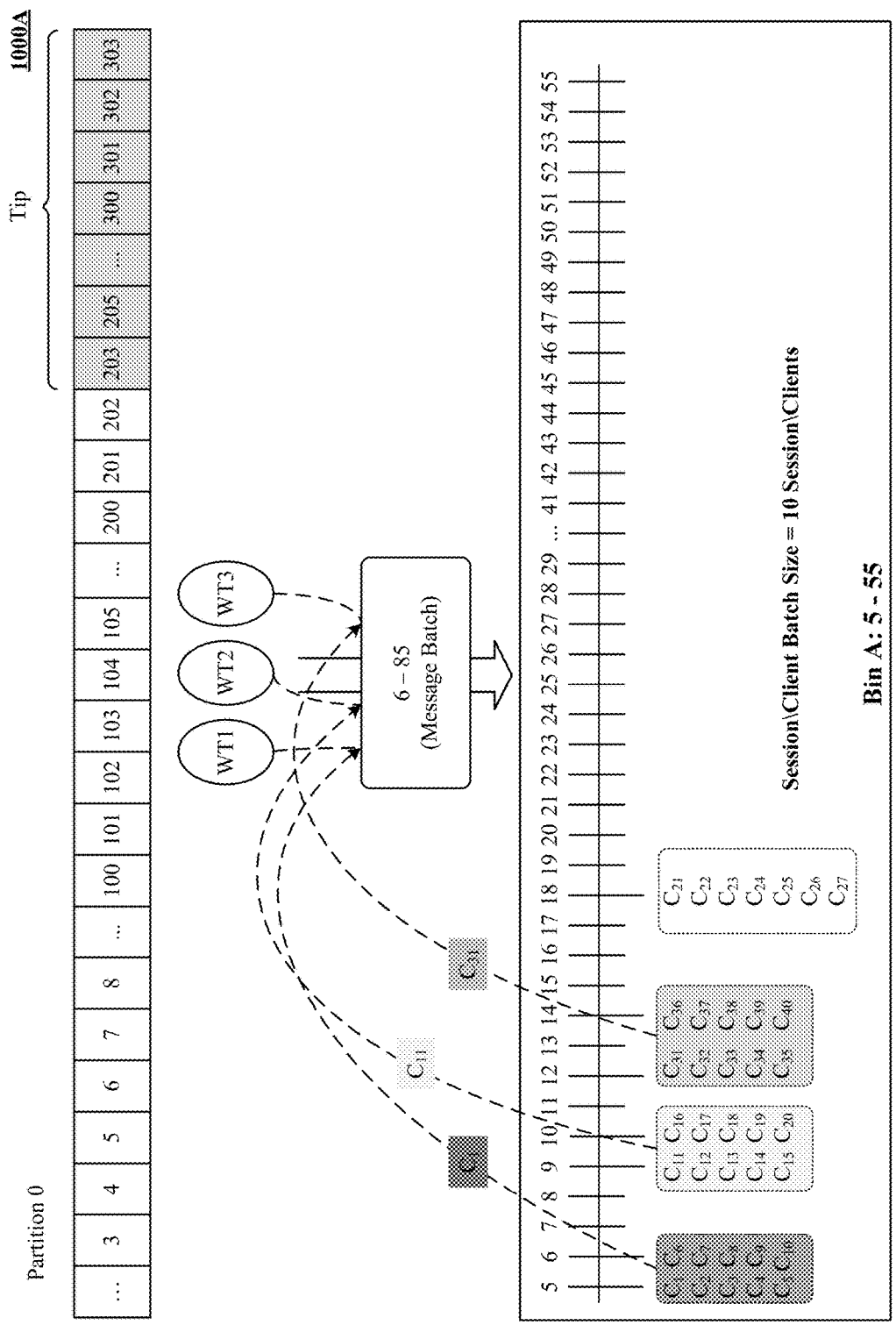
FIGS. 10A-10B illustrate one implementation of concurrently processing multiple session batches and simultaneously streaming message batches to each client in a particular session batch.
Figure 10B:
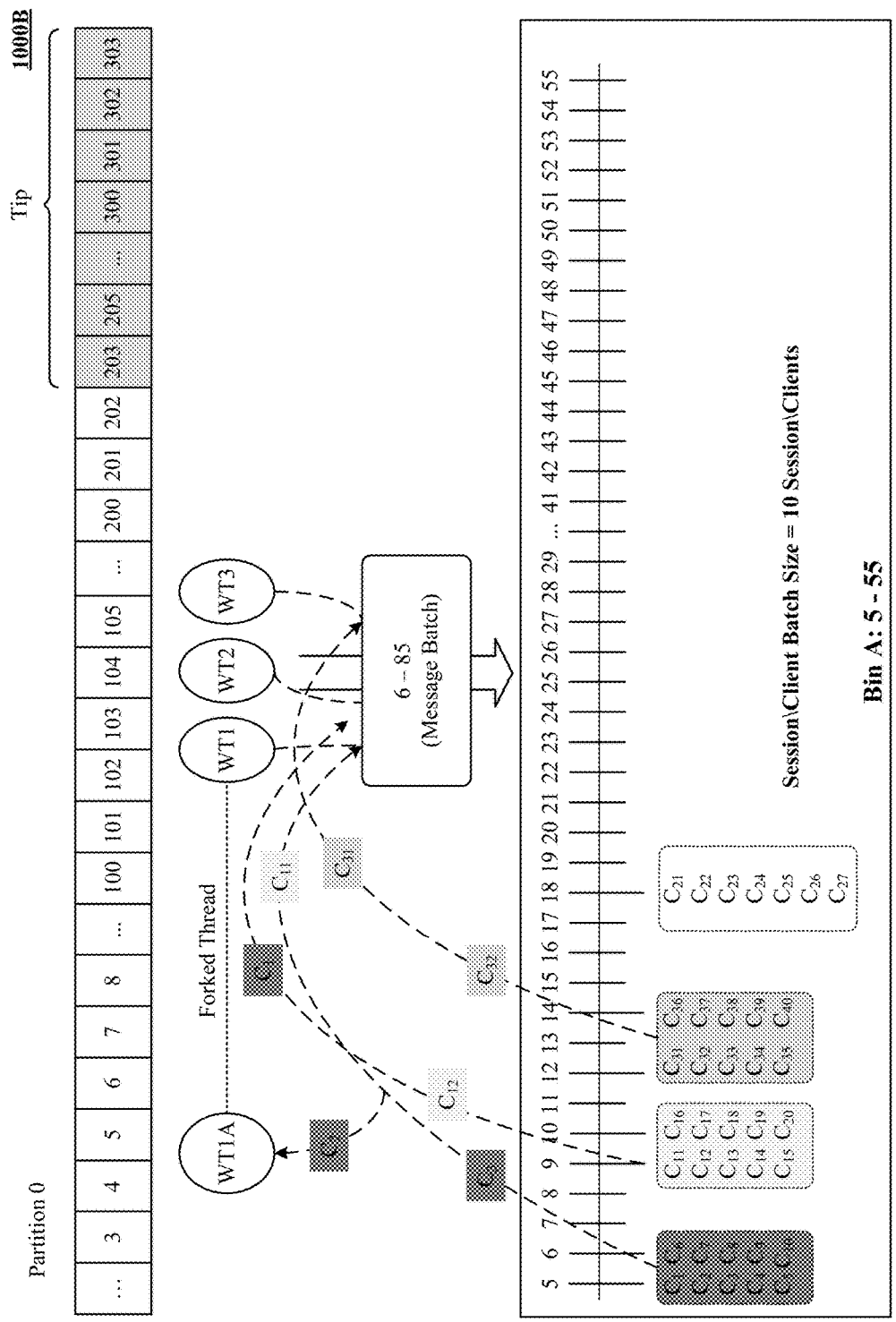

FIGS. 10A-10B illustrate one implementation of concurrently processing 1000A multiple session batches and simultaneously streaming 1000B message batches to each client in the particular session batch (SB). FIG. 10A shows that three worker threads WT1, WT2 and WT3 are used to stream messages from the message batch 6-85 to a plurality of clients in Bin A 5-55. Because FIGS. 10A-10B are architectural diagrams, certain details like the numerosity of the clients is scaled intentionally to improve the clarity of the description. In other implementations, Bin A 5-55 depicted in FIGS. 10A-10B includes tens, hundreds, thousands or millions of clients.

Per-Bin Multi-Threading

In FIG. 10A, the clients in Bin A 5-55 are grouped into session batches based on a preconfigured session batch size. FIG. 10A shows four exemplary session batches SB1, SB2, SB3 and SB4 of session batch size 10, i.e. 10 clients or subscription requests in each session batch 1. Other implementations include 200, 300 or 500 clients in each session batch. In yet other implementations, clients in Bin A 5-55 are grouped in tens, hundreds, thousands or millions of session batches. Further, session batches SB1, SB2, SB3 and SB4 are concurrently dispatched to worker threads WT1, WT2 and WT3 for simultaneous processing. In one implementation, the dispatching follows a natural ordering of respective message offsets of the session batches such that session batches at offsets 2 are processed immediately before session batches at offset 1 and so on. In other implementations, a plurality of session batches is appended at the same offset. In the simultaneous processing example shown in FIG. 10A, first worker thread WT1 processes clients from first session batch SB1, second worker thread WT2 processes clients from second session batch SB2 and third worker thread WT1 processes clients from third session batch SB3. During the processing, each of the worker thread streams messages from message batch 6-85 to clients in the respective session batches. In one implementation, worker thread filters out the messages that a given client has already received prior to streaming messages to the client from the message batch 6-85. This filtering is determined from the current message offset of the given client. This concurrent processing at the batch-level reduces the latency in a super scaled stream processing system by many folds.

FIG. 10B shows one implementation of simultaneously streaming 1000B message batches to each client in the particular session batch using the generated new worker threads. FIG. 10A shows that first worker thread WT1 is sequentially processing clients (e.g., client C0 from session batch SB1. In FIG. 10B, WT1 forks out to generate a new worker thread WT1A. In other implementations, multiple new worker threads are forked out. The new forked out worker threads start processing clients in the give session batch so that multiple clients or subscription requests (e.g., clients $C_1$, $C_2$, and $C_3$) are simultaneously streamed messages from message batch 6-85. In particular, this prevents a lagging client from slowing down the processing. In one implementation, the original and new forked out worker threads share a thread pool and utilize a fork-join framework. This concurrent processing at the session batch-level reduces the latency in a super scaled stream processing system by many folds. Furthermore, when a bin advances after message delivery, clients of the bin are regrouped in the advanced bin as session batches.

In one numeric example, when the preconfigured session batch size is fifteen hundred, the particular bin has a bin offset range 800-900, the particular bin includes five thousand clients with one thousand clients receiving messages starting from message offset 806, one thousand clients receiving messages starting from message offset 808, one thousand clients receiving messages starting from message offset 810, one thousand clients receiving messages starting from message offset 812 and one thousand clients receiving messages starting from message offset 814 and the count of available worker threads is 4, one thousand clients receiving messages starting from message offset 806 and five hundred clients receiving messages starting from message offset 808 in are clustered a first session batch, clustering five hundred clients receiving messages starting from message offset 808 and one thousand clients receiving messages starting from message offset 810 are clustered in a second session batch, clustering one thousand clients receiving messages starting from message offset 812 and five hundred clients receiving messages starting from message offset 814 are clustered in a third session batch, and clustering five clients receiving messages starting from message offset 814 are clustered in a fourth session batch. Further, the first, second, third, and fourth session batches are concurrently processed at the 4 available worker threads.

Coalescing

Figure 11A:
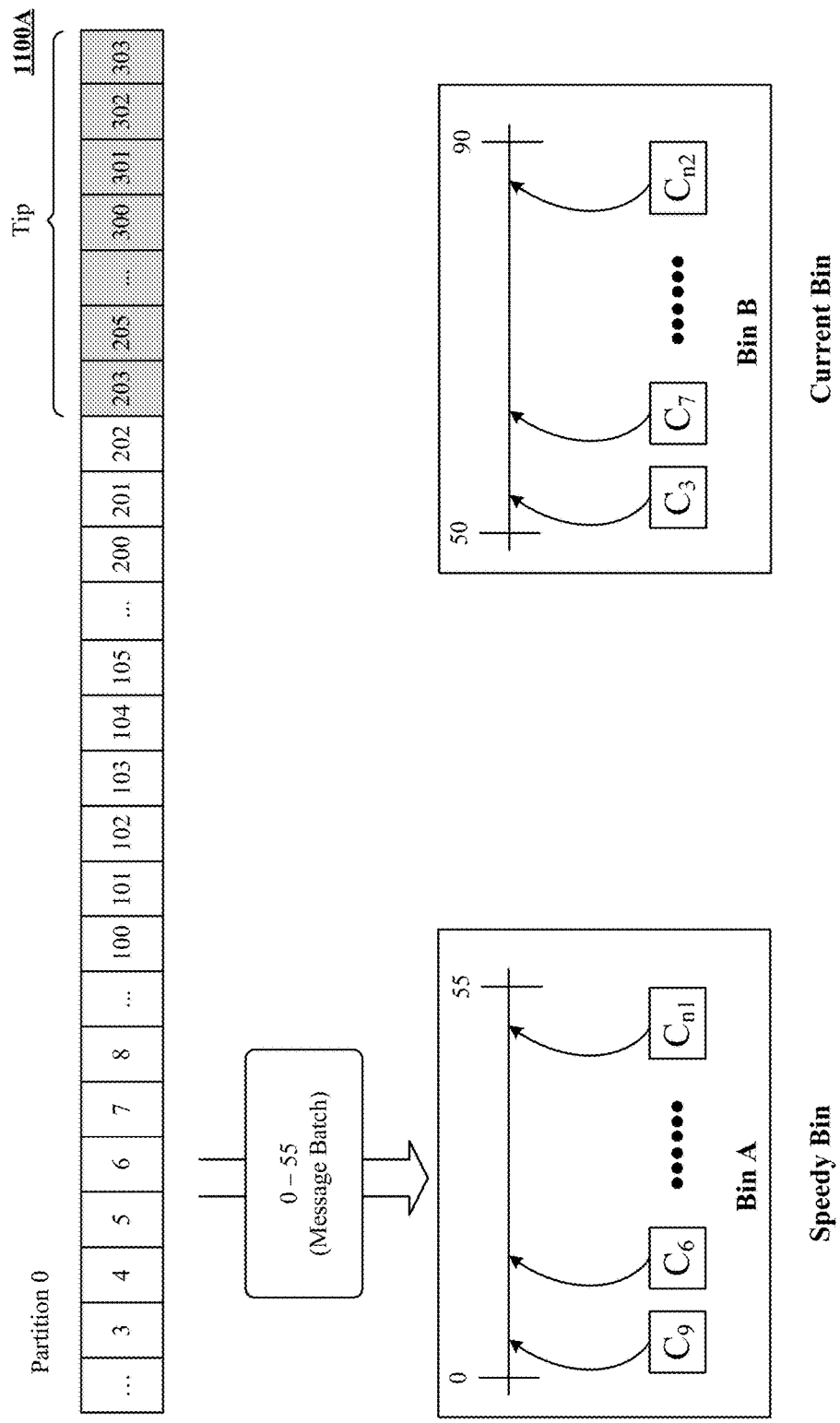
FIGS. 11A, 11B, 11C and 11D depict one implementation of bin coalescing.
Figure 11B:
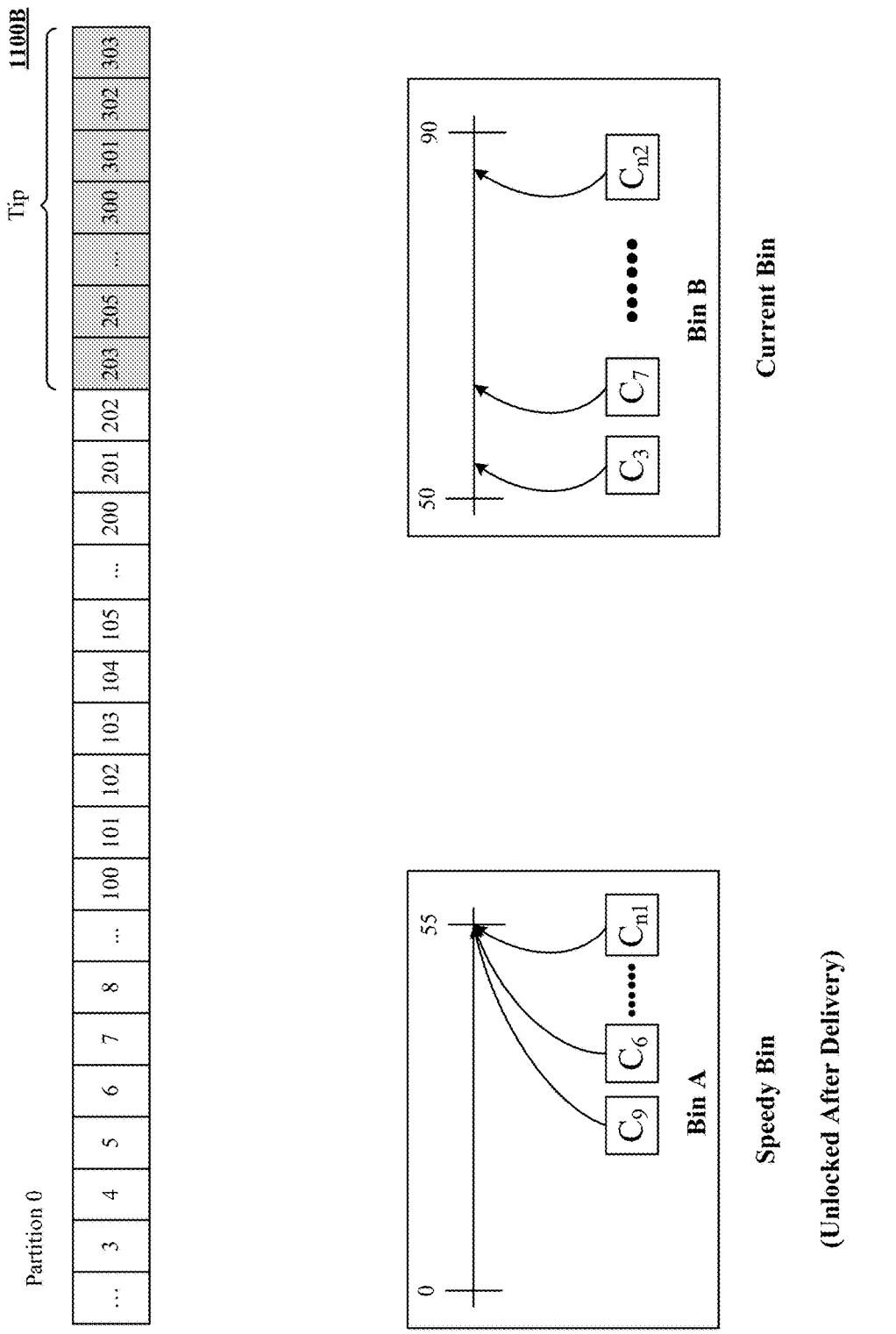

FIGS. 11A, 11B, 11C and 11D depict one implementation of bin coalescing 1100A-C. The technology disclosed uses this coalescing teaching to significantly reduce the number of bins in the system so as to further reduce the number of block queries to the unbounded data stream. The coalescing thus provides additional efficiency to the read scheduling of the data stream. In FIG. 11A, a speedy Bin A is overtaking a more current Bin B with more current message offsets than the speedy Bin A. Bin A is the speedy bin because it has an end offset that greater that the start offset of Bin B, which has an end offset greater than the end offset of Bin A. In one implementation, the overtaking is handled by coalescing the speedy Bin A with the more current Bin B. This results in a deduction in the number of bins in the system, thereby further reducing block queries to the data stream. In one implementation, the speedy Bin A starts overtaking more current Bin B after delivery of message batch 0-55. Therefore, one trigger for bin coalescing is when a bin is delivered or stream messages of a message batch. Thus, after each message batch delivery, the system checks whether there are any bins that could be coalesced so that the block queries could be further reduced and the read scheduling to the data stream be more efficient.

As discussed supra, the system checks for coalescing after streaming a message batch to clients in the speedy bin. In the example shown in FIG. 11B, speedy Bin A received messages from message batch 0-55 in FIG. 11A. As a result, speedy Bin A's clients $C_9$, $C_6$ and $C_{n1}$ are all at the message offset 55. At this point after the message delivery, the system checks whether Bin A can be coalesced with any other existing and more current bin. In the example shown in FIG. 11B, Bin B's end offset 90 is greater than Bin A's end offset 55, thus making Bin A the more current bin. In addition, Bin A's end offset 55 is greater than Bin B's start offset, thus making Bin B an overlapping speedy bin. In yet other implementations, the coalescing is triggered when a number of messages between respective end offsets of the speedy bin and the more current bin is equal to or less than a preconfigured bin size. In the example shown in FIG. 11B, the preconfigured bin size is 50 and the different between the end offsets of speedy Bin A and more current Bin B is 45, thus making it a trigger for coalescing. In another implementation, the coalescing is triggered when the speedy bin and the more current bin are not locked. In a further implementation, the speedy bin and the more current bin are locked during the coalescing.

Figure 11C:
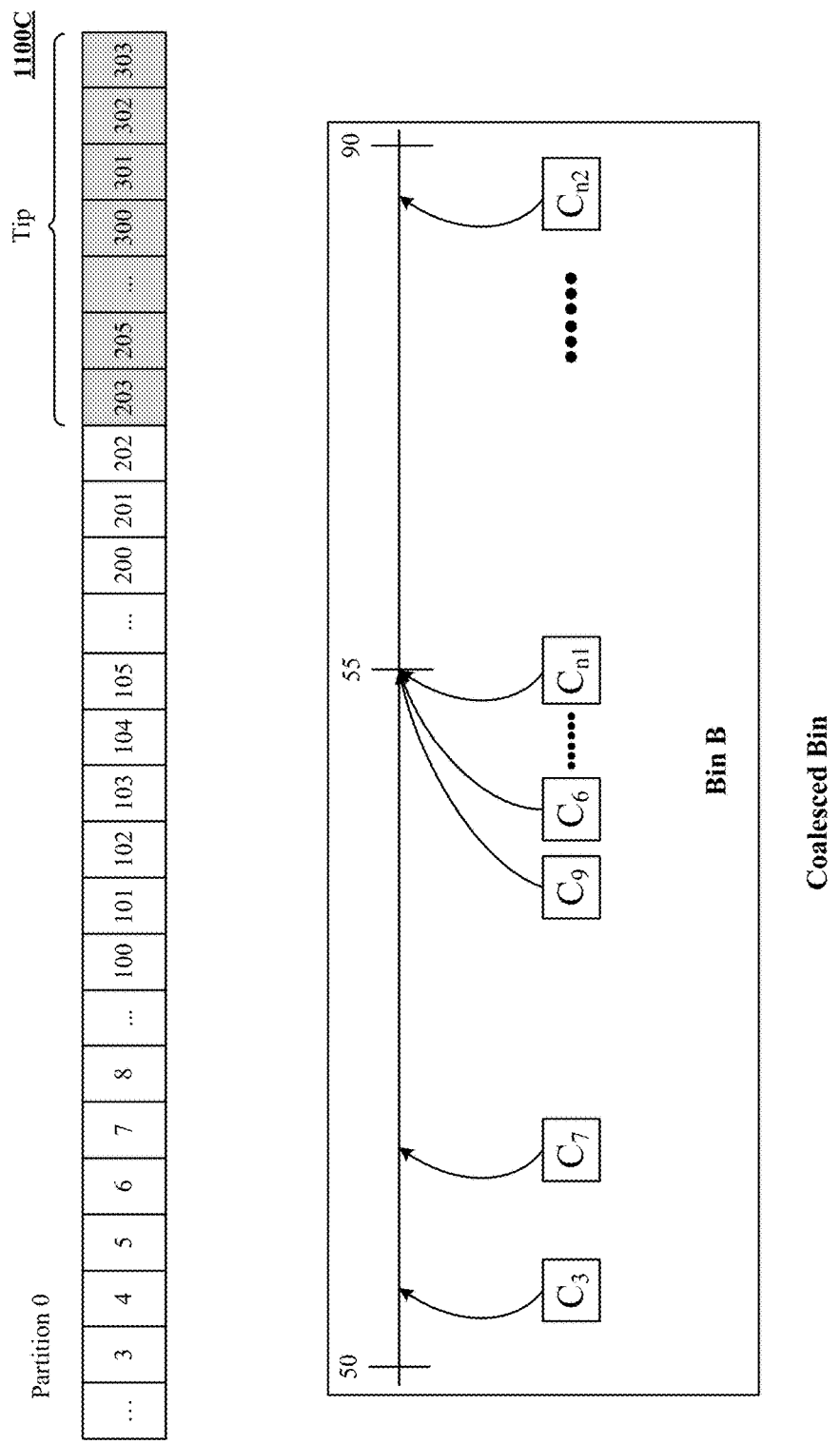
Figure 11D:
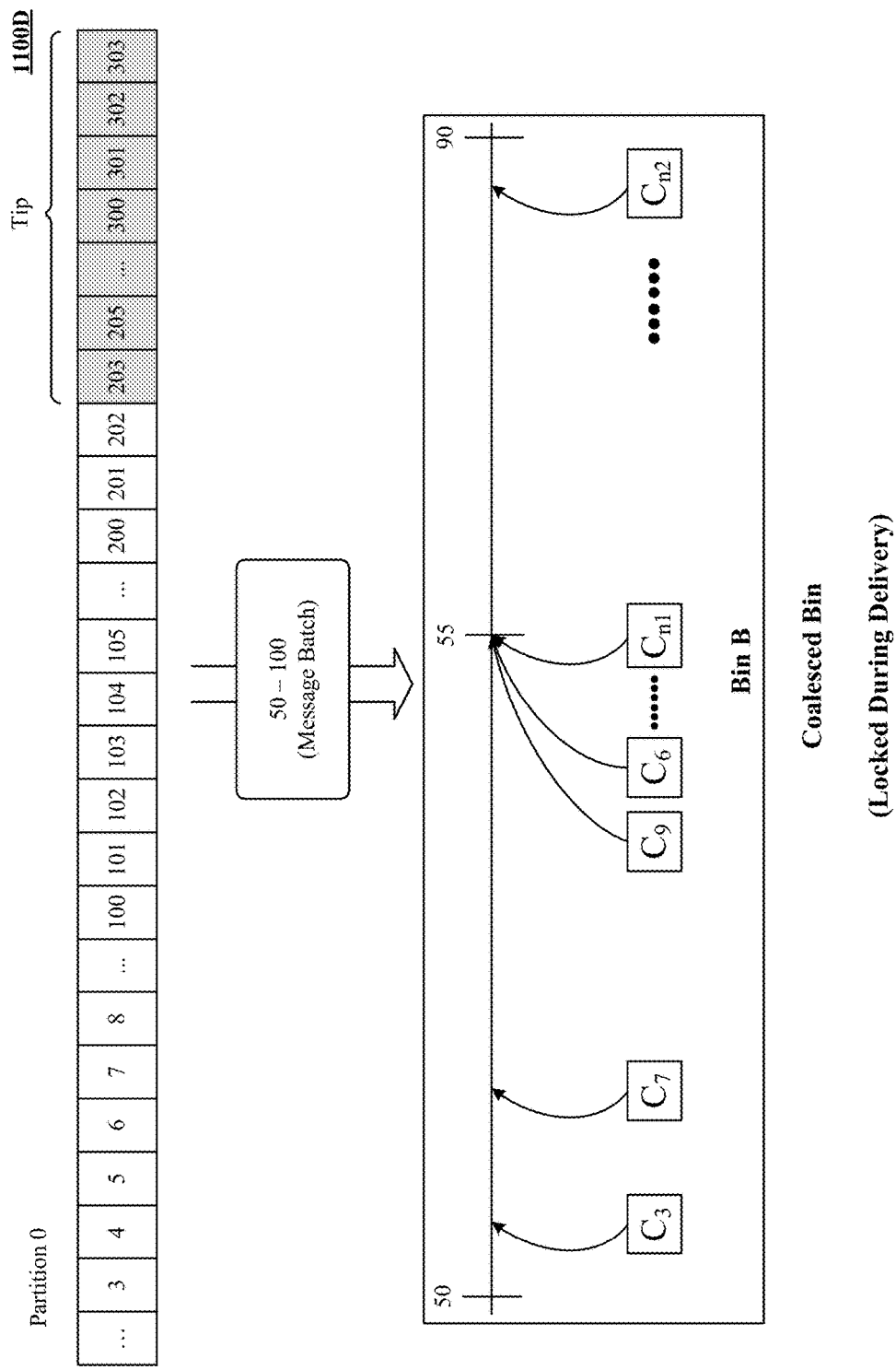

FIG. 11C depicts one implementation of a coalesced bin. In one implementation, clients from the speedy bin are regrouped into the more current bin as session batches. In another implementation, the speedy bin is deleted after the coalescing and locked during the deletion. Yet other implementations include handling a speedy bin that is overtaking a more current bin with more current message offsets than the speedy bin by coalescing the more current bin with the speedy bin, thereby further reducing block queries to the data store. In this implementation, clients from the more current bin into the speedy bin as session batches and the more current bin is deleted after the coalescing and locked during the deletion. In some implementations, the coalescing is triggered when the speedy bin and the more current bin are not locked.

In yet other implementations, the coalescing is triggered when a current actual end offset of a more current bin is within a current nominal end offset of a speedy bin. In such implementations, a current actual end offset of a particular bin identifies a most recent greatest message offset streamed to at least one client in the particular bin. In one numeric example, when a current nominal bin offset range of a speedy bin is 145-195, a current nominal bin offset range of a more current bin is 155-205 and a current actual bin offset range of the more current bin is 155-160, the more current bin is coalesced with the speedy bin and at offsets is 155-160 of the speedy bin, clients from the more current bin are regrouped into the speedy bin as session batches.

In yet other implementations, the coalescing is triggered when an existing client drops out of a particular bin. When such an event happens, current message offsets of other clients remaining in the particular bin are checked. Further, if it is determined that either a current actual start offset or a current actual end offset of the particular bin is within a more current bin's current bin offset range, the particular bin is coalesced with the more current bin. In one numeric example, when a message offset of the existing client that dropped out of the particular bin was 820, a current actual bin offset range of the particular bin is 845-870 and a current bin offset range of the more current bin is 850-900, the particular bin is coalesced with the more current bin and, at offsets 845-870 of the more current bin, clients from the particular bin are regrouped into the more current bin as session batches.

In one implementation, a periodic coalescing is performed irrespective of the message delivery. This so-called "global coalescing check" periodically checks the offsets of all existing bins in the system and determines whether one or more bins can be coalesced. In one implementation, two bins are coalesced into a single bin. In other implementations, more than one bin, i.e. a plurality or a multitude of bins like one, five, ten, hundred or more are coalesced into a single bin.

Rebinning

Figure 11E:
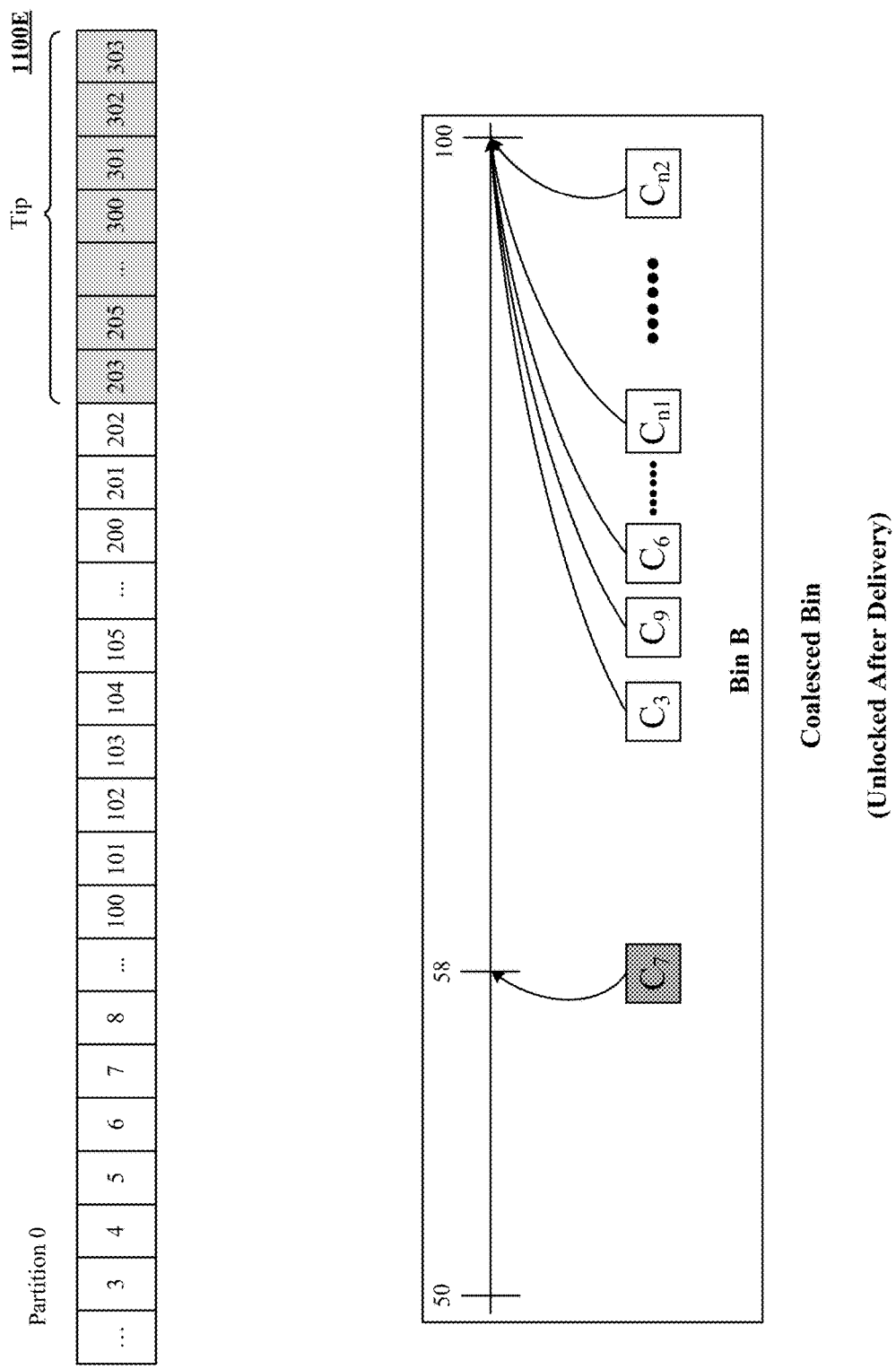
FIGS. 11E and 11F show one implementation of rebinning.
Figure 11F:
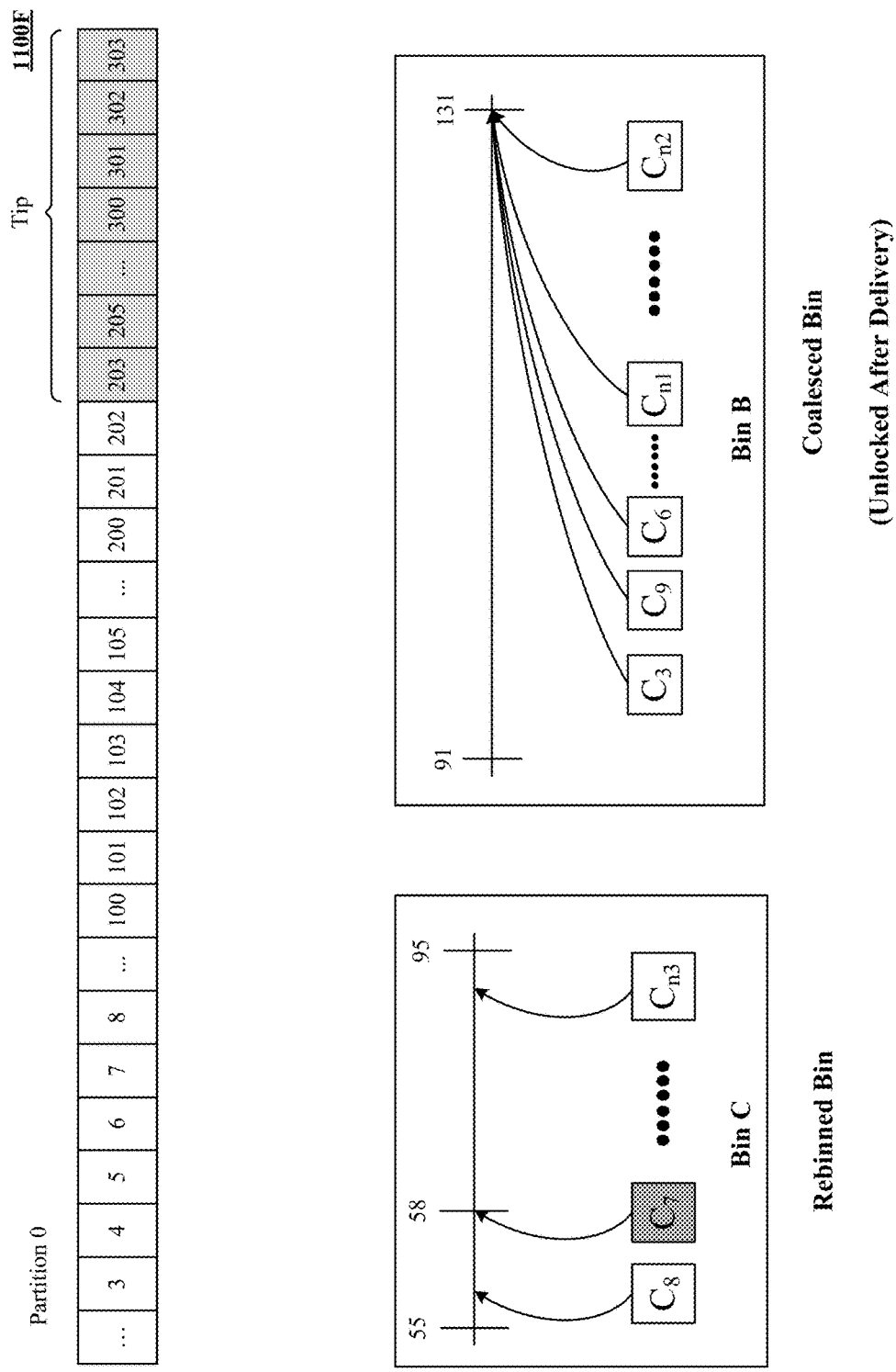

FIGS. 11E and 11F show one implementation of rebinning 1100E-F. The technology disclosed uses rebinning to prevent introduction of system latency by slow or lagging clients who are not consuming messages or events as fast as other clients, or who are offline or have either failed or crashed. Rebinning allows for quick reclustering of the slow or lagging clients from an initial bin to a final bin. The reclustering prevents allows the worker threads streaming messages to the clients in the initial bin to not wait for the slow or lagging clients to start consuming messages. Instead, the slow or lagging clients are rebinned to the final bin, thus allowing the worker threads of the initial bin to process other non-slow or non-lagging bins in the initial bin. In one implementation, the initial bin is a more current bin than the final bin.

In some implementations, the technology disclosed monitors the transport queue of each individual client to periodically determine whether the queue is active or blocked. This queue is configured to include two message batches worth of messages, according to one implementation. Thus, when a particular client's transport queue gets blocked either due the client being offline or a failure, the system can identify and categorize the particular client as a slow or lagging client. Once a slow or lagging client is discovered, the rebinning is triggered. In some implementations, before triggering the rebinning, the system checks whether the transport queue has become unblocked. In FIG. 11E, client $C_7$ is the slow bin because all the clients in Bin B have progressed to offset 100 but client $C_7$ is still at offset 58. As a result, the rebinning is triggered in FIG. 11F during which the system is scanned to see which existing bin has a bin offset range that includes the slow or lagging client's offset. If such a bin is found, then the slow client is rebinned to this existing bin. If such a bin is not found, then a new bin is created for the slow or lagging client and the slow or lagging client is regrouped into this new bin. In the example shown in FIG. 11F, for the slow client $C_7$, there was an existing Bin C that included slow client $C_7$'s offset. Consequently, slow client $C_7$ is rebinned in Bin C. In some implementations, the bin receiving the slow bin is locked during the rebinning.

Caching

Figure 12:
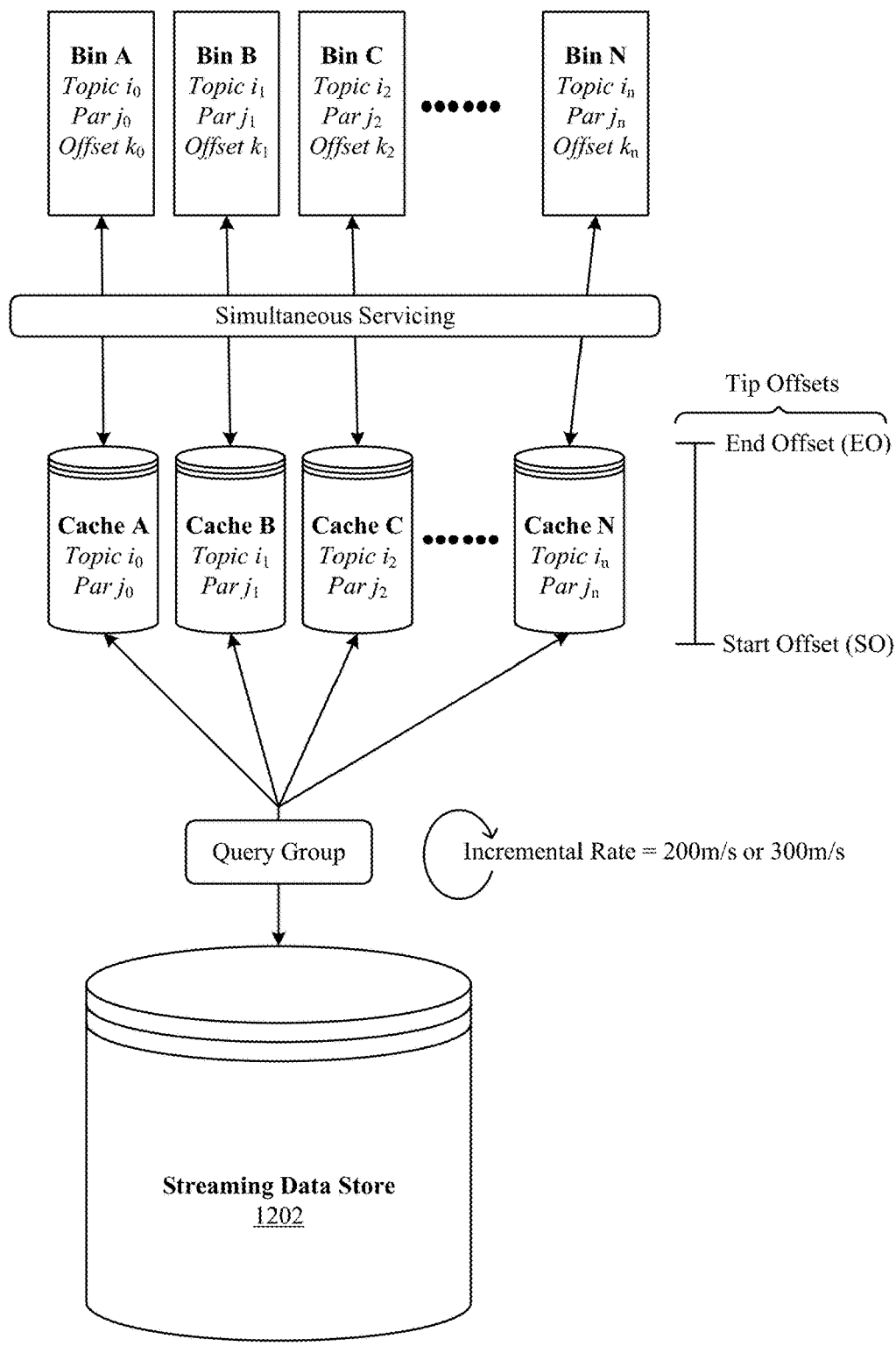
FIG. 12 illustrates one implementation of servicing a plurality of client bins using tip-populated caches established in a stream processing system.

FIG. 12 illustrates one implementation of servicing a plurality of client bins using caches in a stream processing system 1200. FIG. 12 only shows an architectural level schematic of a stream processing system in accordance with an implementation. Because FIG. 12 is an architectural diagram, certain details are intentionally omitted to improve the clarity of the description. In some implementations, system 1200 includes tens, hundreds, thousands or millions of bins, clients and caches. In other implementations, system 1200 may not have the same elements as those listed above and/or may have other/different elements instead of, or in addition to, those listed above.

As discussed supra with regards to description of FIG. 3, the technology disclosed has discovered that in stream processing systems, at any given time, the majority of clients rapidly converge towards the tip. Further, the prime observation that is deduced from this discovery is that the next time when clients are streamed messages, majority of the clients (e.g., nine hundred and ninety thousand out of a million) can be served just from the tip, with only a fraction of the clients requesting data from an offset that is not included in the tip. Accordingly, the technology disclosed puts forth a cache based technical solution in which caches are maintained just for the tips of unbounded data streams so that majority of the bins are served from the cache using group queries instead of the backend unbounded data stream or data store.

FIG. 12 shows a plurality of client bins issuing a multitude of queries. The queries include a topic-partition pair (Topic $i_{0-n}$, Par $j_{0-n}$) and start offsets (Offset $k_{0-n}$) that reference events in an unbounded event stream. The plurality of the queries include start offsets that reference current offsets of an unbounded data stream comprising a tip of most recent events. In one implementation, the start offsets mixing historical offsets and current offsets. A cache hit occurs when the topic-partition pair and start offsets requested by a bin are found in an active cache, while a cache miss occurs when the requested topic-partition pair and start offsets cannot be found. Cache hits are served by reading data from the cache, which is faster than recomputing a result or reading from a slower streaming data store 1202; thus, the more requests can be served from the cache, the faster the system performs.

In one implementation, separate caches are established for active, unique topic-partition pairs requested by the client bins. In the example shown in FIG. 12, Cache A is established for Bin A with topic-partition pair (Topic $i_0$, Par $j_0$) and start offset (Offset $k_0$), Cache B is established for Bin A with topic-partition pair (Topic $i_1$, Par $j_1$) and start offset (Offset $k_2$), Cache C is established for Bin C with topic-partition pair (Topic $i_2$, Par $j_2$) and start offset (Offset $k_3$) and Cache N is established for Bin N with topic-partition pair (Topic $i_n$, Par $j_n$) and start offset (Offset $k_n$).

Each of the caches includes the most recent events or messages that are part of the tip of the partitions associated with respective caches. A cache size of each separate cache is preconfigured based at least on number of bytes and number of events. In some implementations, the caches are periodically updated to include the tip offsets for the corresponding partitions by performing query increments that request data not already present in the caches. In some implementations, the data requested by the query increments include most recent events from the tip. In one implementation, the query increments are grouped across topic-partition pairs into a query group. In some implementations, the query increments are determined at 300 m/s intervals. In other implementations, the query increments are determined at 200 m/s intervals. Further, the query group is submitted to the streaming data store 1202 that provides access to one or more unbounded data streams. Then, stream data is received in response to the query group. In one implementation, larger data blocks are retrieved from the streaming data store 1202 responsive to historical offsets and smaller data blocks are retrieved from the caches responsive to current offsets. In one implementation, the historical offsets of the unbounded data stream are periodically persisted in a stable storage like HBase™, Hadoop™, etc.

Advancing further, the caches are updated for the topic-partition pairs based on the retrieved data. Once the caches are updated, the multitude of queries from the bins is simultaneously served with the corresponding data they requested. In one implementation, some or all of the caches are periodically expired when parts of data in a particular cache reaches an expiry date-time or when the particular cache reaches an inactivity threshold. For instance, when a cache maintains a set of events for a certain time period, the events are no longer considered current and such a cache is expired. In another example, if a cache has a topic-partition pair that is not queried by any bin for a certain time period, then such a cache is considered inactive and thus expired.

In one implementation, the current offsets maintained by the separate caches for respective topic-partition pairs have varying start and end offsets. For instance, in FIG. 12, Cache A includes offsets 600-900 for topic 1 and partition 9, Cache B includes offsets 900-100 for topic 10 and partition 6, Cache C includes offsets 450-500 for topic 19 and partition 50 and Cache N includes offsets 782-1082 for topic 2145 and partition 1011.

Cache Miss Handling

Figure 13:
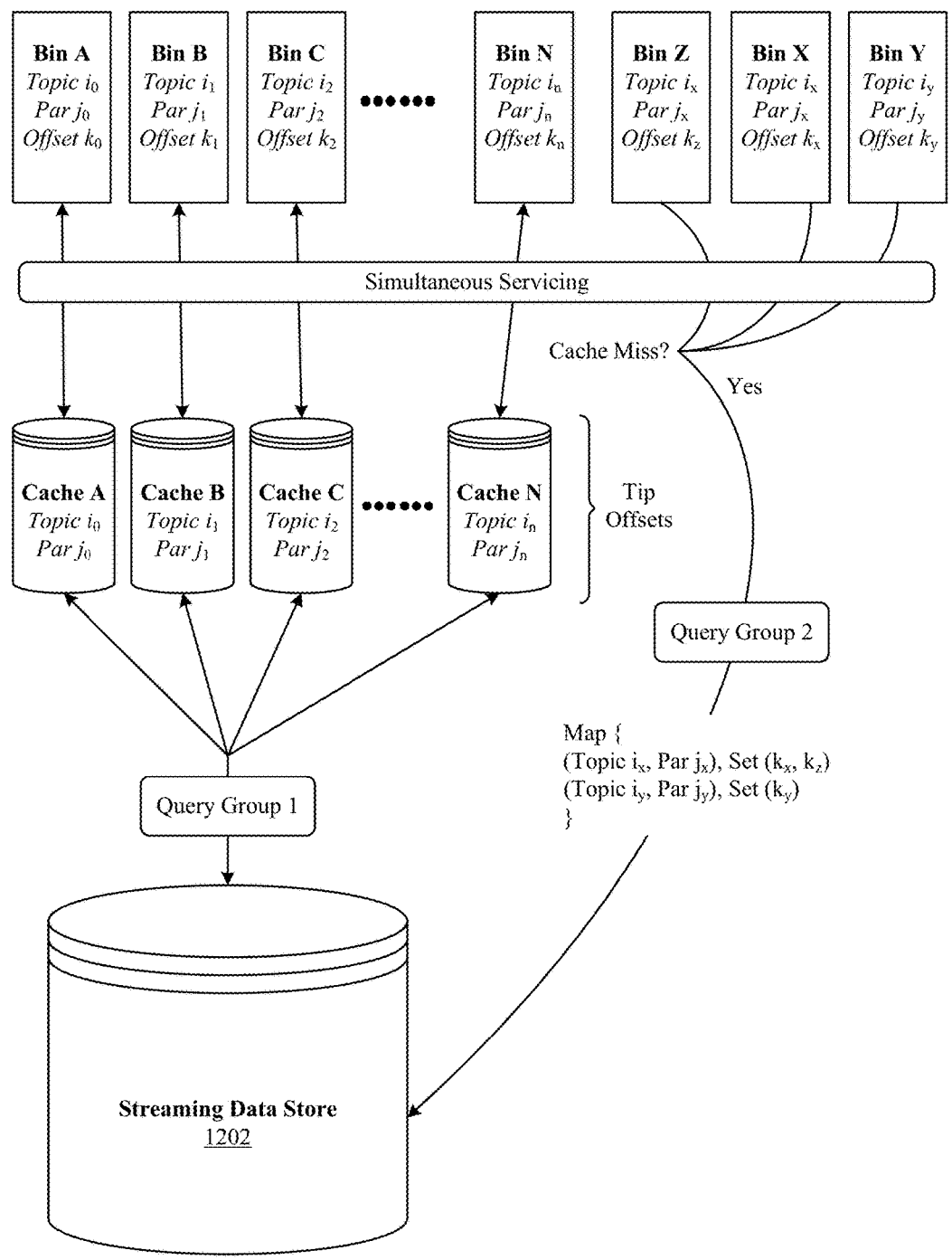
FIG. 13 depicts one implementation of handling a cache miss caused by queries that refer to inactive topic-partition pairs for which there are no established caches.

FIG. 13 illustrates one implementation of handling 1300 a cache miss caused by queries that refer to inactive topic-partition pairs for which there are no established caches. FIG. 13 shows that Bins Z, X and Y have requested topic-partition pairs (Topic $i_z$, Par $j_z$), (Topic $i_x$, Par $j_x$) and (Topic $i_y$, Par $j_y$) that are not currently maintained by the active Caches A, B, C and N. As a result, the queries issued by Bins Z, X and Y are not responded to by the caches and instead they have to be responded to by the streaming data store 1202.

However, the technology disclosed adds another layer of efficiency in the event of cache misses by grouping the multitude of queries across the inactive topic-partition pairs into a query group 2 and submitting the query group 2 to the streaming data store 1202. As shown in FIG. 13, query group 2 collectively refers to the topic-partition pairs and offsets requested by the Bins Z, X and Y that caused the cache misses. Then, stream data is received in response to the query group 2. In one implementation, the stream data includes large data blocks of data retrieved from the streaming data store 1202. Further, the multitude of queries from the bins is simultaneously served using the large data blocks.

Figure 14:
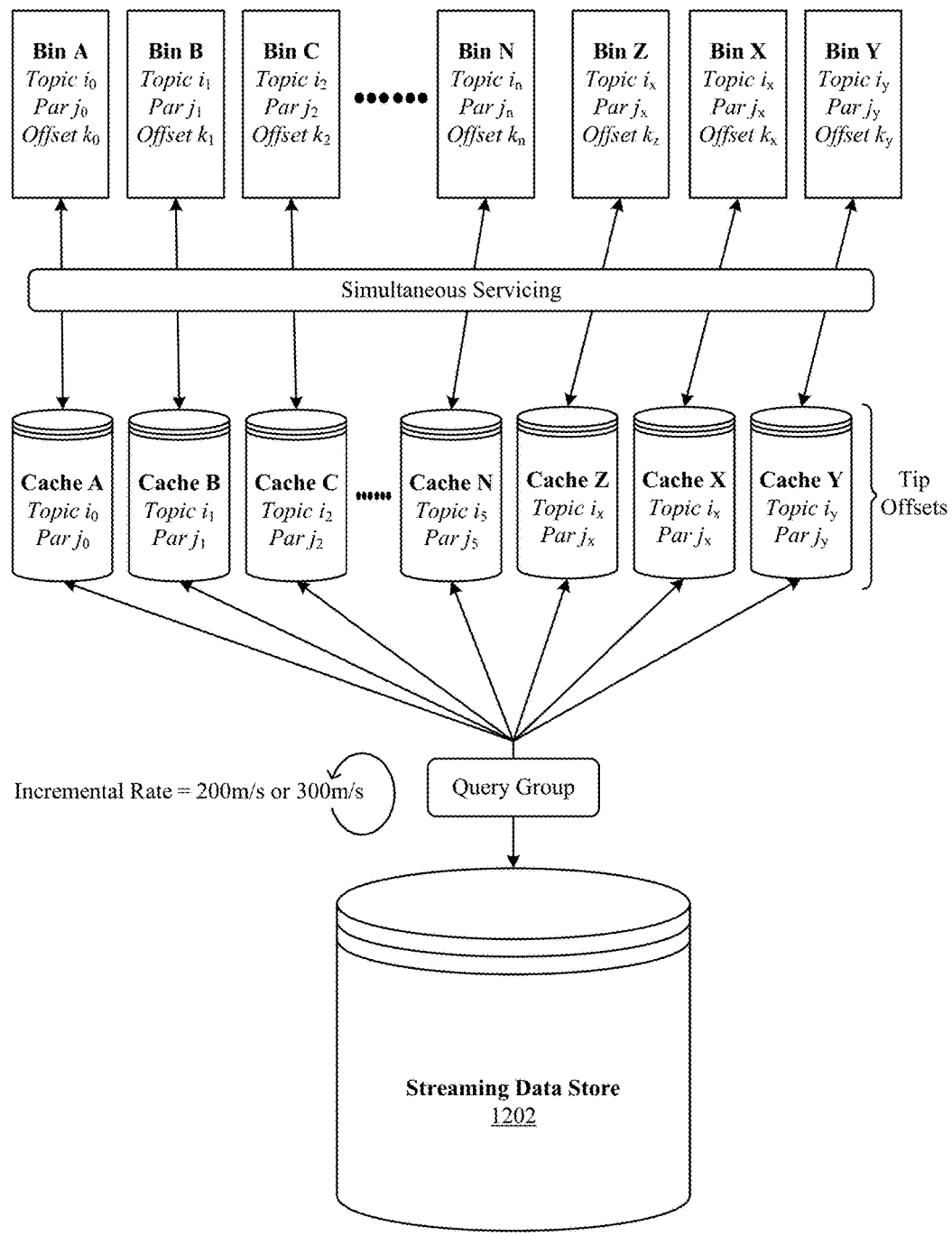
FIG. 14 is one implementation of establishing new separate caches for inactive topic-partition pairs to prevent subsequent cache misses.

In some implementations, as shown in FIG. 14, new separate caches are established 1400 for each of the inactive topic-partition pairs (Topic $i_z$, Par $j_z$), (Topic $i_x$, Par $j_x$) and (Topic $i_y$, Par $j_y$) to prevent subsequent cache misses. In FIG. 14, new Caches Z, X and Y are created with for Bins Z, X and Y that previously caused the cache miss in FIG. 13.

Figure 15:
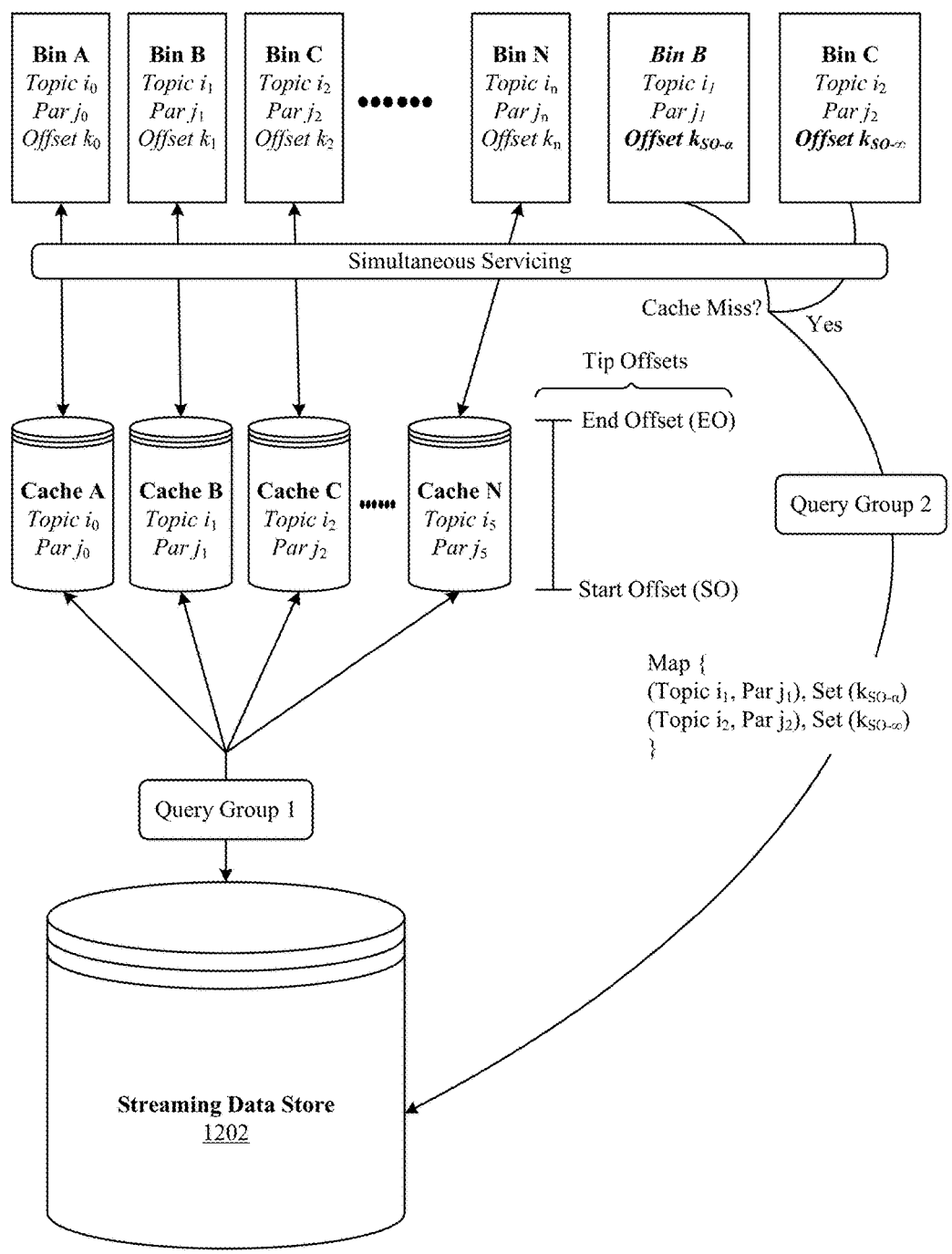
FIG. 15 illustrates one implementation of handling a cache miss caused by queries that reference expired start offsets for active, unique topic-partition pairs.

FIG. 15 illustrates one implementation of handling 1500 a cache miss caused by queries that reference expired start offsets for active, unique topic-partition pairs. In one implementation, the expired start offsets are below respective start offsets of current offsets maintained by separate caches established for respective active, unique topic-partition pairs. As shown in FIG. 15, even though Caches B and C have topic-partition pairs (Topic $i_1$, Par $j_1$), (Topic $i_2$, Par $j_2$) requested by Bins B and C, expired offsets $k_{SO-\alpha}$ and Offset $k_{SO-\infty}$ are not maintained by the tip offsets of Caches B and C. Further, the start offsets (SOs) of the tip offsets of Caches B and C are greater than the expired offsets $k_{SO-\alpha}$ and Offset $k_{SO-\infty}$. At this point, the cache misses are handled by grouping the multitude of queries into partition queries based on respective active, unique topic-partition pairs. In the example shown in FIG. 15, a partition query is represented as query group 2. The query group 2 is submitted to the streaming data store 1202 using a thread pool of multiple worker threads that simultaneously process a plurality of query groups such as query group 3, query group 4 and query group n. Then, stream data is received in response to the query group 2. In one implementation, the stream data includes large data blocks of data retrieved from the streaming data store 1202. Further, the multitude of queries from the bins is simultaneously served using the large data blocks.

In one implementation, for a particular partition query, start offsets of clients bins that issued queries grouped in the particular partition query are identified. Then, stream data responsive to the particular partition query is received in one or more data batches determined based on the start offsets and a preconfigured batch size. In one implementation, all bins that query the same topic-partition pairs are grouped and their respective start offsets are sequentially listed. Advancing further, for the grouped bins, start offsets within a range that matches a preconfigured batch size are collectively served. For instance, if Bins A, B, C, D, E and F query topic 1, partition 0 but at different start offsets 102, 302, 402, 502, 702 and 1002 and the preconfigured is 300, then start offsets 102 and 402 are served together, start offsets 502 and 702 are served together and start offset 1002 is served separately. In one implementation, multiple worker threads are used to simultaneously serve start offsets grouped in various ranges.

Flowchart

Figure 16:
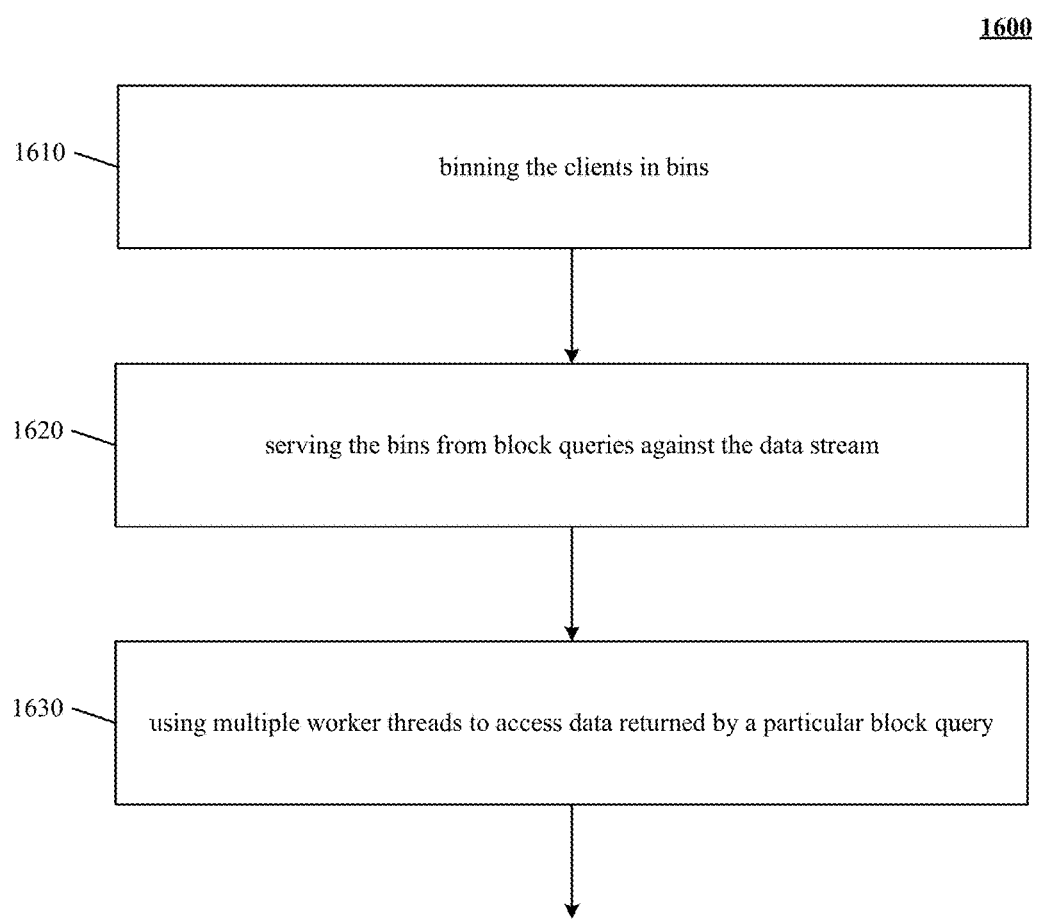
FIG. 16 shows one implementation of a flowchart of servicing tens, hundreds, thousands or millions of clients from an unbounded data stream.

FIG. 16 shows one implementation of a flowchart 1600 of servicing tens, hundreds, thousands or millions of clients from an unbounded data stream, while allowing each client to select any available service offset in the data stream as a starting offset for streaming service to the client. Flowchart 1600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 16. Multiple actions can be combined in some implementations. For convenience, this workflow is described with reference to the system that carries out a method. The system is not necessarily part of the method.

At action 1610, the method includes binning the clients in bins based on the clients' respective selected starting offsets in the data stream and current offsets of the bins.

At action 1620, the method includes serving the bins from block queries against the data stream.

At action 1630, the method includes using multiple worker threads to access data returned by a particular block query for clients in a particular bin.

Figure 17:
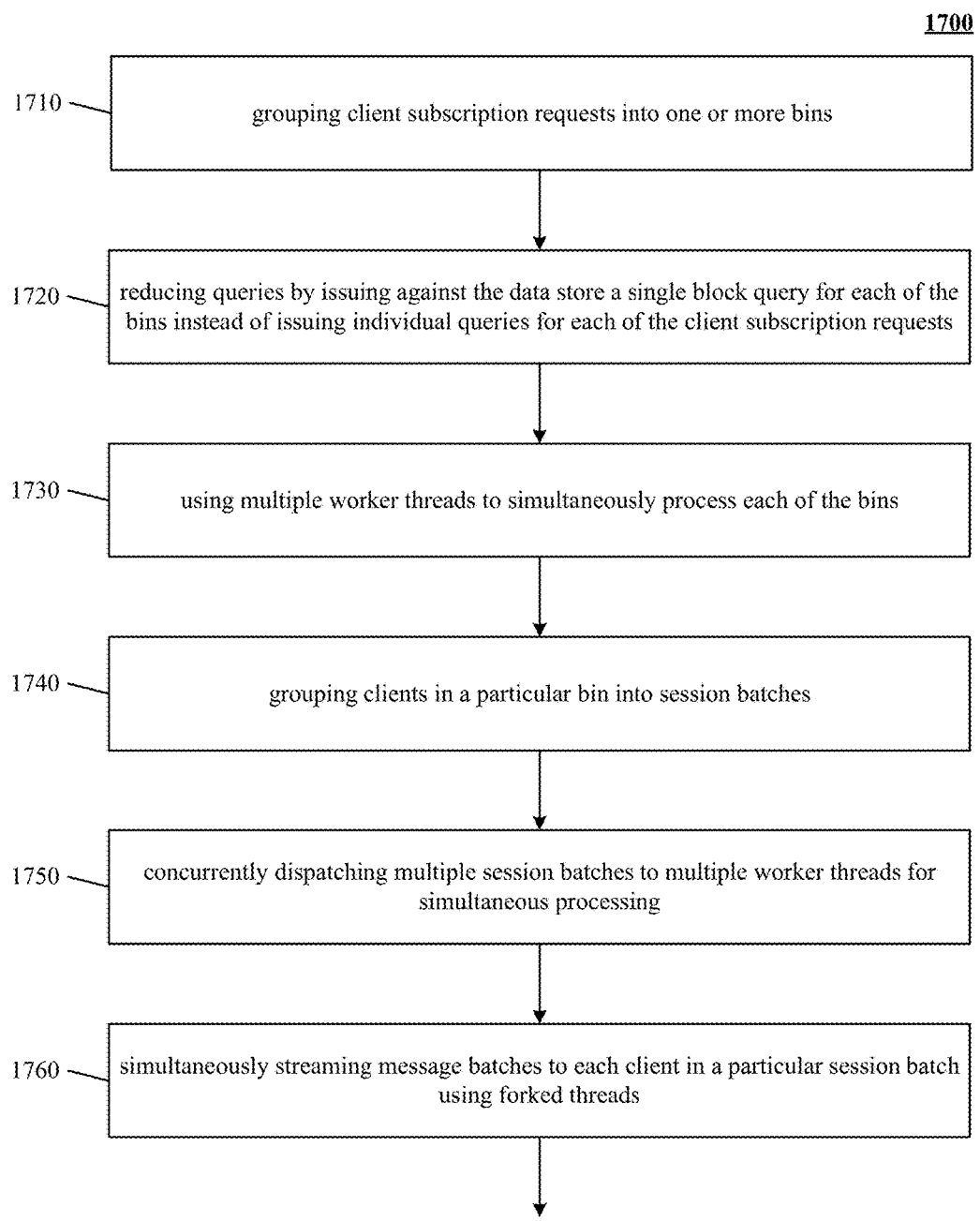
FIG. 17 illustrates one implementation of a flowchart of reducing a number of queries to a message data store by several orders of magnitude when servicing a plurality of clients.

FIG. 17 illustrates one implementation of a flowchart 1700 of reducing a number of queries to a message data store by several orders of magnitude when servicing a plurality of clients, with each client in the plurality of clients requesting subscription to the data store at any available message offset in the data store as a starting offset for streaming messages. Flowchart 1700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 17. Multiple actions can be combined in some implementations. For convenience, this workflow is described with reference to the system that carries out a method. The system is not necessarily part of the method.

At action 1710, the method includes grouping client subscription requests into one or more bins based on the clients' respective subscription offsets identified in the requests and the bins' respective current bin offset ranges.

At action 1720, the method includes reducing queries to the data store when streaming messages to the plurality of clients starting from their respective subscription offsets by issuing against the data store a single block query for each of the bins instead of issuing individual queries for each of the client subscription requests.

At action 1730, the method includes using multiple worker threads to simultaneously process each of the bins. This includes dispatching the bins to the worker threads. During execution of the bins, a count of available worker threads is compared against a number of the bins. When a count of available worker threads equals or exceeds the number of bins, the bins at the available worker threads are concurrently processed. When there are fewer available worker threads than the number of bins, the bins are multiplex sequentially over the available worker threads.

At action 1740, the method includes grouping clients in a particular bin into session batches based on a preconfigured session batch size.

At action 1750, the method includes concurrently dispatching multiple session batches to multiple worker threads for simultaneous processing. In some implementations, the dispatching follows a natural ordering of respective message offsets of the session batches.

At action 1760, the method includes processing a particular session batch using at a first worker thread, forking the first working thread to generate one or more new worker threads, wherein the first and new worker threads share a thread pool and utilize a fork-join framework and simultaneously streaming message batches to each client in the particular session batch using the generated new worker threads.

Figure 18:
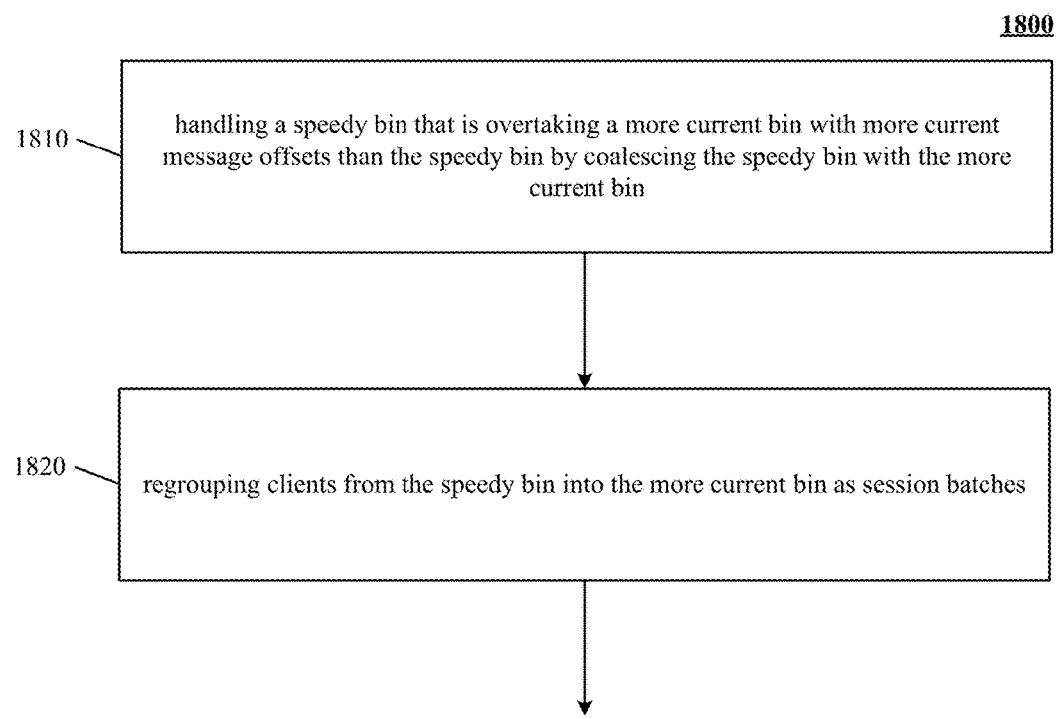
FIG. 18 shows one implementation of a flowchart of bin coalescing.

FIG. 18 shows one implementation of a flowchart 1800 of bin coalescing. Flowchart 1800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 18. Multiple actions can be combined in some implementations. For convenience, this workflow is described with reference to the system that carries out a method. The system is not necessarily part of the method.

At action 810, the method includes handling a speedy bin that is overtaking a more current bin with more current message offsets than the speedy bin by coalescing the speedy bin with the more current bin, thereby further reducing block queries to the data store. In one implementation, the coalescing is triggered when the speedy bin and the more current bin are not locked. In another implementation, the speedy bin and the more current bin are locked during the coalescing. In yet another implementation, the coalescing is triggered when a number of messages between respective end offsets of the speedy bin and the more current bin is equal to or less than a preconfigured bin size. In a further implementation, the system checks for coalescing after streaming a message batch to clients in the speedy bin. In yet another implementation, the speedy bin is deleted after the coalescing and locking the speedy bin during the deletion.

At action 1820, the method includes regrouping clients from the speedy bin into the more current bin as session batches.

Figure 19:
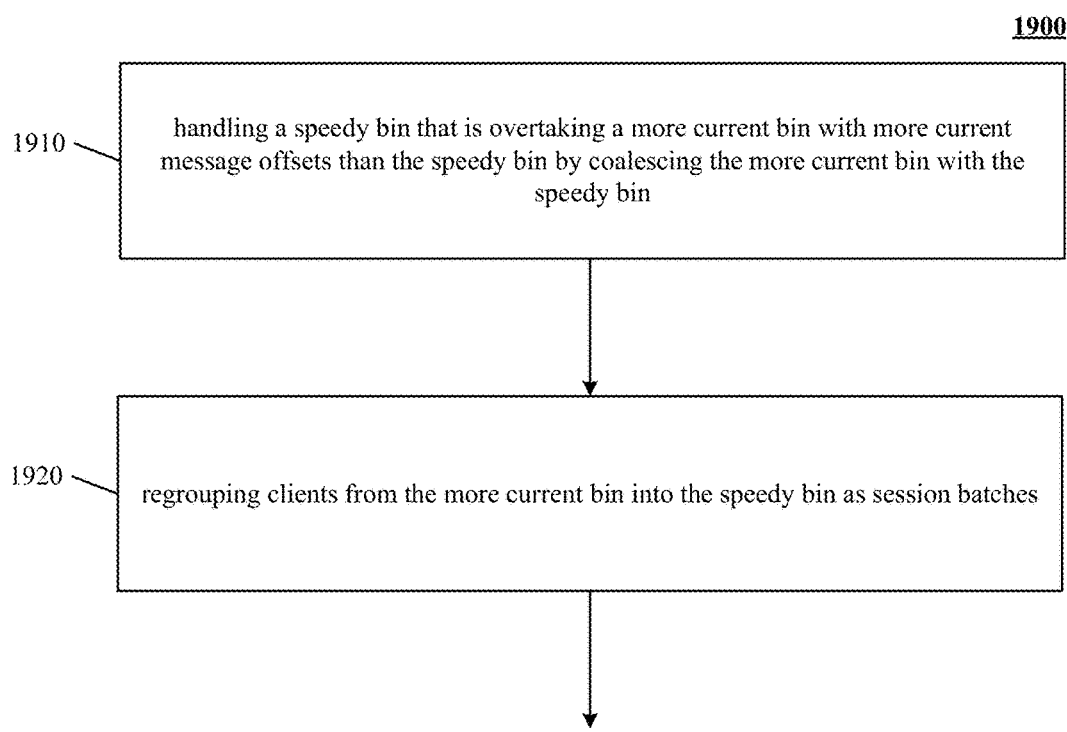
FIG. 19 illustrates another implementation of a flowchart of bin coalescing.

FIG. 19 illustrates another implementation of a flowchart 1900 of bin coalescing. Flowchart 1900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 19. Multiple actions can be combined in some implementations. For convenience, this workflow is described with reference to the system that carries out a method. The system is not necessarily part of the method.

At action 1910, the method includes handling a speedy bin that is overtaking a more current bin with more current message offsets than the speedy bin by coalescing the more current bin with the speedy bin, thereby further reducing block queries to the data store. In one implementation, the coalescing is triggered when the speedy bin and the more current bin are not locked. In another implementation, the speedy bin and the more current bin are locked during the coalescing. In yet another implementation, the coalescing is triggered when a number of messages between respective end offsets of the speedy bin and the more current bin is equal to or less than a preconfigured bin size. In a further implementation, the system checks for coalescing after streaming a message batch to clients in the speedy bin. In yet another implementation, the speedy bin is deleted after the coalescing and locking the speedy bin during the deletion.

At action 1920, the method includes regrouping clients from the more current bin into the speedy bin as session batches.

Figure 20:
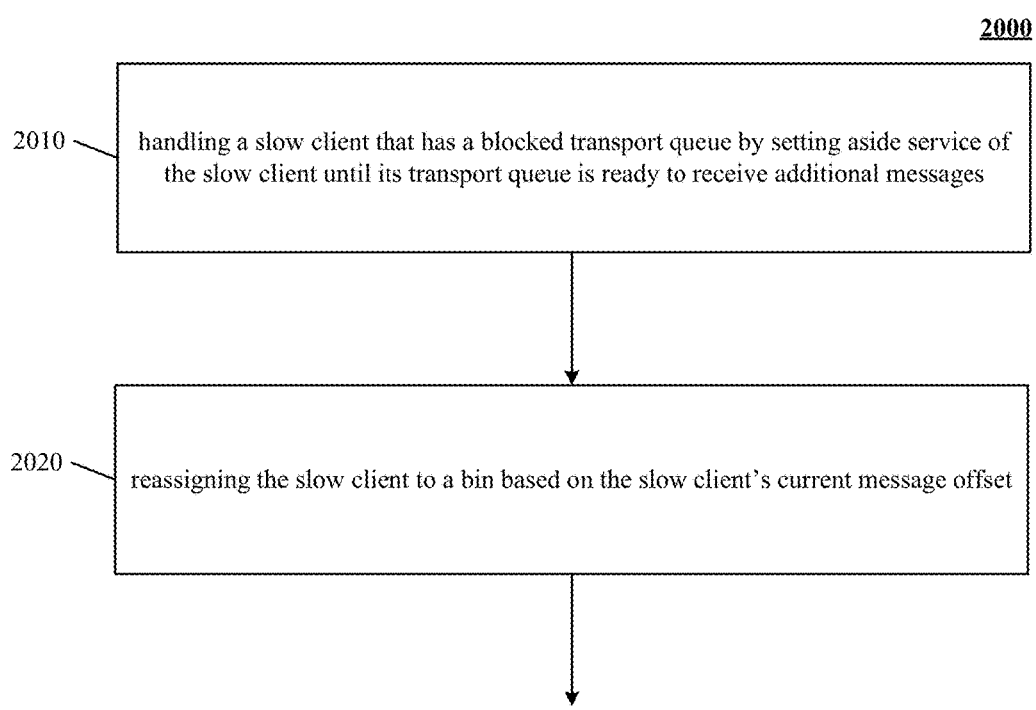
FIG. 20 depicts one implementation of a flowchart of rebinning.

FIG. 20 depicts one implementation of a flowchart 2000 of rebinning. Flowchart 2000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this workflow is described with reference to the system that carries out a method. The system is not necessarily part of the method.

At action 2010, the method includes handling a slow client that has a blocked transport queue by setting aside service of the slow client until its transport queue is ready to receive additional messages.

At action 2020, the method includes reassigning the slow client to a bin based on the slow client's current message offset.

Figure 21:
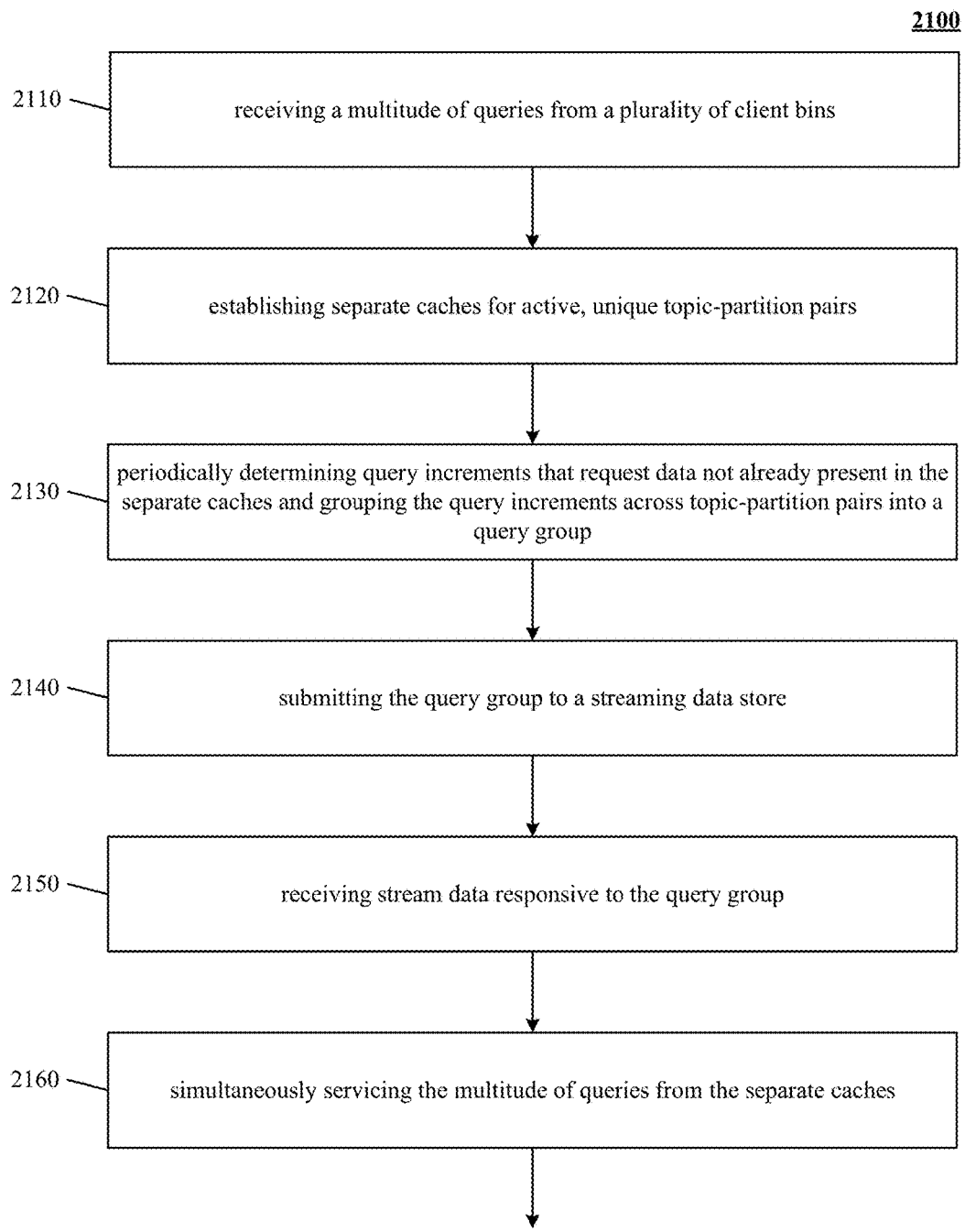
FIG. 21 illustrates one implementation of a flowchart of servicing a plurality of client bins making multi-dimensional queries against a streaming data store.

FIG. 21 illustrates one implementation of a flowchart 2100 of servicing a plurality of client bins making multi-dimensional queries against a streaming data store. Flowchart 2100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 21. Multiple actions can be combined in some implementations. For convenience, this workflow is described with reference to the system that carries out a method. The system is not necessarily part of the method.

At action 2110, the method includes receiving a multitude of queries from a plurality of client bins, the queries including a topic-partition pair and start offsets that reference events in an unbounded event stream, the start offsets mixing historical offsets and current offsets.

At action 2120, the method includes establishing separate caches for active, unique topic-partition pairs.

At action 2130, the method includes periodically determining query increments that request data not already present in the separate caches and grouping the query increments across topic-partition pairs into a query group.

At action 2140, the method includes submitting the query group to a streaming data store that provides access to one or more unbounded data streams.

At action 2150, the method includes receiving stream data responsive to the query group, including larger data blocks responsive to historical offsets and smaller data blocks responsive to current offsets, and updating the separate caches for the topic-partition pairs.

At action 2160, the method includes simultaneously servicing the multitude of queries from the separate caches.

Figure 22:
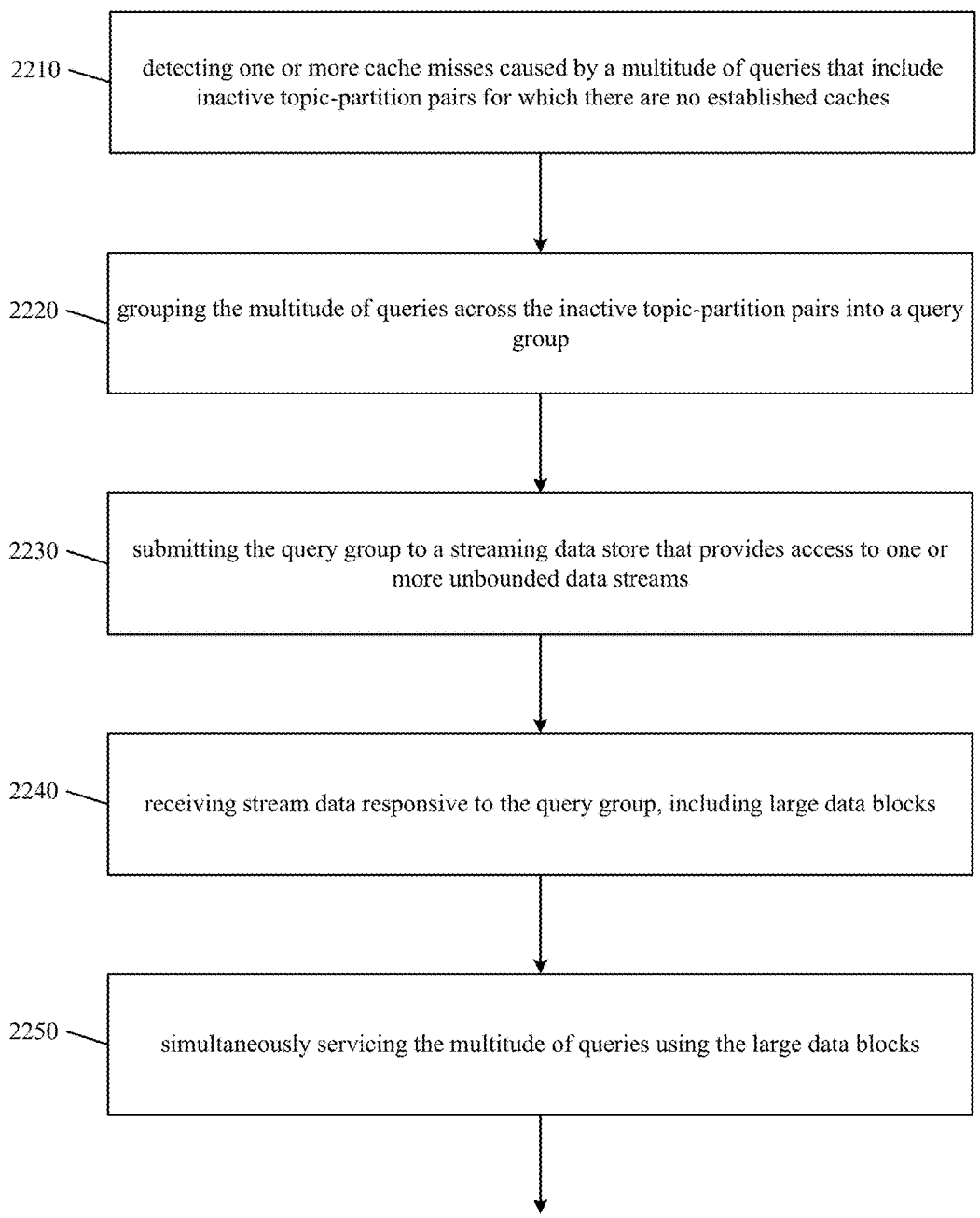
FIG. 22 shows one implementation of a flowchart of handling cache misses in a stream processing system.

FIG. 22 shows one implementation of a flowchart 2200 of handling cache misses in stream processing systems. Flowchart 2200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 22. Multiple actions can be combined in some implementations. For convenience, this workflow is described with reference to the system that carries out a method. The system is not necessarily part of the method.

At action 2210, the method includes detecting one or more cache misses caused by a multitude of queries that include inactive topic-partition pairs for which there are no established caches.

At action 2220, the method includes grouping the multitude of queries across the inactive topic-partition pairs into a query group.

At action 2230, the method includes submitting the query group to a streaming data store that provides access to one or more unbounded data streams.

At action 2240, the method includes receiving stream data responsive to the query group, including large data blocks.

At action 2250, the method includes simultaneously servicing the multitude of queries using the large data blocks.

Figure 23:
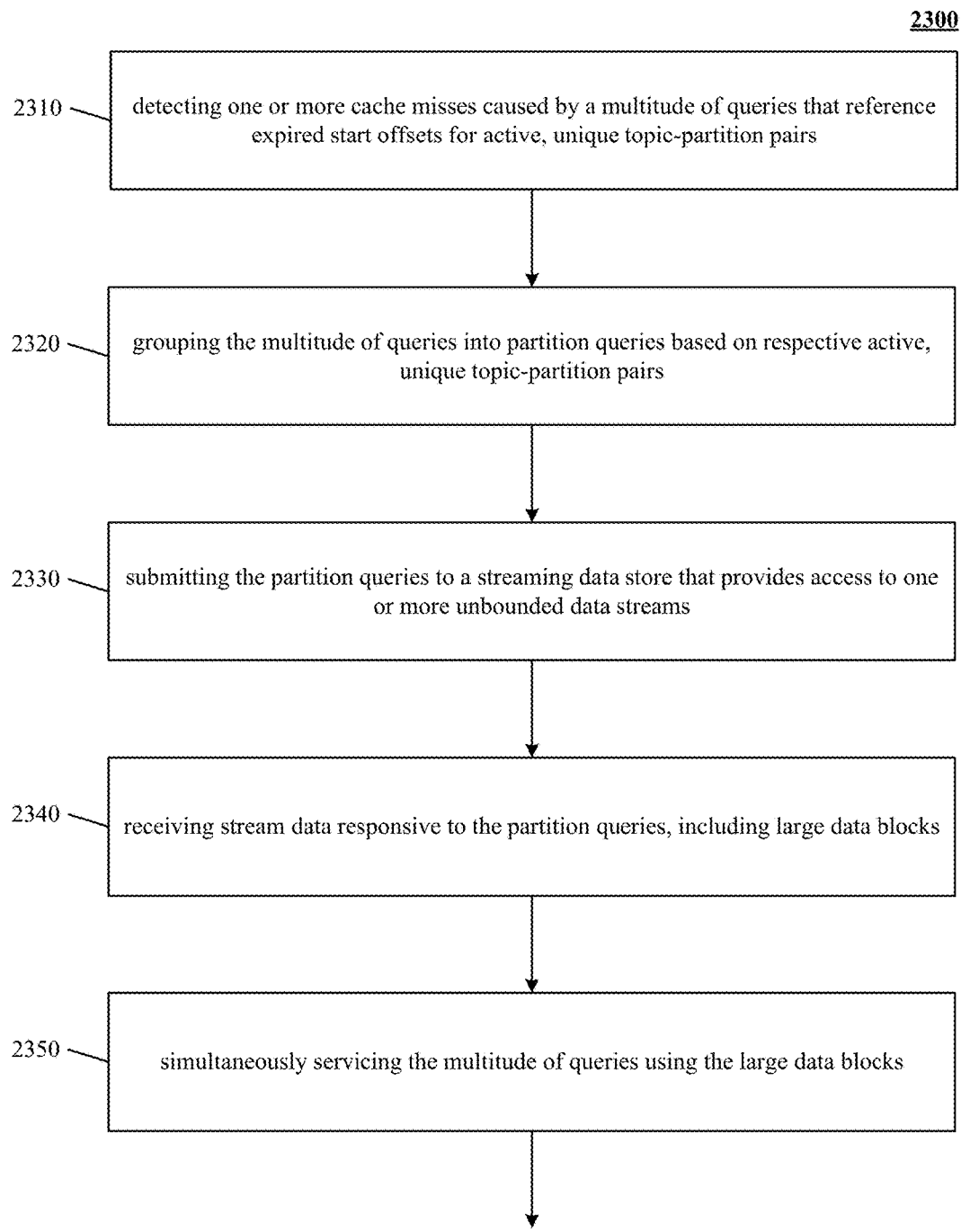
FIG. 23 is another implementation of a flowchart of handling cache misses in a stream processing system.

FIG. 23 shows one implementation of a flowchart 2300 of handling cache misses in stream processing systems. Flowchart 2300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 23. Multiple actions can be combined in some implementations. For convenience, this workflow is described with reference to the system that carries out a method. The system is not necessarily part of the method.

At action 2310, the method includes detecting one or more cache misses caused by a multitude of queries that reference expired start offsets for active, unique topic-partition pairs. In one implementation, the expired start offsets are below respective start offsets of current offsets maintained by separate caches established for respective active, unique topic-partition pairs.

At action 2320, the method includes grouping the multitude of queries into partition queries based on respective active, unique topic-partition pairs.

At action 2330, the method includes submitting the partition queries to a streaming data store that provides access to one or more unbounded data streams.

At action 2340, the method includes receiving stream data responsive to the partition queries, including large data blocks.

At action 2350, the method includes simultaneously servicing the multitude of queries using the large data blocks.

Some Particular Implementations

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as streaming or message data store, tip, tip convergence, super scaled stream processing system, binning, bin creation and message delivery, anti-latency simultaneous processing, coalescing, rebinning, etc.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods are described with reference to the system that carries out a method. The system is not necessarily part of the method.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

Some example implementations are listed below with certain implementations dependent upon the implementation to which they refer to:

1. A method of servicing thousands of clients from an unbounded data stream, while allowing each client to select any available service offset in the data stream as a starting offset for streaming service to the client, the method including: binning the clients in bins based on the clients' respective selected starting offsets in the data stream and current offsets of the bins; and serving the bins from block queries against the data stream.

2. The method of implementation 1, further including using multiple worker threads to access data returned by a particular block query for clients in a particular bin.

3. A method of servicing millions of clients from an unbounded data stream, while allowing each client to select any available service offset in the data stream as a starting offset for streaming service to the client, the method including: binning the clients in bins based on the clients' respective selected starting offsets in the data stream and current offsets of the bins; and serving the bins from block queries against the data stream.

4. A method of servicing hundreds of clients from an unbounded data stream, while allowing each client to select any available service offset in the data stream as a starting offset for streaming service to the client, the method including: binning the clients in bins based on the clients' respective selected starting offsets in the data stream and current offsets of the bins; and
serving the bins from block queries against the data stream.
5. A method of servicing tens of clients from an unbounded data stream, while allowing each client to select any available service offset in the data stream as a starting offset for streaming service to the client, the method including: binning the clients in bins based on the clients' respective selected starting offsets in the data stream and current offsets of the bins; and
serving the bins from block queries against the data stream.
6. A method of servicing a plurality of clients from an unbounded data stream, while allowing each client to select any available service offset in the data stream as a starting offset for streaming service to the client, the method including: binning the clients in bins based on the clients' respective selected starting offsets in the data stream and current offsets of the bins; and
serving the bins from block queries against the data stream.
7. The method of implementation 6, wherein the plurality of clients includes thousands of clients.
8. The method of implementation 6, wherein the plurality of clients includes millions of clients.
9. The method of implementation 6, wherein the plurality of clients includes hundreds of clients.
10. The method of implementation 6, wherein the plurality of clients includes tens of clients.
11. A method of reducing a number of queries to a message data store by several orders of magnitude when servicing a plurality of clients, with each client in the plurality of clients requesting subscription to the data store at any available message offset in the data store as a starting offset for streaming messages to the client, the method including:
grouping client subscription requests into at least one bin based on the clients' respective subscription offsets identified in the requests and current bin offset range of the bin; and
reducing queries to the data store when streaming messages to the plurality of clients starting from their respective subscription offsets by issuing against the data store a single block query for the bin instead of issuing individual queries for each of the client subscription requests.
12. A method of reducing a number of queries to a message data store by several orders of magnitude when servicing a plurality of clients, with each client in the plurality of clients requesting subscription to the data store at any available message offset in the data store as a starting offset for streaming messages, the method including:
grouping client subscription requests into one or more bins based on the clients' respective subscription offsets identified in the requests and the bins' respective current bin offset ranges; and
reducing queries to the data store when streaming messages to the plurality of clients starting from their respective subscription offsets by issuing against the data store a single block query for each of the bins instead of issuing individual queries for each of the client subscription requests.
13. The method of implementation 12, wherein the bins' respective current bin offset ranges represent lower and upper logical boundaries of a segment of a particular message sequence currently maintained by the data store.
14. The method of implementation 13, wherein a start offset of a new bin's bin offset range is selected based on a subscription offset of at least one client subscription request in the new bin.
15. The method of implementation 13, wherein a start offset of a particular bin's bin offset range is determined based on a latest message offset streamed to at least one client in the particular bin.
16. The method of implementation 13, wherein an end offset of each bin's bin offset range is determined based on a preconfigured bin size measured in number of messages.
17. The method of implementation 12, wherein the data store maintains a sliding window of message sequences for a message stream.
18. The method of implementation 17, wherein the sliding window is responsive to the data store receiving a new message for the message stream.
19. The method of implementation 18, wherein the new message is appended to end of the message sequences.
20. The method of implementation 19, wherein the new message is assigned a unique message offset that is a monotonically increasing sequence number.
21. The method of implementation 17, wherein the data store progresses the sliding window by persisting message sequences to a stable storage upon meeting a configurable threshold.
22. The method of implementation 22, wherein the configurable threshold is number of messages received by the data store.
23. The method of implementation 22, wherein the configurable threshold is amount of time elapsed since the data store received the message sequences.
24. The method of implementation 12, further including:
tracking message offsets up to which each client in the plurality of clients has consumed messages from the data store;
for each client, periodically checkpointing the last consumed message offsets to a stable storage;
receiving requests from each client for messages with message offsets greater than the clients' respective last checkpointed message offsets; and
streaming messages to each client starting immediately after the clients' respective last checkpointed message offsets up to most recently received message in the data store.
25. The method of implementation 12, further including:
receiving client subscription requests from the plurality of clients, wherein the subscription requests identify as subscription offsets the clients' respective starting offsets for streaming messages from the data store;
wherein the subscription offsets are distributed across various message offsets currently or historically maintained by the data store;
creating one or more new bins to cluster the client subscription requests based on the distribution of the subscription offsets and a preconfigured bin size, wherein each new bin has a bin offset range with a start offset selected based on one or more subscription offsets and an end offset selected based on the bin size;
grouping the client subscription requests into corresponding new bins, wherein subscription offsets of client subscription requests clustered in a particular new bin are within the particular new bin's bin offset range; and responding to the client subscription requests by issuing against the data store a single block query for each of the new bins instead of issuing individual queries for each of the client subscription requests.

26. The method of implementation 25, wherein the message sequence currently maintained by the data store has message offsets between 800 and 1200 and the preconfigured bin size is one hundred messages, further including:
receiving five hundred client subscription requests with subscription offsets 802, receiving one thousand client subscription requests with subscription offsets 906, receiving one thousand client subscription requests with subscription offsets 908, receiving one thousand client subscription requests with subscription offsets 910, receiving one thousand client subscription requests with subscription offsets 912, receiving one thousand client subscription requests with subscription offsets 1025 and receiving one thousand client subscription requests with subscription offsets 1150;
creating four new bins with respective bin offset ranges 802-902, 906-1006, 1020-1120 and 1150-1200;
clustering the five hundred client subscription requests with subscription offsets 802 in first bin with offset range 802-902, clustering the one thousand client subscription requests with subscription offsets 906 in second bin with offset range 906-1006, clustering the one thousand client subscription requests with subscription offsets 908 in the second bin with offset range 906-1006, clustering the one thousand client subscription requests with subscription offsets 910 in the second bin with offset range 906-1006, clustering the one thousand client subscription requests with subscription offsets 912 in the second bin with offset range 906-1006, clustering the one thousand client subscription requests with subscription offsets 1025 in third bin with offset range 1020-1120 and clustering the one thousand client subscription requests with subscription offsets 1150 in fourth bin with offset range 1150-1200; and
reducing subscription queries to the data store when responding to six thousand five hundred client subscription requests by issuing against the data store a single block query for each of the first, second, third and fourth new bins instead of issuing individual queries for each of the six thousand five hundred client subscription requests.

27. The method of implementation 12, further including:
for a particular block query issued for a particular bin with a set of clients, retrieving a message batch from the data store, wherein the message batch has a message offset range with a start offset and an end offset;
streaming the retrieved message batch to the particular bin's clients;
advancing the particular bin by updating the particular bin's bin offset range based on the end offset of the message batch's message offset range and a preconfigured bin size; and
regrouping the clients in the advanced particular bin.

28. The method of implementation 12, further including:
for a particular block query issued for a particular bin with a set of clients, retrieving a message batch from the data store;
streaming the retrieved message batch to the particular bin's clients;
advancing the particular bin based on the streamed message batch; and
regrouping the clients in the advanced particular bin.

29. The method of implementation 27, further including locking the particular bin during the advancing and the regrouping.

30. The method of implementation 27, wherein a previous bin offset range of the particular bin was 800-900, a message offset range of the streamed message batch is 801-950 and the preconfigured bin size is one hundred messages, further including:
advancing the particular bin by updating the particular bin's bin offset range to be 950-1050; and
regrouping the clients in the advanced particular bin.

31. The method of implementation 12, further including:
determining that message offsets of messages streamed to the clients have respectively evolved from a varied distribution across the data store to a cumulative convergence towards a tip message offset in the data store, wherein the tip message offset identifies a latest message in the data store;
regrouping the clients, previously grouped into different bins, into a tip bin with a bin offset range that includes the tip message offset; and
servicing the clients by issuing against the data store a single block query for the tip bin instead of issuing multiple block queries for the different bins.

32. The method of implementation 12, wherein the subscription requests identify as subscription offsets the clients' respective last checkpointed message offsets, further including:
using one or more block queries to restream messages to the plurality of clients starting from their respective subscription offsets under a fault tolerance scheme.

33. The method of implementation 12, wherein the subscription requests identify as subscription offsets the clients' respective starting offsets for streaming messages that are different from the clients' respective last checkpointed message offsets, further including:
using one or more block queries to restream messages to the plurality of clients starting from their respective subscription offsets under a security scan scheme.

34. The method of implementation 27, further including:
for each of the clients grouped in the particular bin, filtering from the retrieved message batch, messages that have message offsets equal to or less than the clients' respective subscription offsets; and
streaming to each of the clients, messages from the retrieved message batch that have message offsets greater than the clients' respective subscription offsets.

35. The method of implementation 12, further including:
receiving client subscription requests from the plurality of clients, wherein the subscription requests identify as subscription offsets the clients' respective starting offsets for streaming messages from the data store;
wherein the subscription offsets are proximate to a tip message offset that identifies a latest message in the data store;
grouping the client subscription requests into a tip bin with a bin offset range that includes the tip message offset and the subscription offsets; and
responding to the client subscription requests by issuing against the data store a single block query for the tip bin instead of issuing individual queries for each of the client subscription requests.

36. The method of implementation 12, further including:
for each block query issued for each of the bins, retrieving a message batch from the data store, wherein the message batch has a message offset range with a start offset immediately succeeding a start offset of the corresponding bin's bin offset range.

37. The method of implementation 36, wherein a bin's bin offset range is 800-90 and the message offset range of the retrieved message batch is 801-950.

38. The method of implementation 36, wherein a bin's bin offset range is 1100-1200 and the message offset range of the retrieved message batch is 1101-1150.

39. The method of implementation 12, further including: using multiple worker threads to simultaneously process each of the bins.

40. The method of implementation 39, further including: dispatching the bins to the worker threads, including:
during execution, comparing a count of available worker threads against a number of the bins;
when a count of available worker threads equals or exceeds the number of bins, concurrently processing the bins at the available worker threads; and
when there are fewer available worker threads than the number of bins, multiplexing the bins sequentially over the available worker threads.

41. The method of implementation 39, wherein 12 message batches are retrieved in response to 12 block queries issued for 12 bins and the count of available worker threads is 10, further including:
concurrently processing 10 bins at the 10 available worker threads and multiplexing some of the bins sequentially over at least 1 available worker thread.

42. The method of implementation 12, further including: using multiple worker threads to simultaneously stream message batches to clients in a particular bin.

43. The method of implementation 42, wherein first and second message batches are retrieved in response to first and second block queries issued for first and second bins and a count of available worker threads is 8, further including:
using 4 worker threads to simultaneously stream the first message batch to clients in the first bin and using 4 worker threads to simultaneously stream the second message batch to clients in the second bin.

44. The method of implementation 12, further including: grouping clients in a particular bin into session batches based on a preconfigured session batch size; and
concurrently dispatching multiple session batches to multiple worker threads for simultaneous processing, wherein the dispatching follows a natural ordering of respective message offsets of the session batches.

45. The method of implementation 44, further including: processing a particular session batch using at a first worker thread;
forking the first working thread to generate one or more new worker threads,
wherein the first and new worker threads share a thread pool and utilize a fork-join framework; and
simultaneously streaming message batches to each client in the particular session batch using the generated new worker threads.

46. The method of implementation 44, wherein the preconfigured session batch size is fifteen hundred, the particular bin has a bin offset range 800-900, the particular bin includes five thousand clients with one thousand clients receiving messages starting from message offset 806, one thousand clients receiving messages starting from message offset 808, one thousand clients receiving messages starting from message offset 810, one thousand clients receiving messages starting from message offset 812 and one thousand clients receiving messages starting from message offset 814 and the count of available worker threads is 4, further including:
clustering one thousand clients receiving messages starting from message offset 806 and five hundred clients receiving messages starting from message offset 808 in a first session batch, clustering five hundred clients receiving messages starting from message offset 808 and one thousand clients receiving messages starting from message offset 810 in a second session batch, clustering one thousand clients receiving messages starting from message offset 812 and five hundred clients receiving messages starting from message offset 814 in a third session batch, and clustering five clients receiving messages starting from message offset 814 in a fourth session batch; and
concurrently processing the first, second, third, and fourth session batches at the 4 available worker threads.

47. The method of implementation 12, further including: handling a speedy bin that is overtaking a more current bin with more current message offsets than the speedy bin by coalescing the speedy bin with the more current bin, thereby further reducing block queries to the data store.

48. The method of implementation 47, further including: regrouping clients from the speedy bin into the more current bin as session batches.

49. The method of implementation 47, further including: triggering the coalescing when the speedy bin and the more current bin are not locked.

50. The method of implementation 47, further including: locking the speedy bin and the more current bin during the coalescing.

51. The method of implementation 47, further including: checking for coalescing after streaming a message batch to clients in the speedy bin.

52. The method of implementation 47, further including: triggering the coalescing when a number of messages between respective end offsets of the speedy bin and the more current bin is equal to or less than a preconfigured bin size.

53. The method of implementation 47, wherein the speedy bin has a bin offset range 0-5, the more current bin has a bin offset range 50-90 and the preconfigured batch size is 50, further including:
coalescing the speedy bin with the more current bin; and
at offset 55 of the more current bin, regrouping clients from the speedy bin into the more current bin as session batches.

54. The method of implementation 47, further including: deleting the speedy bin after the coalescing and locking the speedy bin during the deletion.

55. The method of implementation 12, further including: handling a speedy bin that is overtaking a more current bin with more current message offsets than the speedy bin by coalescing the more current bin with the speedy bin, thereby further reducing block queries to the data store.

56. The method of implementation 55, further including: regrouping clients from the more current bin into the speedy bin as session batches.

57. The method of implementation 55, further including: triggering the coalescing when the speedy bin and the more current bin are not locked.

58. The method of implementation 55, further including: locking the speedy bin and the more current bin during the coalescing.

59. The method of implementation 55, further including:
triggering the coalescing when a current actual end offset of a more current bin is within a current nominal end offset of a speedy bin, wherein a current actual end offset of a particular bin identifies a most recent greatest message offset streamed to at least one client in the particular bin.
60. The method of implementation 59, wherein a current nominal bin offset range of a speedy bin is 145-195, a current nominal bin offset range of a more current bin is 155-205and a current actual bin offset range of the more current bin is 155-160, further including:
coalescing the more current bin with the speedy bin; and
at offsets is 155-160 of the speedy bin, regrouping clients from the more current bin into the speedy bin as session batches.
61. The method of implementation 12, further including:
handling a slow client that has a blocked transport queue by setting aside service of the slow client until its transport queue is ready to receive additional messages, then reassigning the slow client to a bin based on the slow client's current message offset.
62. The method of implementation 12, further including:
for clients in a speedy bin, determining that increment rate of current message offsets for some lagging clients is slow compared to increment rate of current message offsets for some speedy clients; and
regrouping the lagging clients in another bin with an offset range that includes the lagging clients' current message offsets.
63. The method of implementation 12, wherein a worker thread processing a particular bin's session batch encounter's a slow client, further including:
minimizing latency during the processing by regrouping a client subscription request of the slow client to another bin.
64. The method of implementation 63, wherein the another bin is an existing bin with a bin offset range that includes a subscription offset specified in the client subscription request.
65. The method of implementation 63, wherein the another bin is an newly created bin with an offset range that includes a subscription offset specified in the client subscription request.
66. The method of implementation 63, wherein the slow client has a blocked transport queue, further including:
before regrouping the client subscription request of the slow client to another bin, checking whether the transport queue is ready to receive additional messages.
67. The method of implementation 12, further including:
receiving a client subscription request that identifies a subscription offset;
when no existing bin has a current bin offset range that includes the subscription offset, creating a new bin based on the subscription offset, grouping the client subscription request into the new bin;
when a particular bin has a current bin offset range that includes the subscription offset, determining whether the particular bin is locked;
when the particular bin is locked, queuing the client subscription request until the particular bin is unlocked;
after the particular bin is unlocked, determining whether the particular bin's current bin offset range still includes the subscription offset; and
dependent on the determining, grouping the client subscription request into the particular bin.
68. The method of implementation 67, further including:
locking the new bin when grouping the client subscription request into the new bin.
69. The method of implementation 67, further including:
locking the particular bin when grouping the client subscription request into the particular bin.
70. The method of implementation 12, further including:
detecting an existing client dropping out of a particular bin;
checking current message offsets of other clients remaining in the particular bin; and
in response to determining that either a current actual start offset or a current actual end offset of the particular bin is within a more current bin's current bin offset range, coalescing the particular bin with the more current bin.
71. The method of implementation 70, wherein a message offset of the existing client that dropped out of the particular bin was 820, a current actual bin offset range of the particular bin is 845-870 and a current bin offset range of the more current bin is 850-900, further including:
coalescing the particular bin with the more current bin; and
at offsets 845-870 of the more current bin, regrouping clients from the particular bin into the more current bin as session batches.
72. The method of implementation 12, wherein the message data store is a messaging service.
73. The method of implementation 12, wherein the message data store is a non-relational distributed database.
74. The method of implementation 12, wherein the message data store is a relational database.
75. The method of implementation 12, wherein the message data store is an in-memory database.
76. A method of servicing a plurality of client bins making multi-dimensional queries against a streaming data store, the method including:
receiving a multitude of queries from a plurality of client bins, the queries including a topic-partition pair and start offsets that reference events in an unbounded event stream, the start offsets mixing historical offsets and current offsets;
establishing separate caches for active, unique topic-partition pairs;
periodically determining query increments that request data not already present in the separate caches and grouping the query increments across topic-partition pairs into a query group;
submitting the query group to a streaming data store that provides access to one or more unbounded data streams;
receiving stream data responsive to the query group, including larger data blocks responsive to historical offsets and smaller data blocks responsive to current offsets, and updating the separate caches for the topic-partition pairs; and
simultaneously servicing the multitude of queries from the separate caches.
77. The method of claim 76, further including:
periodically expiring part or all of the separate caches, at least when parts of data in a particular separate cache reach an expiry date-time and when the particular separate cache reaches an inactivity threshold.
78. The method of claim 76, wherein a plurality of the queries include start offsets that reference current offsets of the unbounded data stream comprising a tip of most recent events.

79. The method of claim 78, wherein the data requested by the query increments include most recent events from the tip.

80. The method of claim 76, wherein the current offsets maintained by the separate caches for respective topic-partition pairs have varying start and end offsets.

81. The method of claim 76, wherein the query increments are determined at 300 m/s intervals.

82. The method of claim 76, wherein the query increments are determined at 200 m/s intervals.

83. The method of claim 76, wherein the historical offsets of the unbounded data stream are periodically persisted in a stable storage.

84. The method of claim 76, wherein the client bins include millions of clients.

85. The method of claim 76, further including:
detecting one or more cache misses caused by a multitude of queries that include inactive topic-partition pairs for which there are no established caches;
handling the cache misses by:
grouping the multitude of queries across the inactive topic-partition pairs into a query group;
submitting the query group to a streaming data store that provides access to one or more unbounded data streams;
receiving stream data responsive to the query group, including large data blocks; and
simultaneously servicing the multitude of queries using the large data blocks.

86. The method of claim 85, further including:
establishing new separate caches for each of the inactive topic-partition pairs, thereby preventing subsequent cache misses.

87. The method of claim 76, further including:
detecting one or more cache misses caused by a multitude of queries that reference expired start offsets for active, unique topic-partition pairs, wherein the expired start offsets are below respective start offsets of current offsets maintained by separate caches established for respective active, unique topic-partition pairs;
handling the cache misses by:
grouping the multitude of queries into partition queries based on respective active, unique topic-partition pairs;
submitting the partition queries to a streaming data store that provides access to one or more unbounded data streams;
receiving stream data responsive to the partition queries, including large data blocks; and
simultaneously servicing the multitude of queries using the large data blocks.

88. The method of claim 87, further including:
using a thread pool to concurrently process the partition queries.

89. The method of claim 87, further including:
for a particular partition query, identifying start offsets of clients bins that issued queries grouped in the particular partition query;
receiving stream data responsive to the particular partition query in one or more data batches determined based on the start offsets and a preconfigured batch size; and
simultaneously servicing the queries using the data batches.

90. The method of claim 87, wherein each of the partition queries identify a unique topic-partition pair and a set of start offsets of clients bins that issued queries grouped in respective partition queries.

91. The method of claim 76, wherein a cache size of each separate cache is preconfigured based at least on number of bytes and number of events.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of reducing a number of queries to a message data store of at least one storage device when servicing a plurality of clients, with each client in the plurality of clients requesting subscription to the data store of the at least one storage device at any available message offset in the data store of the at least one storage device as a starting offset for streaming messages, the method including:
grouping, by at least one processor communicatively coupled to the at least one storage device, client subscription requests of the plurality of clients into one or more bins based on respective subscription offsets identified in the requests of the plurality of clients and respective current bin offset ranges of the one or more bins; and
reducing, by the at least one processor, queries to the data store of the at least one storage device when streaming messages to the client subscription requests of the plurality of clients starting from their respective subscription offsets by issuing against the data store a single block query for each of the bins instead of issuing individual queries for each of the client subscription requests.

2. The method of claim 1, wherein the respective current bin offset ranges of the one or more bins represent lower and upper logical boundaries of a segment of a particular message sequence currently maintained by the data store.

3. The method of claim 2, wherein a start offset of a new bin's bin offset range is selected based on a subscription offset of at least one client subscription request in the new bin.

4. The method of claim 2, wherein a start offset of a particular bin's bin offset range is determined based on a latest message offset streamed to at least one of the client subscription requests in the particular bin.

5. The method of claim 2, wherein an end offset of each bin's bin offset range is determined based on a preconfigured bin size measured in number of messages.

6. The method of claim 1, wherein the grouping of the client subscription requests of the plurality of clients comprises:
receiving, at the at least one processor, the client subscription requests from the plurality of clients, wherein the subscription requests identify as subscription offsets the clients' respective starting offsets for streaming messages from the data store, and wherein the subscription offsets are distributed across various message offsets currently or historically maintained by the data store;
creating, at the at least one processor, the one or more bins to group the client subscription requests of the plurality of clients based on the distribution of the subscription offsets and a preconfigured bin size, wherein each of the bins has a bin offset range with a start offset selected based on one or more subscription offsets and an end offset selected based on the bin size, and wherein the reducing the queries to the data store comprises responding to the client subscription requests by issuing against the data store a single block query for each of the bins instead of issuing individual queries for each of the client subscription requests.

7. The method of claim 1, further including:
for a particular block query issued for a particular bin with a set of the client subscription requests of the plurality of clients, retrieving a message batch from the data store, wherein the message batch has a message offset range with a start offset and an end offset;
streaming the retrieved message batch to the particular bin's set of the client subscription requests of the plurality of clients;
advancing the particular bin by updating the particular bin's bin offset range based on the end offset of the message batch's message offset range and a preconfigured bin size; and
regrouping the set of the of the client subscription requests of the plurality of clients in the advanced particular bin.

8. The method of claim 1, further including:
determining that message offsets of messages streamed to the client subscription requests of the plurality of clients have respectively evolved from a varied distribution across the data store to a cumulative convergence towards a tip message offset in the data store, wherein the tip message offset identifies a latest message in the data store;
regrouping the client subscription requests of the plurality of clients, previously grouped into different bins, into a tip bin with a bin offset range that includes the tip message offset; and
servicing the client subscription requests of the plurality of clients by issuing against the data store a single block query for the tip bin instead of issuing multiple block queries for the different bins.

9. The method of claim 1, further including:
using multiple worker threads to simultaneously process each of the bins.

10. The method of claim 9, further including:
dispatching the bins to the worker threads, including:
during execution, comparing a count of available worker threads against a number of the bins;
when a count of available worker threads equals or exceeds the number of bins, concurrently processing the bins at the available worker threads; and
when there are fewer available worker threads than the number of bins, multiplexing the bins sequentially over the available worker threads.

11. The method of claim 1, wherein the grouping of client subscription requests of the plurality of clients into the one or more bins comprises grouping the client subscription requests of a particular bin into session batches based on a preconfigured session batch size; and
concurrently dispatching multiple session batches to multiple worker threads for simultaneous processing, wherein the dispatching follows a natural ordering of respective message offsets of the session batches.

12. The method of claim 11, further including:
processing a particular session batch using at a first worker thread;
forking the first working thread to generate one or more new worker threads, wherein the first and new worker threads share a thread pool and utilize a fork-join framework; and
simultaneously streaming message batches to each client subscription request of one of the plurality of clients in the particular session batch using the generated new worker threads.

13. The method of claim 1, further including:
handling a speedy bin that is overtaking a more current bin with more current message offsets than the speedy bin by coalescing the speedy bin with the more current bin, thereby further reducing block queries to the data store,
wherein the speedy bin has an end offset that is greater that a start offset of the current bin.

14. The method of claim 13, further including:
regrouping client subscription requests of the plurality of clients from the speedy bin into the more current bin as session batches.

15. The method of claim 1, further including:
handling a speedy bin that is overtaking a more current bin with more current message offsets than the speedy bin by coalescing the more current bin with the speedy bin, thereby further reducing block queries to the data store,
wherein the speedy bin has an end offset that is greater that a start offset of the more current bin.

16. The method of claim 15, further including:
regrouping client subscription requests of the plurality of clients from the more current bin into the speedy bin as session batches.

17. The method of claim 1, further including:
handling a slow client subscription request of one of the plurality of clients that has a blocked transport queue by setting aside service of the slow client subscription request of one of the plurality of clients until its transport queue is ready to receive additional messages, then reassigning the slow client subscription request of one of the plurality of clients to a bin of the one or more bins based on the current message offset of the slow client subscription request of one of the plurality of clients.

18. The method of claim 1, further including:
detecting an existing client subscription request of one of the plurality of clients dropping out of a particular bin of the plurality of bins;
checking current message offsets of other client subscription requests of the plurality of clients remaining in the particular bin; and
in response to determining that either a current actual start offset or a current actual end offset of the particular bin is within a more current bin's current bin offset range, coalescing the particular bin with the more current bin.

19. A non-transitory computer readable storage medium including computer program instructions that, when executed on a processor, implement a method comprising:
receiving selections, at the processor, for a plurality of client subscription requests for available service offsets in an unbounded data stream from a data store as starting offsets for streaming services to the respective client subscription requests;
binning, by the processor, the client subscription requests in bins based on the respective selected starting offsets in the data stream and current offsets of the bins for the client subscription requests;

receiving, at the data store, at least one block query against the data stream based on the binned clients; and accessing data, by the processor, returned by the at least one block query for clients in a particular bin using a plurality of worker threads.

20. A system including one or more processors coupled to memory, the memory including computer instructions that, when executed on the one or more processors, implement actions comprising:

receiving selections, at the one or more processor, for a plurality of client subscription requests for available service offsets in an unbounded data stream from a data store as starting offsets for streaming services to the respective client subscription requests;

binning, at the one or more processors, the client subscription services in bins based on the respective selected starting offsets in the data stream and current offsets of the bins for the client subscription requests;

receiving, at the data store, at least one block query against the data stream based on the binned clients; and accessing data, by the processor, returned by the at least one block query for clients in a particular bin using a plurality of worker threads.

* * * * *